US006182021B1

(12) United States Patent
Izumi et al.

(10) Patent No.: US 6,182,021 B1
(45) Date of Patent: *Jan. 30, 2001

(54) TIRE AIR PRESSURE WARNING DEVICE

(75) Inventors: Tomoji Izumi, Hatsukaichi; Tetsuya Tachihata, Hiroshima; Takeshi Edahiro, Higashihiroshima, all of (JP)

(73) Assignee: Mazda Motor Corporation, Hiroshima (JP)

( * ) Notice: Under 35 U.S.C. 154(b), the term of this patent shall be extended for 0 days.

This patent is subject to a terminal disclaimer.

(21) Appl. No.: 09/132,308

(22) Filed: Aug. 11, 1998

Related U.S. Application Data

(62) Division of application No. 08/220,361, filed on Mar. 24, 1994, now Pat. No. 5,826,210.

(30) Foreign Application Priority Data

| Mar. 29, 1993 | (JP) | 5-070132 |
| Mar. 29, 1993 | (JP) | 5-070133 |
| Mar. 29, 1993 | (JP) | 5-070135 |
| Mar. 30, 1993 | (JP) | 5-096744 |
| Mar. 30, 1993 | (JP) | 5-096745 |
| Mar. 30, 1993 | (JP) | 5-096746 |
| Mar. 30, 1993 | (JP) | 5-096747 |
| Jul. 27, 1993 | (JP) | 5-204531 |

(51) Int. Cl.$^7$ ................................................ B60C 23/00
(52) U.S. Cl. ........................ 702/138; 702/140; 340/444; 701/70
(58) Field of Search ................................ 702/138, 140, 702/148; 701/70; 73/146.2, 146.3, 146.4, 146.5; 340/442, 443, 444, 445

(56) References Cited

U.S. PATENT DOCUMENTS

| 4,267,575 | 5/1981 | Bounds . |
| 4,777,611 | 10/1988 | Tashino et al. . |
| 4,876,528 | 10/1989 | Walker et al. . |
| 4,909,074 | 3/1990 | Gerresheim et al. . |
| 5,006,844 | 4/1991 | Ohta et al. . |
| 5,192,929 | * 3/1993 | Walker et al. ........................ 340/444 |
| 5,218,862 | 6/1993 | Hurrell, II et al. . |
| 5,231,597 | 7/1993 | Kamatsu . |

(List continued on next page.)

FOREIGN PATENT DOCUMENTS 63-305011   12/1988   (JP) .

*Primary Examiner*—Patrick Assouad

(57) ABSTRACT

When the difference between the number of revolutions of each tire of a vehicle is judged by the tire air pressure warning device must be made under the condition that the number of revolutions of the four wheels must constantly be detected by different units, and processed at a high speed, and where the vehicle is travelling in a straight line, and at a point in time when all four wheels become at the same condition. In the case that all four wheels do not reach the same condition, the judgment of the difference in the number of tire revolutions at the tire air pressure warning device is prohibited. Also, using the vehicle running conditions, the most suitable tire air pressure judgment is carried out, and various noise generate when the vehicle is travelling do not have any effect, and the tire air pressure abnormality is detected with good accuracy, the detected signal from the wheel velocity sensors is carefully selected, and the reliability and accuracy of the tire air pressure judgment is improved. When the vehicle and/or the road surface is in a specific condition, by prohibiting the tire air pressure judgment, the reliability and accuracy of the tire air pressure judgment is increased. By permiting the tire air pressure judgment when within a vehicle velocity region, that is established using the road conditions, the reliability and accuracy of the tire air pressure judgment is improved.

16 Claims, 51 Drawing Sheets

U.S. PATENT DOCUMENTS

| | | | | |
|---|---|---|---|---|
| 5,239,469 | * | 8/1993 | Walker et al. | 364/424.03 |
| 5,248,957 | | 9/1993 | Walker et al. . | |
| 5,252,946 | | 10/1993 | Walker et al. . | |
| 5,327,346 | | 7/1994 | Goodell . | |
| 5,343,741 | * | 9/1994 | Nishihara et al. | 73/146.2 |
| 5,442,331 | | 8/1995 | Kichimoto et al. . | |
| 5,483,220 | * | 1/1996 | Kushimoto et al. | 340/444 |
| 5,497,657 | * | 3/1996 | Taguchi et al. | 73/146.2 |
| 5,498,072 | | 3/1996 | Shimizu et al. . | |
| 5,524,482 | * | 6/1996 | Kushimoto et al. | 73/146.3 |
| 5,525,960 | * | 6/1996 | McCall et al. | 340/438 |
| 5,553,491 | * | 9/1996 | Naito et al. | 73/146.5 |
| 5,557,552 | * | 9/1996 | Naito et al. | 364/565 |
| 5,724,266 | * | 3/1998 | Kishimoto et al. | 364/566 |
| 5,826,210 | * | 10/1998 | Izumi et al. | 701/70 |

\* cited by examiner $$D = \frac{C_x(F_1+F_3) - (F_2+F_4)}{2 \times \frac{1}{4}\Sigma F_i}$$

$$C_x = \frac{F_2 + F_4}{F_1 + F_3}$$

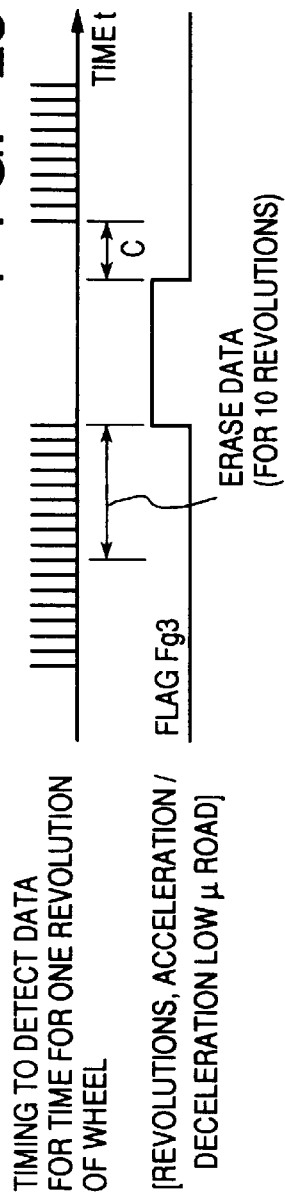
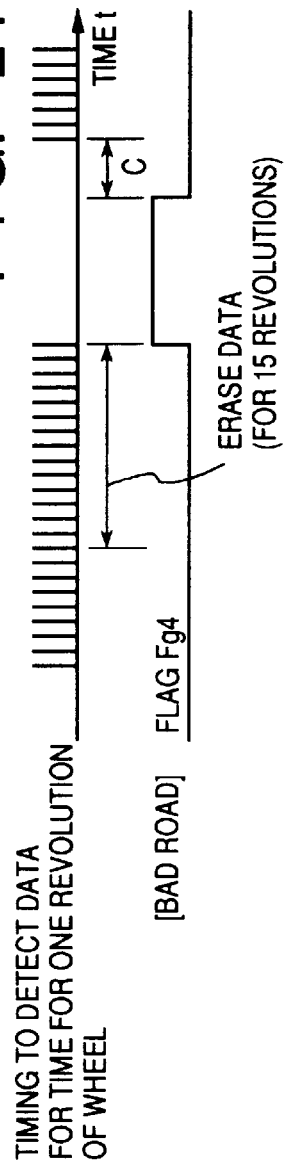

[BAD ROAD INDEX CALCULATION PROCESS FLAG Fak]

BEHAVIOR OF THE AIR PRESSURE
JUDGEMENT VARIABLE E,
WHEN TIRE PRESSURE IS NORMAL

BEHAVIOR OF THE AIR PRESSURE
JUDGEMENT VARIABLE E,
WHEN THE TIRE PRESSURE IS ABNORMAL

FIG. 61

μ TABLE

| | 0 | | | Vg | | | | LARGE |
|---|---|---|---|---|---|---|---|---|
| 0 | 1.0 | 1.0 | 2.0 | 2.0 | 3.0 | 3.0 | 4.0 | 4.0 | 5.0 |
| ↓ | 1.0 | 1.0 | 2.0 | 2.0 | 3.0 | 4.0 | 4.0 | 5.0 | 5.0 |
| | 1.0 | 1.0 | 2.0 | 3.0 | 3.0 | 4.0 | 4.0 | 5.0 | 5.0 |
| V | 1.0 | 1.0 | 2.0 | 3.0 | 4.0 | 4.0 | 5.0 | 5.0 | 5.0 |
| (Km/H) | 1.0 | 1.0 | 2.0 | 3.0 | 4.0 | 5.0 | 5.0 | 5.0 | 5.0 |
| ↓ | 1.0 | 1.0 | 2.0 | 4.0 | 4.0 | 5.0 | 5.0 | 5.0 | 5.0 |
| | 1.0 | 2.0 | 3.0 | 4.0 | 5.0 | 5.0 | 5.0 | 5.0 | 5.0 |
| LARGE | 1.0 | 2.0 | 3.0 | 5.0 | 5.0 | 5.0 | 5.0 | 5.0 | 5.0 |

TIRE AIR PRESSURE WARNING DEVICE

This application is a divisional of application Ser. No. 08/220,361, filed Mar. 24, 1994, now U.S. Pat. No. 5,826,210.

BACKGROUND OF THE INVENTION

According to the results of one survey, of vehicles running on the highway, the percentage of tires with substandard maintenance, when compared with the drive train, and the substandard maintenance percentage of other vehicle systems, is unexpectedly high. Breaking down that percentage, unsuitable tire air pressure covers more than half, and is the top cause, followed by lack of tire tread, and continuing with abnormal tire abrasion/wear and tear. Moreover, there are many drivers who have experienced a tire blowout while driving on the highway, and also as a result of the fear of a blowout while driving on the highway, the desire to equip cars with a tire air pressure warning device, or an equivalent device as standard equipment is rising, and, if tire air pressure warning devices can become less expensive, there are also requests to additionally equip cars in present use with tire air pressure warning devices.

On vehicles, including freight trucks, sensors that detect the air pressure of each individual tire have been provided. By way of slipping, electric waves, magneto-electric induction methods, systems that detect the tire air pressure of a rotating tire in real-time are known. According to these systems, an attempt to inform the driver of tire air pressure abnormalities, such as resulting from a tire puncture etc., is carried out. The above system, which detects the tire air pressure in real time, directly detects the tire air pressure, and has high reliability as an advantage, but the slipping, electric wave, electro-magnetic induction methods have the drawback such as, in order to transmit the air pressure information, the entire system is large scale, moreover, becomes very expensive, and has a problem that the actual use of the system is rather poor.

Also, along with the electrical devices becoming inexpensive in recent years, 4 wheel ABS devices and TRC (Traction Control) devices have come into use on passenger cars. In the case of providing 4 wheel ABS devices, and the like, a device for detecting the number of tire revolutions, a tire revolution detection device, is individually provided. It is made-up of a control system, consisting of individual brake and brake hydraulic devices, and utilizing the vehicle behavior, applies appropriate control.

With this, as described in Japanese Patent laid open 63-305011, a detection method for detecting an abnormal tire air pressure is proposed, in which the number of tire revolutions is summed in the diagonal direction, and it is judged as to whether or not the value of the difference between the sum of the two diagonal pairs of the number of tire revolutions and the difference between the number of revolutions between each tire is greater than that of a prescribed value. In order to eliminate the need for extra additional hardware added to the vehicle, for the aforementioned 4 wheel ABS equipped vehicles, by means of the already provided tire revolution detection device, it is thought that the detected number of tire revolutions can be used effectively to realize a tire air pressure warning device and the like.

That is to say, when running in a straight line, if a specific tire suffers a puncture and the air pressure in that tire rapidly decreases, as a result of the punctured tire's outer diameter becoming smaller than that of the other normal tires, the number of revolutions of the tire increases (because when traveling the same distance, the tire with the smaller diameter will revolve much more rapidly) as compared to the other normal tires. From this, detection of a tire that suffers a puncture, or loss in air pressure becomes possible.

SUMMARY OF THE INVENTION

Thus, it would be preferable to make the judgment of the difference of the number of tire revolutions on the tire air pressure warning apparatus side, but, because in order to make this judgment, at the very least, the number of tire revolutions for 4 tires, at all times, detected by individual units would have to be processed at a very high speed, making the control complicated, some kind of processing becomes necessary.

Furthermore, in order to judge the difference in the number of tire revolutions at the tire pressure warning device as mentioned above, the judgment must be carried out when the car is running in a straight line and all four tires are at the same condition. On one hand, when the car is stopped, the tires are not all at the same condition, the air pressure of each varies, moreover, directly after the tire is changed after a tire puncture, or directly after the tire is changed to a smaller emergency spare tire, the difference in the number of tire revolutions cannot be accurately judged by the tire air pressure warning device. In other words, in the case where all four tires are not at the same conditions, judging the difference in the number of tire revolutions by means of the tire air pressure warning device is prohibitive.

Therefore, considering the aforementioned problems, as an object of the present invention, in order to make a tire air pressure warning device in which the difference in the number of tire revolutions is judged by the tire warning device, at the very least, the number of revolutions for 4 tires are detected by separate units, can be processed, and when the four wheels all are in the same condition the processing can be performed.

It is preferable for the difference on the number of revolutions of a tire to be judged by the tire air pressure warning device, but, because for this judgment, at the very least the number of revolutions of 4 tires must be detected constantly by separate units, the control becomes complicated, and there is a need for some processing. Because of this, after adding the number of revolutions of the tires located diagonally, determining the difference between the diagonal pairs, and, after dividing by double the average value of the number of tire revolutions, a deviation value is found, and the deviation value is compared to a prescribed comparison value (a deviation width), and in the case when this value is exceeded, it can be thought that the tire air pressure can be judged to be abnormal.

However, if this comparative value is fixed, it becomes impossible to suitably make a judgment in regards to the vehicle running conditions. In other words, for example, if the vehicle velocity is large, it is obvious that the result of the number of revolutions is large, and because the change in the deviation valueincreases, it becomes greater than the prescribed comparison value, and an accurate judgment of the tire air pressure becomes unfeasible.

Therefore, as a result of the previous problem, a further goal of the present invention, in the case of a tire air pressure warning device in which the difference in the number of tire revolutions is judged by the tire air pressure warning device, the vehicle running conditions are utilized and suitable tire air pressure judgment is performed.

Moreover, in the case where the difference of the number of tire revolutions is judged by the tire air pressure warning device, in order to make a decision, because, at the least, the number of tire revolutions for four tires must be constantly, by separate units, processed at a high speed, some kind of processing becomes necessary. Because of this, after the number of tire revolutions for tires that are located diagonally are added, the difference in the number of revolutions between the diagonal pairs is determined, then is divided by double the average value of tire revolutions, to obtain the deviation value, which is then compared with a comparative value (the deviation width), and in the case when it exceeds this prescribed value, it can be thought that a tire air abnormality has occurred.

However, when the comparison with this comparative value is performed, because the deviation value is not stable, there are cases when the tire abnormal air pressure cannot be judged. In short, due to noise, caused by variations in road conditions and vehicle running conditions, etc., as the prime factor, it becomes impossible to perform an accurate comparison.

Therefore, with regards to the aforementioned problem, as a further goal of the present invention, a tire air pressure warning device in which the number of tire revolutions is determined by the tire pressure warning device, it is not effected by the occurrence of various noise generated when the car is running, and tire pressure abnormality can be detected with good precision.

With the manufacturing error of each vehicle tire as large as 0.3%, but, because the tire radius change (while moving) due to tire air pressure decrease is often also in the 0.3% range, a rather high degree of accuracy is needed for the tire air pressure judgment.

And, as for the aforementioned tire air pressure judgment, it is carried out when the vehicle is at a regular running condition, based on the detected signal from the wheel velocity sensor, but even when the vehicle is at regular running conditions, when the vehicle is on a low friction road surface or climbing up a hill, etc., the amount of slip of the drive wheels gets larger, or the intermittent existence of gravel, snow covered roads, as well as other factors, can lead to the amount of drive wheel slip growing larger. Furthermore, when the slip of the drive wheels is large, because the accuracy of the detected wheel velocity signal grows worse, and because the tire air pressure judgment accuracy decreases, the detected wheel velocity signal must be selected carefully. Unless a truly valid signal is utilized for the detected wheel velocity, and the wheel velocity is determined with a high degree of accuracy, it will be difficult to improve the accuracy and dependability of the tire air pressure judgment.

Therefore, a further goal of this invention is to carefully select the detected signal from the wheel velocity sensor, and to raise the accuracy and dependability of the tire air pressure judgment.

Because, when the tire air pressure is at a certain level above or below normal conditions, driving the vehicle is not recommended, beyond the current technology, various tire air pressure warning devices are proposed.

Also, the tire air pressure warning device noted in the aforementioned patent laid open is constructed so that the tire air pressure judgment is not carried out when the car is accelerating or decelerating, and nothing is proposed regarding techniques to increase the accuracy or the reliability of the tire air pressure judgment taking into consideration the road conditions or the vehicle conditions.

According to the road conditions (road surface $\mu$, bad roads, hills, canting road surfaces, etc.), the amount of drive wheel slip increases, the load on the 4 wheels becomes uneven, the wheel velocity of the 4 wheels also becomes uneven, and therefore the accuracy of the detected wheel velocity decreases.

According to the vehicle conditions (acceleration or deceleration, loaded heavily, running with tire chains, etc.), the slip of the drive wheels increases, and because the load on the front and rear wheels is not uniform, the accuracy of the detected wheel velocity decreases, and because the tire diameter increases, the detected wheel velocity decreases, the accuracy of the detected wheel velocity decreases, and the accuracy and reliability of the tire air pressure judgment decreases.

Therefore, as a further goal of the present invention, when the vehicle or road surface is of a specified state, the tire air pressure judgment is prohibited in order to raise the accuracy and reliability of the tire air pressure judgment.

And furthermore, in the aforementioned tire pressure warning device patent disclosure, the tire air pressure judgment is not carried out when the vehicle is accelerating or decelerating, but nothing is proposed regarding the relationship of the the tire air pressure judgment to the condition of the road surface (friction state, bad roads, slanted road) or the vehicle velocity.

Generally speaking, at low velocities, because the number of data detected from the wheel velocity sensor decreases, the accuracy of the detected wheel velocity decreases, furthermore, at high velocities, because the amount of slip of the drive wheels becomes larger, and because the accuracy of the detected wheel velocity decreases due to the load between the front wheels and the rear wheels fluctuating, the accuracy and reliability of the tire air pressure judgment decreases.

Particularly, as the drive wheel slip amount increases with the road surface friction coefficient, $\mu$, decreasing, the accuracy of the detected wheel velocity decreases, and the accuracy and reliability of the tire air pressure judgment decreases. When running on bad road surfaces, because the scattering of the wheel velocity of the free and the drive wheels grows larger, and the accuracy of the detected wheel velocity decreases, and the accuracy and reliability of the tire air pressure judgment decreases.

When climbing up a hill, the slip amount of the drive wheels increases, and, similarly to the condition when accelerating, the accuracy of the detected wheel velocity decreases, and the accuracy and reliability of the tire air pressure judgment decreases.

Therefore a further goal of this invention is to increase the accuracy and reliability of the tire air pressure judgment, by permitting the tire air pressure judgment, when a vehicle velocity range is established utilizing the road surface conditions.

When the normal vehicle tire air pressure is 2 $Kg/cm^2$, and when the air pressure falls to 1 $Kg/cm^2$, the change in tire radius is approximately 0.3%. Because the tire manufacturing defect is also approximately 0.3%, in order to determine a decrease in tire air pressure using the 4-wheel wheel velocity technique, it is extremely difficult to discriminate between the tire manufacturing error and a decrease in the tire pressure.

In the device of the aforementioned patent laid open, technology for adjusting the control gain considering the loading and the tire special characteristics is suggested, but, regarding concrete techniques for correcting for the tire manufacturing error in order to raise the accuracy of the tire air pressure judgment, nothing is proposed.

Accordingly, even if initial settings processing is carried out in order to correct for the tire manufacturing error and tire special characteristics, because the velocity at which the initial settings are carried out and the velocity at which the tire air pressure judgment is carried out are not restricted to being the same, it is difficult to raise the tire air pressure judgment accuracy by uniformly applying the results of the initial setting processing, therefore, the tire air pressure judgment reliability decreases.

Furthermore, as the tire is used, it suffers from wear and tear, and because the friction characteristics change, the aforementioned settings processing process is the limit to increasing the accuracy for the tire air pressure judgment, the tire air pressure judgment accuracy cannot be sufficiently increased.

Therefore as a further goal for this invention, the velocity of the initial setting processing and the velocity at the actual tire air pressure judgment are added, and by correcting for the judgment threshold value the accuracy and reliability of the tire air pressure judgment of the tire air pressure warning device is improved. Furthermore, by correcting the judgment threshold value, by means of outside the loop control, raising the accuracy and reliability of the tire air pressure judgment for the tire air pressure warning device is proposed.

The vehicle tire air pressure usually being 2 Kg/cm$^2$, when the air pressure falls to 1 Kg/cm$^2$, the change in tire radius is around 0.3%. Because the tire manufacturing defect is also approximately 0.3%, in order to determine a decrease of tire air pressure using the 4-wheel, wheel velocity technique, it is not easy to discriminate between the tire manufacturing error and a decrease in the tire pressure. In the aforementioned patent laid open, by considering the loading or the tire characteristics, technology for changing the control gain is suggested, but with regards to concrete technology for correcting for the tire manufacturing error or special characteristics, nothing is proposed.

Accordingly, in order to compensate for the tire manufacturing error and tire special characteristics by means of the initial settings process, a compensation coefficient, which compensates for the tire manufacturing error or tire special characteristics, is calculated in advance. Using this compensation coefficient, the tire air pressure judgment is carried out.

As for this initial setting process, it is preferable for it to be carried out when the car is running in a straight line, but when a temporary tire is a being used or when the vehicle is running on a canted surface, because the steering angle and wheel velocity are influenced, there are cases when the initial setting procedure cannot be completed smoothly.

Therefore, as a further goal of this invention, even in cases when a temporary tire is attached, or in cases when the vehicle is on a canted road surface, etc., a tire air pressure warning device which can precisely carry out the initial settings process is proposed.

In order to solve the aforementioned first goal, in this invention, a tire air pressure warning device, that determines a tire air pressure abnormality, utilizing a detected signal from a vehicle wheel sensor that individually detects the tire revolving state of each of the vehicle's tires, is provided with first unsettled coefficient means, which establishes the unsettled coefficient before the aforementioned tire air pressure abnormality judgment, decided based on the aforementioned initial conditions for each tire, and, prohibition means, which prohibits the aforementioned judgment until the said unsettled coefficient is established. Considering the initial state of each tire, the tire air pressure abnormality is more precisely determined from a prescribed calculation equation based upon the difference between the number of revolutions of each tire.

Also, it is preferable, for the tire air pressure warning device, which utilizes a detected signal from wheel velocity sensors which individually detect the revolving state of each of the vehicle's tires, to judge an abnormality in the tire air pressure and outputs a warning signal. Before the aforementioned determination, the unsettled coefficient is established based on the aforementioned initial state of each tire. When in the case that the said unsettled coefficient is indefinite and does not satisfy a prescribed value, the invention is equipped with second unsettled coefficient means, which, determines the unsettled coefficient again, based on the tire initial state, and prohibition means, which prohibits the aforementioned tire abnormality judgment until the unsettled coefficient is established, and when the vehicle is running, common noise, which is a primary cause for instabilities, is eliminated, and tire air pressure abnormality is more precisely judged from the prescribed calculation equation, based on the difference between the number of revolutions of each tire.

And, it is preferable, for a tire air pressure warning device, which utilizes a detected signal from wheel velocity sensors which individually detect the revolving state of each of the vehicle's tires, to judge an abnormality in the tire air pressure and outputs a warning signal, to be equipped with:

a first unsettled coefficient establishing means, which establishes the unsettled coefficient based upon the aforementioned tire state of each tire, before the aforementioned judgment, and, prohibition means, which prohibits the aforementioned judgment until the unsettled coefficient is established and, warning means, for when, the unsettled coefficient, determined from the said first unsettled coefficient means, does not satisfy a prescribed value, the tire air pressure is judged to be abnormal, and said result is successively informed to the driver, etc.

This invention, which determines a tire air pressure abnormality and outputs a warning signal, utilizing a detected signal from a vehicle wheel sensor that individually detects the tire state of each of the vehicle's tires, in order to solve the previously mentioned second goal, judges a tire air pressure abnormality from a comparison of a deviation width using a prescribed range and a deviation value determined from the prescribed calculation equation based upon the difference in revolutions of each tire, and is equipped with deviation width changing means, which, in order to inform the results of said judgment, applies the vehicle running condition to changes the aforementioned prescribed deviation width. The deviation width is not fixed and the most applicable deviation width for a vehicle velocity is established, and the air pressure abnormality is judged.

Also, it is preferable, for the tire air pressure warning device, that determines a tire air pressure abnormality, utilizing a detected signal from a vehicle wheel sensor that individually detects the tire revolving state of each of the vehicle's tires, and outputs a warning signal, to be equipped with deviation width changing means. With the judgment of the tire air pressure abnormality being from a comparison of a deviation width, having a prescribed range, and a deviation value, determined from the prescribed calculation equation based upon the difference in revolutions of each tire, and in order to inform the results of said judgment, applying the vehicle running condition, the aforementioned prescribed deviation width is changed. The deviation width is not fixed and the most applicable deviation width reflecting the vehicle velocity is set, and the air pressure abnormality is judged.

This invention, which determines a tire air pressure abnormality and outputs a warning signal, utilizing a detected signal from a vehicle wheel sensor that individually detects the tire state of each of the vehicle's tires, in order to solve the previously mentioned third goal, is equipped with judgment means. Such that, after the deviation value, determined from the prescribed calculation equation based upon the difference in revolutions of each tire, is obtained as either positive or minus, a tire air pressure abnormality judgment, determined from a comparison of the above deviation value with the deviation width, using a prescribed width, is carried out within a prescribed period of time. The invention is also equipped with specification means, for a tire air pressure warning device provided with warning means for informing the said judgment results, such that if the integral of the range (amount) that the previous positive or negative value exceeded the aforementioned deviation width within the aforementioned previous time, becomes greater than a prescribed value, the tire is specified to be a tire with abnormal air pressure. The specified tire is informed to the user then, according to the aforementioned warning means.

And, it is preferable for a tire air pressure warning device, which determines a tire air pressure abnormality, utilizing a detected signal from a vehicle wheel sensor that individually detects the tire state of each of the vehicle's tires, and outputs a warning signal, to be equipped with judgment means, such that, after the deviation value, determined from the prescribed calculation equation based upon the difference in revolutions of each tire, is obtained as either positive or negative value, a tire air pressure abnormality judgment, determined from a comparison with the deviation width using a prescribed width and the above deviation value is carried out within a prescribed period of time, and also equipped with specification means, for a tire air pressure warning device provided with warning means for informing the said judgment results, such that if the integral of the range (amount) that the previous positive or negative value exceeded the aforementioned deviation width, becomes greater than a prescribed value, within the aforementioned previous time, the user is notified of the said specified tire by the aforementioned warning means.

In this invention, regarding a tire air pressure warning device which utilizes a detection signal from wheel velocity sensors for all four wheels, and detects a drop in the tire air pressure and outputs a warning, in order to solve the aforementioned fourth goal, it is equipped with wheel velocity sensor, which detects the wheel velocity for each of the four vehicle wheels. It is equipped with data collection means, such that the detected pulse signals from the four wheel velocity sensors are read and counted, and the four wheel relative wheel velocity data, acquired when all of the count data passes a prescribed value, is stored in memory. The invention is also equipped with start reset means, such that, when the reading of the detected signals from the aforementioned wheel velocity sensors in the case that within a first fixed time interval, the detected signal from the four wheel velocity sensors is not inputted, the count values for the four detected signals are reset in the aforementioned data collection means. In the data collection means, each detected pulse signal from the four wheel velocity sensors is read and counted, as each and every acquired count value passes a prescribed value, the four wheel relative wheel velocity data is stored in memory. Regarding the start reset means, when the reading of the detected signal is started, and when, within a first fixed time interval, the detected signals from the four wheel velocity sensors are not input, the four count values for the detected signals in the data collection means are reset.

When the wheel revolution is unstable, the wheel velocity of any one of the non-driven wheels decreases, or when one of the wheel velocities of the driven wheels increases, because the pulse signal from the four wheel velocity sensors cannot be inputted within the first fixed time interval. In these cases, as the four detected signal count variables are reset, the wheel velocity detection, in cases when the wheel revolution state is in an unstable condition, is canceled, and the reliability of the detected signal can be improved. By means of this, the accuracy and the reliability of the tire air pressure judgment can be increased.

And, it is preferable for a tire air pressure warning device, that utilizes the detected signals from the wheel velocity sensors of the four wheels of the vehicle and determines a tire air pressure decrease and outputs a warning signal, to be equipped with wheel velocity sensors, such that the wheel velocity of the four vehicle wheels is detected, and data collection means, where the aforementioned detected pulse signals from the four wheel velocity sensors are read and counted, and the four wheel relative wheel velocity data, acquired whenever all count data passes a prescribed value, is stored in memory. It is also preferable to be equipped with a final reset means, such that, within a second fixed time interval, from the time when a count signal from the detected signals of any of one wheel velocity sensors has passed the aforementioned prescribed value, when in the case that the count value from the detected signals of the other wheel velocity sensors has not passed the aforementioned value, the four count values for the detected signals in the aforementioned data collection means are reset. The wheel velocity detection, when the wheel revolution state is in an unstable condition, is canceled, and the reliability of the detected signal can be improved. By means of this, the accuracy and the reliability of the tire air pressure judgment can be increased.

And, it is preferable for a tire air pressure warning device, that utilizes the detected signals from the wheel velocity sensors of the four wheels of the vehicle and determines a tire air pressure decrease and outputs a warning signal, to be equipped with with wheel velocity sensors, such that the wheel velocity of the four vehicle wheels is detected, and data collection means, where the aforementioned detected pulse signals from the four wheel velocity sensors are read and counted, and the four wheel relative wheel velocity data, acquired whenever all count data passes a prescribed value, is stored in memory. And equipped with start reset means, such that, when the reading of the detected signal from the aforementioned wheel velocity sensors in the case that within a first fixed time interval the detected signal from the four wheel velocity sensors is not inputted, the count values for the four detected signals are reset in the aforementioned data collection means. It is also preferable to be equipped with a final reset means, such that, within a second fixed time interval, from the time when a count signal from the detected signals of any of one wheel velocity sensors has passed the aforementioned prescribed value, when in the case that the count value from the detected signals of the other wheel velocity sensors has not passed the aforementioned value, the four count values for the detected signals in the aforementioned data collection means are reset. And then, in the data collection means, each of the four pulse signals from the wheel velocity sensors are read and counted, when the each and all of the count values reach the prescribed value, the four wheel relative data is stored in memory. In the start reset means, when the reading of the detected signal is begun, when in the case that the detected signal from the four wheel velocity sensors cannot be inputted within the first fixed time interval, the count values for the four detected signals are reset in the data collection means.

When the wheel revolution is unstable, the wheel velocity of any one of the non-driven wheels decreases, or when one of the wheel velocities of the driven wheels increases, because the pulse signal from the four wheel velocity sensors cannot be inputted within the first fixed time interval. In cases like this, as the four detected signal count variables are reset, the wheel velocity detection, in cases when the wheel revolution state is in an unstable condition, is canceled, and the reliability of the detected signal can be improved. By means of this, the accuracy and the reliability of the tire air pressure judgment can be increased. And, by means of the start reset means, after the count value for the detected signal is reset, at the count restarting means, because the counting of each detected signal is restarted by the restart means, the detection from the wheel velocity sensor does not stagnate.

As for the data collection means, each of the four pulse signals from the wheel velocity sensors are read and counted, when the each and all of the count values reach the prescribed value, the four wheel relative data is stored in memory. In the final reset means, from the time when the count signal from one of the detected signals of any of the wheel velocity sensors has passed the aforementioned prescribed value, when in the case that the count values from the detected signals of the other wheel velocity sensors have not passed the aforementioned prescribed value within a second fixed time interval, the four detected signals are reset in the data collection means. And, when the wheel revolving state is unstable, because the count values for the four detected values do not pass the second fixed time interval, in cases like this, as the count values for the four detected signals get reset, when the wheel revolving state is unstable, the wheel velocity detection is canceled, and the reliability of the detected signal can be improved. By means of this, the accuracy and reliability of the tire air pressure judgment can be improved. Because the data collection means, start reset means, and the final reset means are provided, when both when the count is started, and when the count is finished, the detected signal is carefully selected, and the detected signal reliability is raised, thus, the tire air pressure judgment accuracy and reliability can be improved.

This invention, a tire air pressure warning device which utilizes the wheel velocities of each of the vehicle's 4 wheels and determines if there is an air pressure loss, and outputs a warning, in order to solve the previously mentioned seventh goal, is equipped with wheel velocity detection means that detects the wheel velocity for the four wheels of the vehicle, tire air pressure judgment means, which, utilizing wheel velocity detected by the aforementioned wheel velocity detection means judges the if there is a decrease in the tire air pressure, specific condition determining means, which determines if said vehicle or road surface is at a specific condition that is not suitable for the tire air pressure judgment, and prohibiting means, such that, when in said specific condition determining means a specific condition is determined, the tire air pressure judgment is prohibited. With the velocity of the vehicle's for wheels detected by the wheel velocity detected means, at the tire air pressure judgment means, utilizing the detected wheel velocities, it is judged whether or not there has been a decrease in tire air pressure. If the specific condition determining means determines that the vehicle or the road surface is in a state that is not suitable for the tire air pressure judgment, the prohibition means, when a specific condition is determined, prohibits the tire air pressure judgment in the tire air pressure judgment means. Regarding the aforementioned special conditions, when the conditions are not suitable for the tire air pressure judgment, by prohibiting the tire air pressure judgment, the detected wheel velocity accuracy is raised, and the tire air pressure judgment accuracy and reliability is can be improved.

In order to solve the previously mentioned sixth goal, in this invention, a tire air pressure warning device which utilizes the wheel velocities of each of the vehicle's 4 wheels and determines if there is an air pressure loss, and outputs a warning, is provided with wheel velocity detection means, which detects the wheel velocity for each of the four vehicle wheels, tire air pressure judgment means, that utilizes the wheel velocity detected from the wheel velocity detection means, and judges if the tire air pressure has decreased, road surface condition ascertaining means, which ascertains the condition of the road surface, and vehicle velocity region setting means, through which, utilizing the road conditions ascertained from the road condition ascertaining means, the allowed velocity range for the tire air pressure judgment is set. The vehicle wheel velocity detection means detects the wheel velocity for the four vehicle wheels. The tire air pressure judgment means, utilizes the wheel velocity detected in the wheel velocity detection means and judges if the tire air pressure has decreased. By means of the road surface ascertaining means, the road surface condition is ascertained, and in the vehicle velocity region setting means, by applying the result of the road surface ascertaining means, regarding the tire air pressure judgment means, the vehicle velocity region, within which the air pressure judgment is allowed, is determined. In this manner, and by means of the established vehicle velocity region, according to the road surface, the tire air pressure judgment is permitted, and the accuracy of the wheel velocity detection is raised, and accuracy and the reliability of the tire air pressure judgment can be improved.

In this invention, a tire air pressure warning device which utilizes the wheel velocities of each of the vehicle's 4 wheels and determines if there is an air pressure loss, and outputs a warning, in order to attain the aforementioned seventh goal is provided with: wheel velocity detection means, where the wheel velocity for all four of the vehicle wheels is detected, initial settings processing means, where, using the said wheel velocity from the wheel velocity detection means, at a prescribed vehicle velocity, initial settings processing is carried out in order to compensate for the initial state of the four tires, and air pressure judgment processing, in which the detected wheel velocity from the wheel velocity means and the processing results of the initial processing means are received, and according to the initial processing means, for a fixed period of time or prescribed running distance after the processing, a second vehicle velocity region broader than that of the first vehicle velocity region, where the tire air pressure judgment process is carried out. The wheel velocity detection means detects the wheel velocity. Then the initial setting processing, utilizing the wheel velocity detected from the wheel velocity detection means, for a first prescribed vehicle velocity region, caries out the processing for the initial settings in order to compensate for the initial conditions of the four tires. And, the air pressure judgment means, receiving the wheel velocity and the initial settings processing results, and, according to the initial settings processing means, for a fixed period of time or a prescribed distance traveled after the processing, at a second vehicle velocity region, broader than the first vehicle velocity region, the tire air pressure judgment is carried out.

In this manner, because the initial settings are carried out in order to compensate for the initial conditions of the four tires, and because the tire air pressure judgment can be carried out, compensating for the manufacture error of a tire after changing, or special tire characteristics, the accuracy and reliability of the tire air pressure can be improved.

Also, the comparatively narrow vehicle velocity region, the first vehicle velocity region deemed suitable by the detected wheel velocity, established by the initial settings processing, while raising the accuracy, the second vehicle velocity region, which is a broader region than the first, because the tire air pressure judgment can be carried out over a wider vehicle velocity region, is superior in practicality.

In order to attain the aforementioned eighth goal, this invention, a tire air pressure warning device which utilizes the wheel velocities of each of the vehicle's 4 wheels and determines if there is an air pressure loss, and outputs a warning, is provided with: wheel velocity detection means, which detects the velocity of each of the four wheels of the vehicle, initial settings processing means, such that, utilizing the detected wheel velocity output from the wheel velocity detection means, when a prescribed coefficient calculation conditions are satisfied, a compensation coefficient, to compensate for the initial conditions of the four tires, is calculated, initial settings commencement switch means, to order the said initial settings processing means to commence with the initial settings, and condition mitigation means, wherein after the commencement order has been input from the initial settings commencement switch means, when if the fixed period of time has expire, but the initial settings have not been completed, the said coefficient calculation is mitigated. From the wheel velocity determination means, the wheel velocity is determined, and then when the initial settings commencement order is input from the initial settings commencement switch, the initial settings processing means, utilizing the detected wheel velocity, and when the coefficient calculation conditions are fulfilled, the compensation coefficient, to compensate for the initial conditions of the four tires, is calculated. When, if after the said commencement order is input, but after the fixed period of time, the initial settings have not been completed, the said coefficient calculation condition is mitigated.

Therefore, according to the tire attached to the vehicle or the state of the road surface, when, if after the initial settings are commenced and a fixed period of time have passed, and the initial settings processing has not been completed, because the said coefficient calculation condition is mitigated, the ending of the initial settings processing is promoted, the compensation coefficient is calculated, and the compensation coefficient can be utilized by the tire air pressure judgment.

And, it is preferable, for a tire air pressure warning device which utilizes the wheel velocities of each of the vehicle's 4 wheels and determines if there is an air pressure loss, and outputs a warning, provided with: wheel velocity detection means, which detects the velocity of each of the four wheels of the vehicle, initial settings processing means, such that, utilizing the wheel velocity output from the wheel velocity detection means, when a prescribed coefficient calculation condition is established, a compensation coefficient, to compensate for the initial conditions of the four tires, is calculated, initial settings commencement switch means, to order the said initial settings processing means to commence with the initial settings, and condition mitigation means, where after the commencement order has been input from the initial settings commencement switch means, when if within a prescribed distance the initial settings have not been completed, the said coefficient calculation is mitigated. When, after the commencement order has been inputted, if the initial settings processing has not been completed even if a prescribed distance has been covered by the vehicle, the said coefficient calculation condition is mitigated.

Therefore, according to the tire attached to the vehicle or the state of the road surface, when even if after the initial settings are commenced and a prescribed distance has been covered by the vehicle, but the initial settings have not been completed, the said coefficient calculation condition is mitigated, the completion of the initial settings is promoted, and a compensation coefficient is calculated. This calculation coefficient can be utilized by the tire air pressure judgment.

And, it is preferable, for a tire air pressure warning device which utilizes the wheel velocities of each of the vehicle's 4 wheels and determines if there is an air pressure loss, and outputs a warning, provided with: wheel velocity determination means, which determines the velocity of each of the four wheels of the vehicle, initial settings processing means, such that, utilizing the wheel velocity output from the wheel velocity means, when a prescribed coefficient calculation condition is established, a compensation coefficient, to compensate for the initial conditions of the four tires, is calculated, initial settings commencement switch means, to order the said initial settings processing means to commence with the initial settings, and condition mitigation means, wherein after the commencement order has been input from the said initial settings commencement switch means, when the commencement order has been input a second time, the said coefficient calculation condition is mitigated. When, after the aforementioned commencement order has been inputted, the commencement order is input a second time, the said coefficient calculation condition, in the condition mitigation means, is mitigated.

Therefore, according to the tire attached to the vehicle or the state of the road surface, when if the initial settings processing is not completed smoothly, and the initial settings commencement switch means is operated a second time. because the aforementioned coefficient calculation condition is mitigated, the end of the initial settings is promoted and the compensation coefficient is calculated. This compensation coefficient can be utilized by the tire air pressure judgment.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constituted a part of the specification, illustrate embodiments of the invention and, together with the description, serve to explain the principles of the invention.

FIG. 23 illustrates a time chart for the timing of the detected data when revolving, accelerating/decelerating, low $\mu$ road.

FIG. 24 is a time chart for the timing of the detected data when the road is bad.

FIG. 25 is a time chart for the timing of the detected data for 400 wheel revolutions.

FIG. 61 is a characteristic chart.

DETAILED DESCRIPTION OF THE PREFERRED EMBODIMENTS

Figures 1, 2A, 2B:
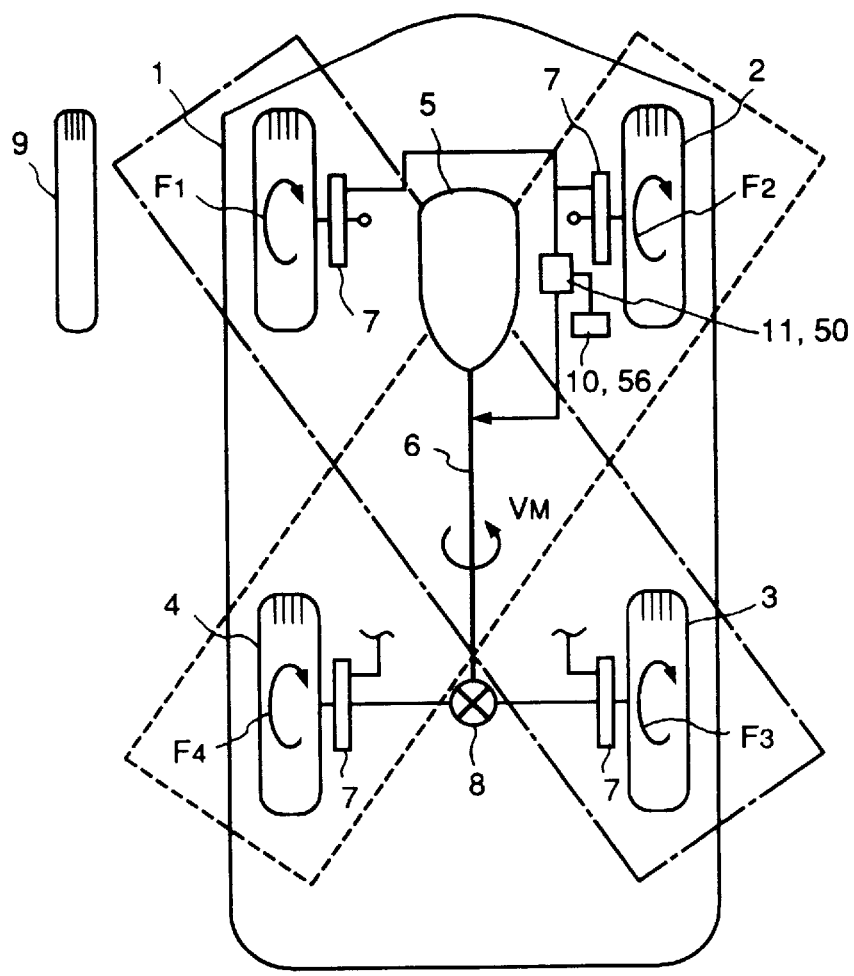
FIG. 1 shows the outline of the make-up of the tire air pressure warning device.
FIG. 2A is the equation for determining the differential value D, from the differential value and the unsettled coefficient equations.
FIG. 2B shows the equation for determining the unsettled coefficient Cx.

The preferred embodiments of the present invention will be described in detail in accordance with the accompanying drawings.

In this preferred embodiments, which is an embodiment of the case of an application of this invention as a tire air pressure warning device for a rear wheel drive passenger vehicle equipped with anti-skid brakes, ABS and TRC, etc. are installed equipment.

For this purpose, tire revolution detection device 7, which detects the number of tire revolutions Fn, is individually provided to front, rear, right, left tires 1, 2, 3, and 4, constructed such that they can furnish the control device 11 with the number of tire revolutions F1, F2, F3, F4, that are necessary for the control of the common knowledge ABS equipment (Anti-lock Brakes) and TRC equipment (Traction Control). Also, in control device 11, a warning lamp 10 to inform the driver of the tire air pressure abnormality. And a rear differential 8 connects the rear wheels in order to drive the car to the engine 5 through the drive shaft 6, where it is constructed such that the number of revolutions of the drive shaft, VM, can also be input to control device 11.

And then, so it occupies as little trunk space as possible, an emergency temporary tire, with a width and a diameter smaller than normal, as is common knowledge, is provided so that it may be used for emergency use, i.e. when there is a flat tire.

Regarding the above construction, at control device 11, in order to simplify the number of tire revolutions F1, F2, F3, F4, the deviation value D is determined as shown in FIG. 2A as well as the unsettled coefficient, Cx, shown in FIG. 2B. In other words, the number of tire revolutions, Fn, of the pairs of tires one and three, on the diagonal enclosed by the line of alternating dots and dashes, and tires 2 and 4, on the diagonal enclosed by the dashed line are separately added, and then as F1+F3, after being multiplied by the unsettled coefficient, Cx, as a result of being divided by double the average number of tire revolutions, the deviation value D can be determined.

Tire air pressure abnormality detection is carried out by means of the comparison carried out on the deviation value D returned in this manner, and the deviation width DS, which has a prescribed width and will be discussed later, which is the fundamental process. Due to this comparison, the tire air pressure abnormality judgment can be carried out at a high speed (the number process steps within the control device are minimized), and the hardware construction of control device 11 can be kept to the necessary minimum, and it is possible to realize a decrease in cost.

Also, the unsettled coefficient of FIG. 2B, as it is found as the result of dividing F2+F4 by F1+F3, can be used in order to return the deviation value to the initial condition. Usually, when the vehicle begins to move, each of the tires are not at exactly the same condition, it is normal for the air pressures of each to be different. And in the case just after a flat tire is repaired the tire has just been changed, or after the tire has been changed to an emergency tire with a smaller diameter, or if the vehicle velocity is not enough, the tires will not all be in the same state, and difference in the number of revolutions cannot be precisely judged by the tire air pressure warning device. Accordingly, before the deviation value D is calculated, after the coefficient Cx is found, by multiplying it by F1+F3, correction is carried out for tire changes, etc., due to flat tire repair.

Therefore, in the case when all tires are normal, the unsettled coefficient Cx has a value close to "1," and does not have much of an influence on the deviation value D. But, for example, in the case of tire 1 being an emergency use tire 9, on one hand, because the F1 value becomes larger, Cx becomes a value smaller than one. And on the other hand, the air pressures of the other tires, 2, 3, and, 4, becomes abnormally low, and the in the case when the unsettled coefficient Cx drastically differs from "1," the judgment conditions are not satisfied, and, as will be shown later, a warning is made to occur.

Figure 3:
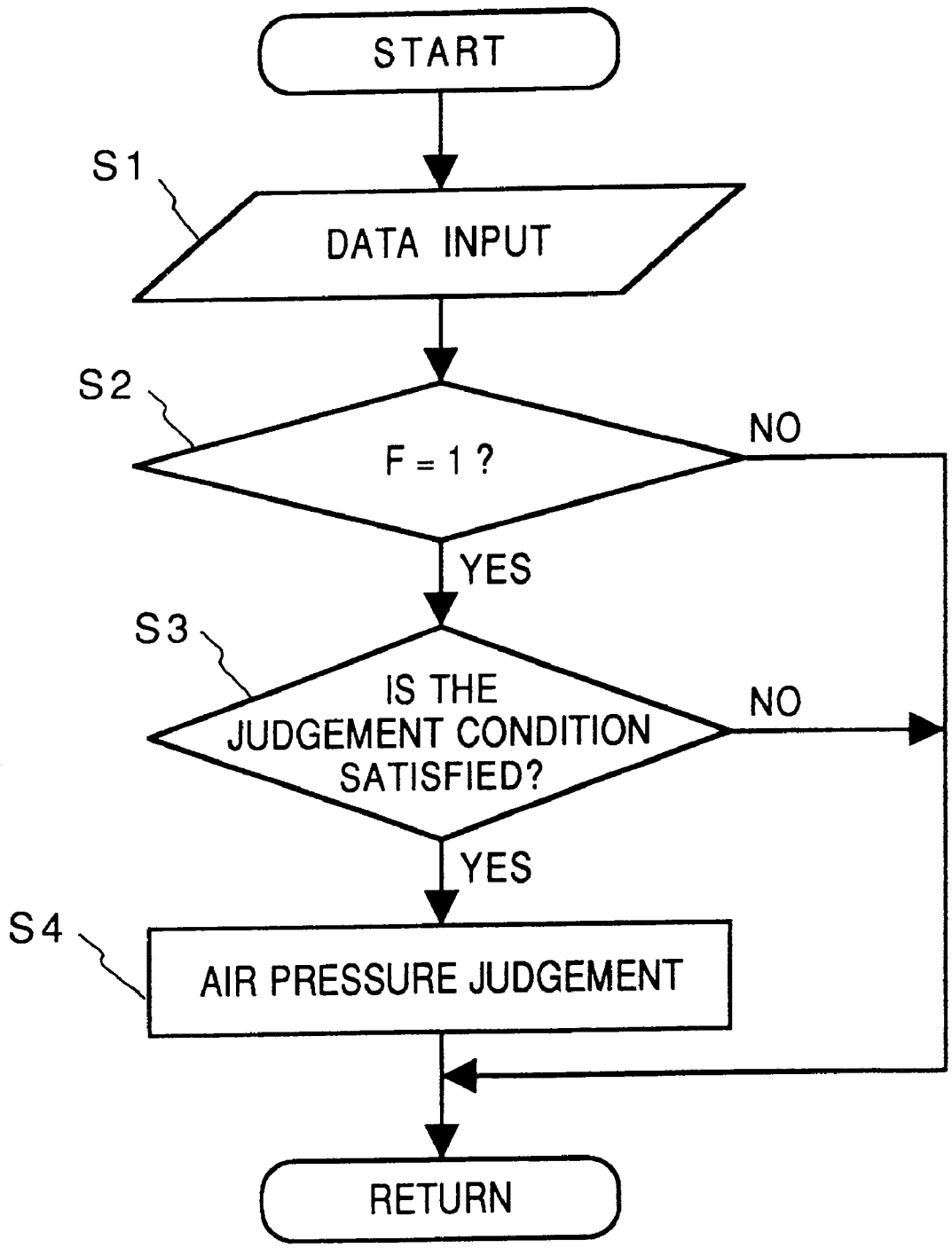
FIG. 3 is a flowchart that shows the general manner in which an abnormality judgment for the tire air pressure is carried out.

Next, FIG. 3 shows an overview of the manner in which the tire air pressure abnormality judgment is carried out from the difference in the number of tire revolutions, hereinafter, each flowchart can be thought to make-up a part of the flowchart in FIG. 3, and suitably fit somewhere within the flowchart of FIG. 3. As for the main flowchart 3, the process begins in step S1, where the number of tire revolutions data, etc. is appropriately input, and the process continues to step S2, and whether of not flag 1 is signaled or not is judged. Regarding this step S2, in the case when flag 1 is signaled, the process continues on to step S3, whether the unsettled coefficient Cx is an abnormal value or not is judged, etc., and the judgment as to whether the judgment conditions are satisfied or not is carried out. If the judgment conditions are satisfied, the judgment is performed, and then the process continues to step S4, and the tire air pressure judgment is carried out. If in the case that, in step S2, the flag 1 is not signaled, the process returns.

Figure 4:
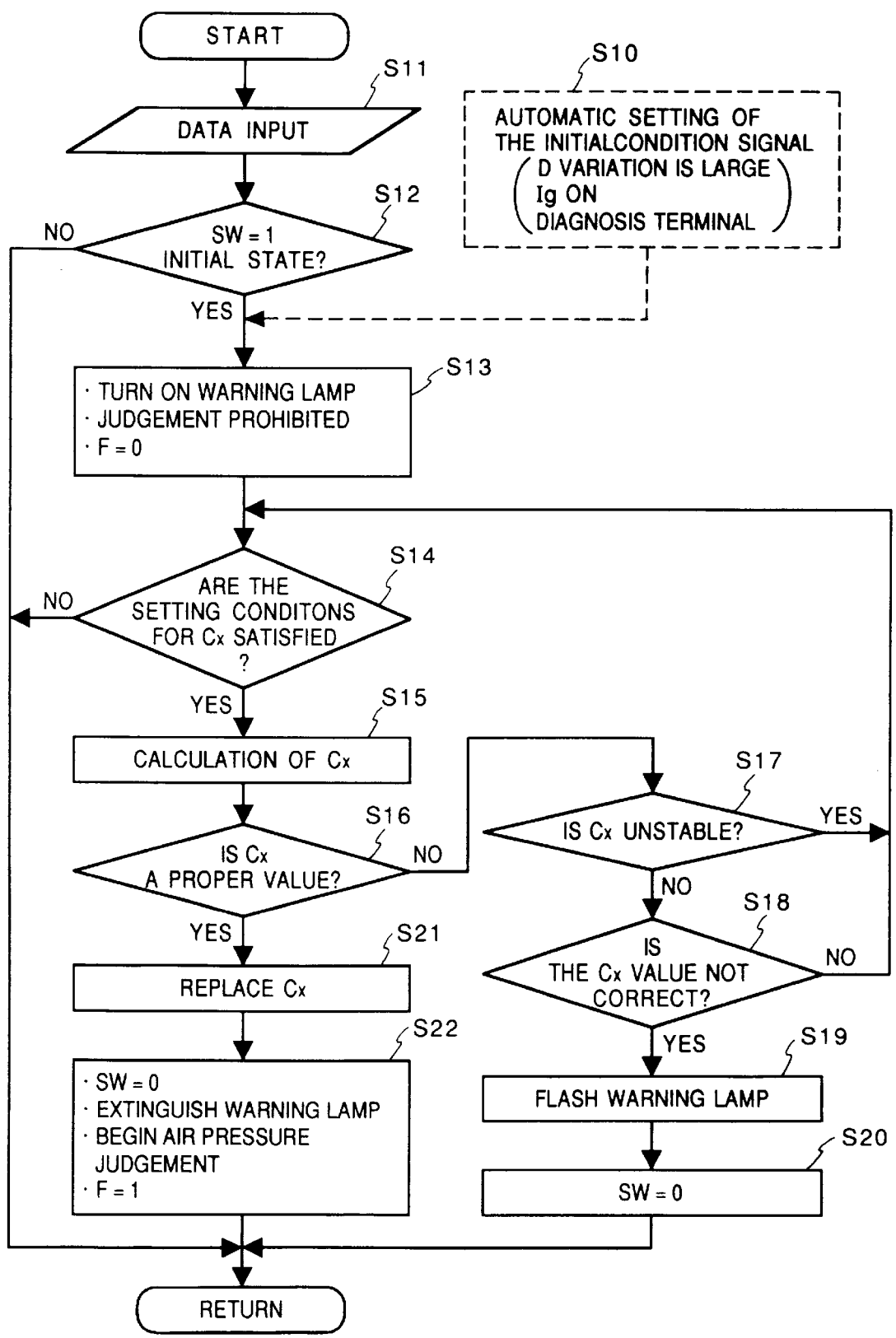
FIG. 4 is a flowchart showing the determination of whether or not the tire air pressure judgment conditions are satisfied.

Next, FIG. 4 is a flowchart which judges if the judgment conditions are satisfied. In particular, an example of when the warning happens after the unsettled coefficient Cx is judged to be abnormal when compared to the initial condition of the aforementioned unsettled coefficient Cx. In FIG. 4, when the process to judge if the judgment conditions are satisfied is started in step S11, the data for the number of tire revolutions, etc., is input, and the process continues to step S12. Whether or not the initial condition that the judgment start switch SW is on or not (in the case when the driver turns the switch on) is determined. Or, for step S10, enclosed by the dashed lines, either after the deviation value shows a drastic change, or after the ignition switch is switched on, or after the when the diagnostic terminal of the automatic trouble diagnostic terminal has become in the initial state, the initial condition signal is automatically output, and the initial condition, that judges whether the judgment condition is satisfied or not is determined, and the process continues to step S13.

In this step S13, the warning lamp 10, is provided near the driver's seat, is turned on, and the driver is informed that the tire air pressure judgment preparations have been completed, and at the same time, in order to prohibit the judgment, flag 0 is signaled. Next, the process continues to step S14, where, in order to determine the unsettled coefficient Cx, whether or not the car is traveling in a steady manner is determined. If it is determined that the unsettled coefficient Cx can be found, the process continues to step S15, and the unsettled coefficient Cx is calculated according to the equation in FIG. 2B. Continuing, whether or not the unsettled coefficient Cx, determined in step S16, is a proper value, i.e. has not strayed far from "1," is judged, and in the case when it is a proper value, the process continues to step S21. If, in step S21, there is an old unsettled coefficient Cx recorded in the memory, this old value is replaced by the new value from step S16. If there is no value recorded in memory, the present value is stored in memory. Because in the carrying out of the above steps, the unsettled coefficient Cx is recorded, the deviation value D thinks that it is at the initial settings, and the calculation becomes possible. Thus, the process moves to step S21, and the aforementioned initial settings switch is set to "0," the warning lamp is turned off, and as the air pressure judgment begins, in the main flowchart in FIG. 3, flag one is signaled.

While, in step S16, for example, if only one tire has just run into a large pothole in the road, in the case when the unsettled coefficient Cx has strayed far from "1" and is unstable, because in step S17, whether or not it is an "unstable" state like this is judged, if the unsettled coefficient Cx is unstable, then the process returns once again to step S14, and the steps from S14 are carried out again. Or, in step S17, when the unsettled coefficient Cx is stable, has strayed far from "1", and is judged to be an improper value, because the tire air pressure is abnormal, the warning lamp 10 is flashed in step S19 so that it stands out and prompts the driver to take notice. After this the process continues to step S20, where the initial switch is set to "zero." Or, in step S18, the unsettled coefficient is not strayed far from "1," and is judged to be a proper value, and the process returns to step S14 and carries out each step from there accordingly.

If the aforementioned procedure is followed, if an emergency use tire is attached or just after changing a tire, for example, the tire air pressure abnormality can be precisely judged from the difference on the number of tire revolutions, and because by evaluating the unsettled coefficient Cx in the aforementioned method directly after driving begins, a tire air pressure abnormality can easily be informed to the driver, and by being able to perform the process, for example, well before the vehicle gets on a highway, the safety of the device is insured. In the previously noted example, the control flow until just after the beginning of driving was given, next, while the car is running, from carrying out the comparison of the deviation value D determined from FIG. 2A and the deviation width DS, which has a prescribed width, the judgment process for carrying out the tire air pressure abnormality detection will be discussed.

Figure 5A:
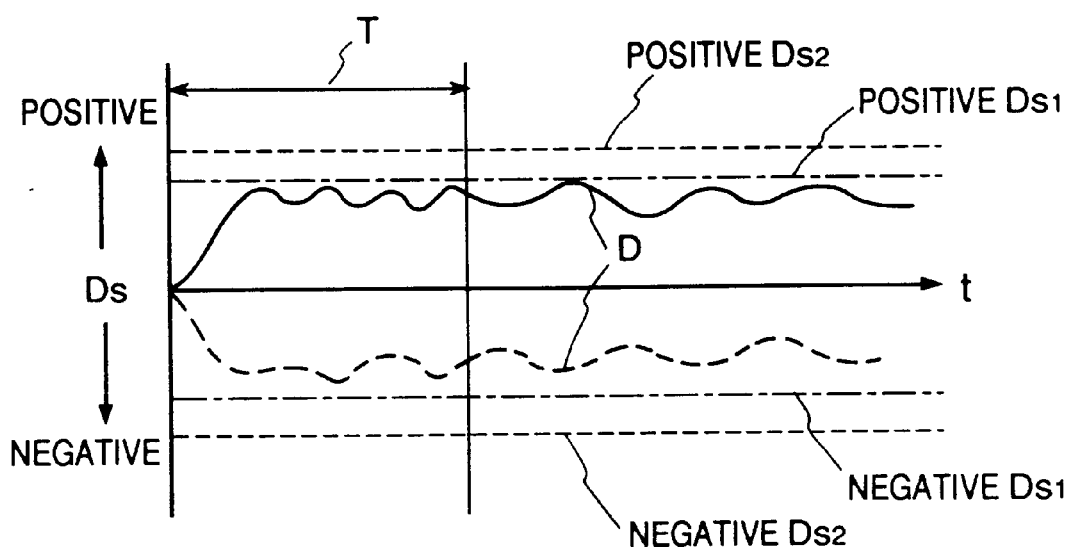
FIG. 5A, shows the deviation D, when it is within a normal range, with the y-axis being the amount of the deviation width, DS, and the x-axis representing the time t.
Figure 5B:
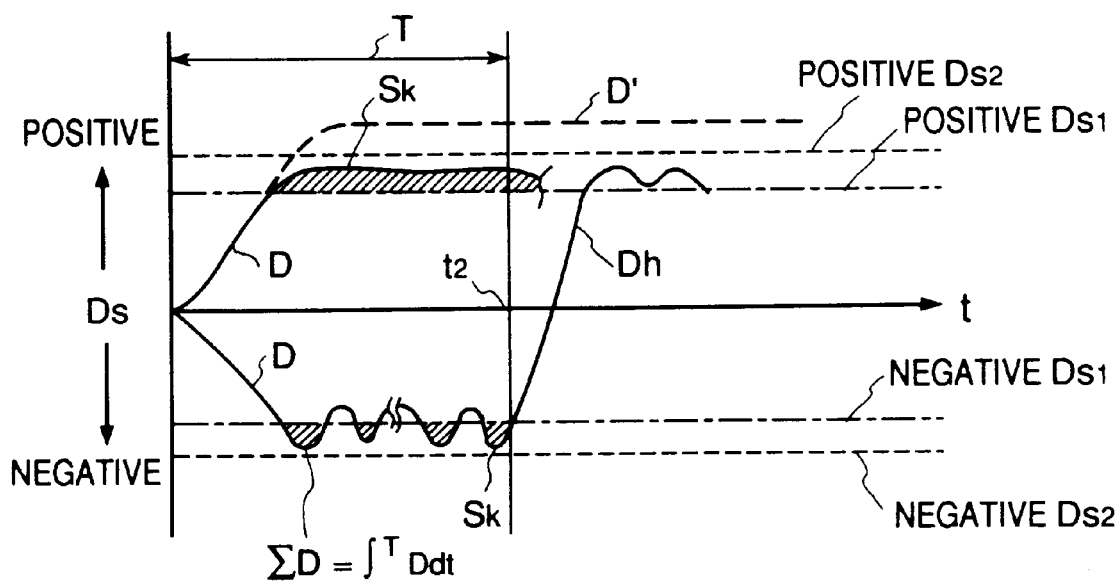
FIG. 5B shows the deviation value when in an abnormal condition.
Figure 6A:
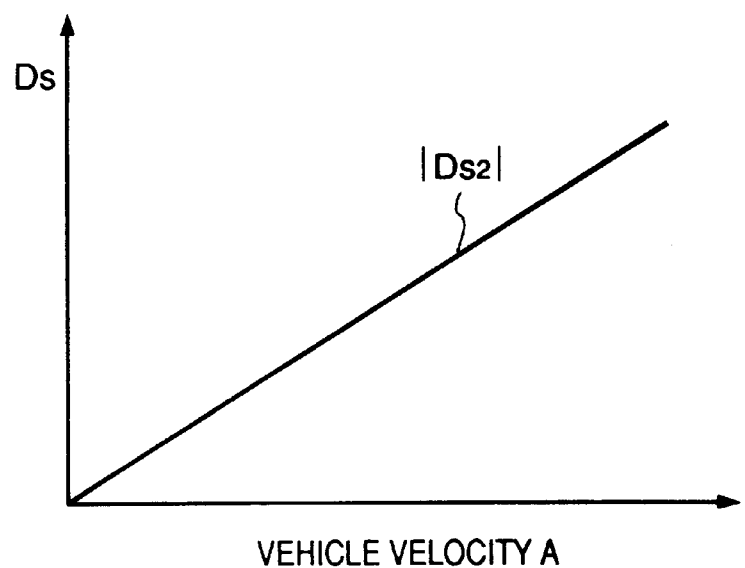
FIG. 6A shows the vehicle velocity V increasing directly proportionally to the deviation width DS.

FIG. 5A shows the deviation value D during the normal range of operating conditions, with the y-axis being the deviation width DS, and the x-axis as time. While, FIG. 5B shows the deviation value D for an abnormal operating state. And then, FIG. 6A shows that the deviation amount is directly proportional to the vehicle velocity, increasing directly with the vehicle velocity, also, FIG. 6B shows that the deviation amount DS is directly proportional to the increasing tire temperature until the tire temperature B, after which, as the tire temperature increases, the deviation amount DS does not.

First of all, regarding FIG. 5A, because, in the case when F1+F3 is larger than F2+F4, the deviation value D becomes positive, and in the case when the opposite is true, the deviation value D becomes negative, the deviation width DS in the figure is in-between the area enclosed by the positive DS1 and the negative DS1 which is the area for normal tire air pressure conditions. The deviation value D produced by the vehicle, during normal driving conditions, is shown in the figure by the solid and dashed lines, if, when judged during a fixed period of time T, the value is judged to be within this area, a normal condition is judged.

In FIG. 5B, in the case that the deviation value D, within a fixed period of time T, goes above or below the area defined by positive DS1 or negative DS1 (shown by the lines made from alternating dots and dashes), the tire air pressure is judged to be abnormal. In other words, in FIG. 5B, if the integral value $\Sigma D$ that the deviation value D has gone over the positive DS1 value is greater than a defined value within a defined period of time T, the abnormal tire air pressure judgment is carried out. Also, as in the case when directly after the deviation value D has been beyond the minus DS1 value, it suddenly jumps to a value beyond that of the positive DS1 value, the tire air pressure is judged to be abnormal Next, in each of the FIGS. 5A and 5B, the plus and minus DS2 are shown with dashed lines, an increase directly proportional to an increase of the vehicle velocity A. In this manner, using the vehicle velocity A, the deviation width DS is changed, and the problems associated with a fixeded value of the deviation width DS are eliminated. In short, accompanying an increase in the vehicle velocity A, the deviation width DS also increases, and also, because the damage due to a tire puncture also becomes larger, by setting the deviation width DS2 wider than the deviation width DS1, the damage is minimized.

Figure 6B:
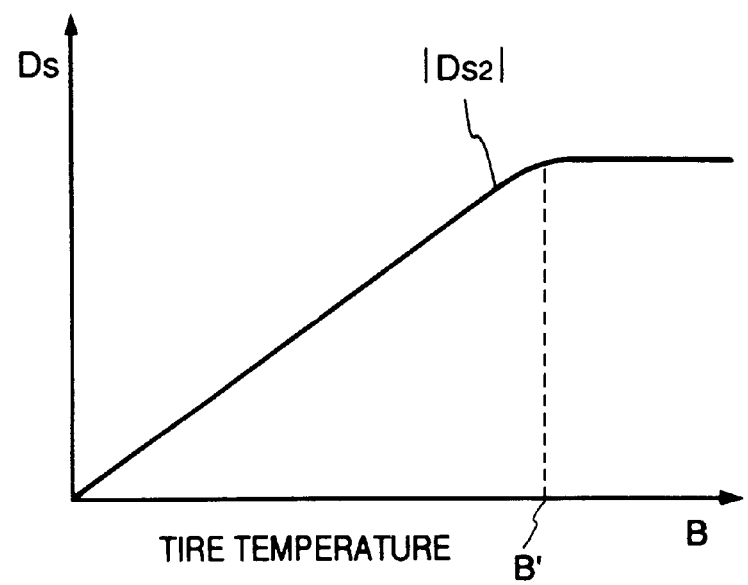
FIG. 6B shows the that the deviation amount, DS is directly proportional to the rising tire temperature until tire temperature B, and as the tire temperature rises beyond that, there is no change in DS.

Also, as shown in FIG. 6B, according to the tire temperature B the deviation value DS2 increases directly proportionally, until the tire temperature B, after which there is no change to the deviation value DS2 with respect to an increase in tire temperature, the increase in tire air pressure corresponding to the increase on tire temperature can be considered when carrying out the tire air pressure judgment. Here, as parameters along with those shown in FIGS. 6A and 6B, the vehicle velocity A and the tire temperature B, other parameters like loading due to the number of passengers, etc., or a value detected by the vehicle's high speed active suspension sensor, the yaw moment value, front/rear G, right/left G, etc.

As heretofore shown, by not specifying the deviation width value DS, but considering various factors and appropriately changing the deviation value DS2, the vehicle running conditions can be utilized for the actual carrying out of the tire air pressure judgment.

Figure 7:
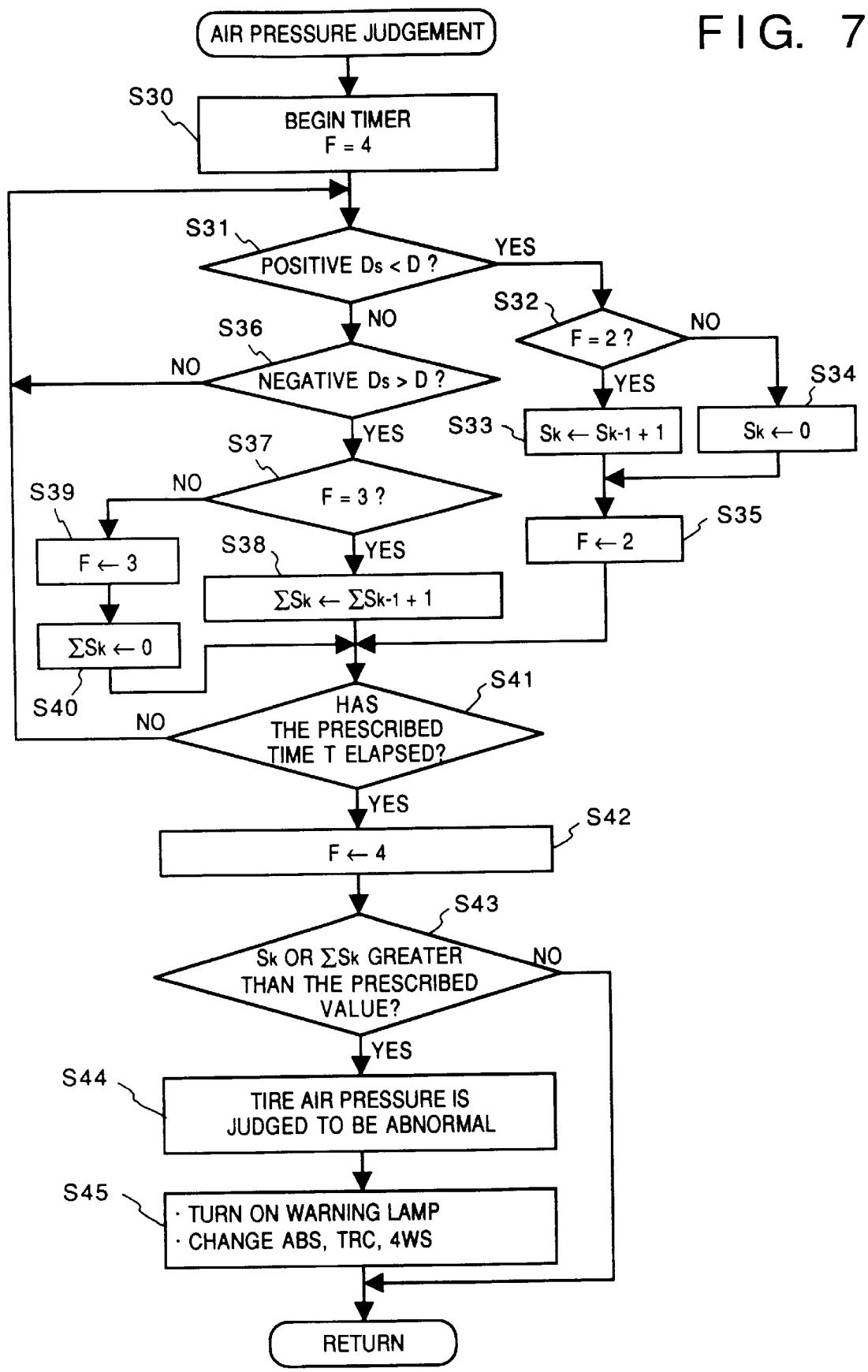
FIG. 7 shows the judgment flowchart based on the values shown on FIG. 5A.

Next, FIG. 7 shows a judgment flowchart based on the information illustrated in FIG. 5B. After the said unsettled coefficient Cx is detected to be normal, the tire air pressure judgment is started, and the process proceeds to step S30, where the judgment timer is started, and the flag is set to "4". Then the process continues to step S31, where the judgment as to whether the deviation value D, determined from the aforementioned equation, is greater than the positive deviation width DS is carried out, because in the case when it is larger, the condition is abnormal, and the process moves to step S32, where whether or not the flag is "2" is judged, and in the case that the flag is "2", the process continues to step S33, where after the k integral value Sk is set to one plus the previous integral value Sk-1, then continues to step S35 where the flag is set to "2." Or, in step S32, in the case that the flag is not 2, the integral value is set to 0, and the process continues to step S35. From step S35, the process moves to step S41, where whether or not the fixed period of time T (for the cycle) has passed is judged.

While, in step S31, if the deviation value D is judged to be smaller than the positive deviation width DS, it continues to step S36, where whether of not the deviation value D is smaller than the negative deviation width DS is judged. In this step S36, if the deviation value D is judged to be smaller than the negative deviation width DS, then it is determined to be abnormal at the minimum for the instant of judgment, but because there are cases in which this can simply be caused by noise, in order to wait for enough time to pass in order to make a judgment, the process continues to step S37, where whether or not the flag is "3" is checked. In step S37, when the flag is "3," it advances to step S38 where, after adding one to the previous integral value, ΣSk-1, to set the ΣSk value, the process continues to step S41 where it waits for the time to pass.

In step S36, if the deviation value D is not judged to be smaller than the negative deviation width DS, the process returns to step S31.

In step S37, if it the flag is not "3," the flag is set to "3" in step S39, and the it continues to step S40, where after the integral value ΣSk is set to "zero," it goes to step S41 where it checks if the time T has passed. If the time T has elapsed, the process moves to step S42, while on the other hand, until the time T elapses, the process returns to step S31. In step S42, the flag is set to "4," and the judgment preparations for the final judgment, based on the preceding series of steps, are performed, continuing to step S43, where whether or not the integral value Sk or the integral value ΣSk has passed the prescribed value is judged, and if so, in step S44, a tire air pressure abnormality is judged. Or, if the value is judged not to be over the prescribed value, the process returns.

Then, in step S44, if the tire air pressure is judged to be abnormal, in step 45, the warning lamp is turned on, and in the case of vehicles equipped with ABS device, in order to safely control the braking operation, automatic control measures are undertaken. Also, as in the similar case of a vehicle equipped with TRC system or 4WS system, in order to operate them safely, automatic control measures are undertaken, and these controls are continued until the tire is returned to normal operating conditions.

By the aforementioned process, in the case when the detection of the number of tire revolutions is made good use of, it becomes possible to eliminate the system noise, and to accurately judge a tire air pressure abnormality.

Figure 8:
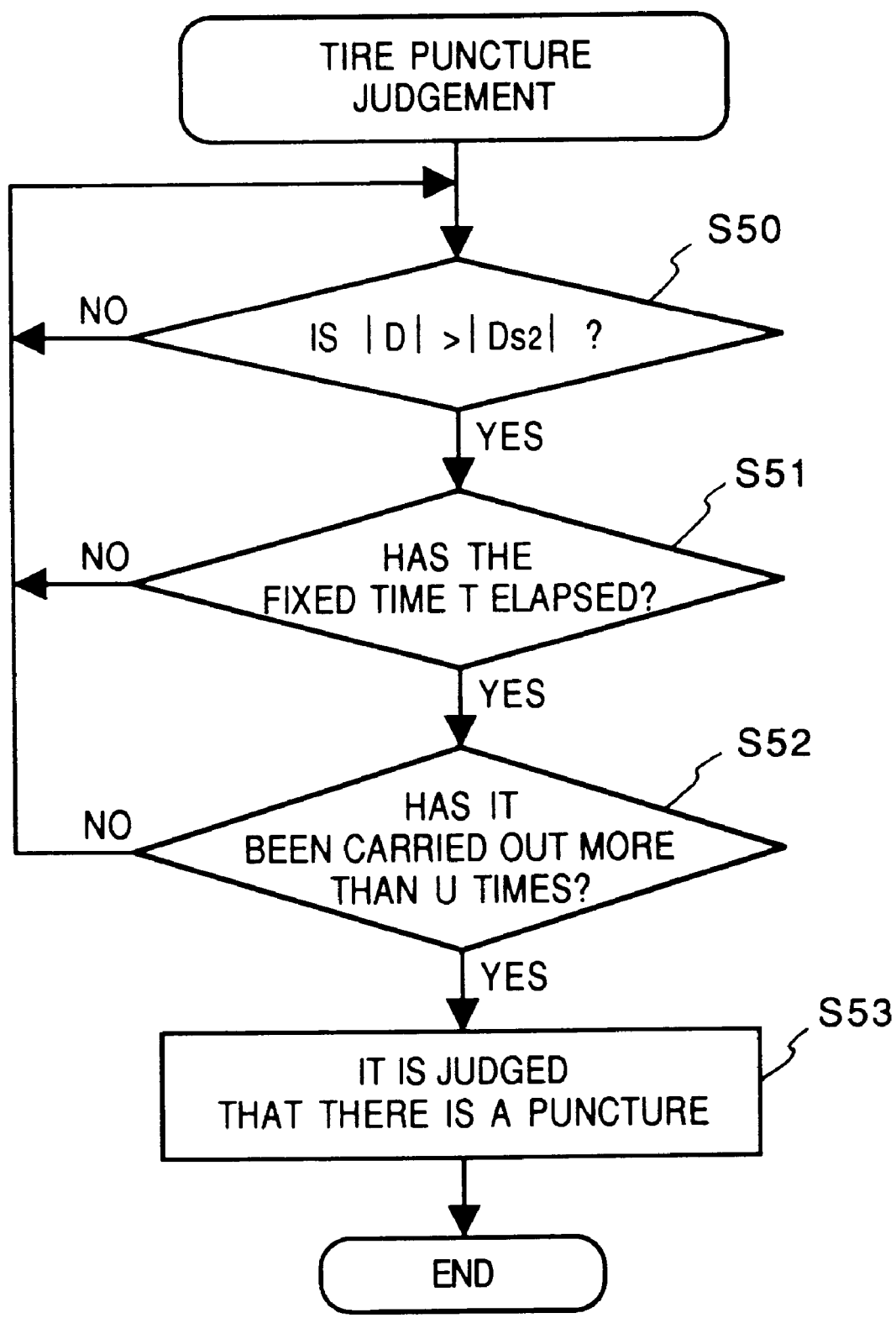
FIG. 8 shows the flowchart for the judgment of a tire puncture.

Next, FIG. 8 shows a flowchart in the case of a flat tire. In FIG. 5B, in the case shown by the dashed line, where the absolute value of the deviation value D is greater than the absolute value of the deviation width DS2, because this indicates a sudden loss of tire air pressure due to a flat tire, it is a case when the flat tire judgment should be performed. In FIG. 8, with the process start, in step S50 the absolute value of the deviation width DS2 and the absolute value of the deviation value D are compared, and if the absolute value of the deviation value D is greater than the absolute value of the deviation width DS2, the process goes to step S51, where it waits for the time T to elapse, and continues to step S52. In step S52, after checking whether or not steps S50 and S51 have been performed a prescribed number of U times, as before, in the case that the absolute value of the deviation value D is greater than the absolute value of the deviation width DS2, the process goes to step S53, and the flat tire judgment is carried out. As a result, the warning lamp is lit, and in the case of vehicles equipped with ABS device, in order to safely control the braking operation, automatic control measures are undertaken. Also, as in the similar case of a vehicle equipped with TRC system or 4WS system, in order to operate them safely, automatic control measures are undertaken, and these controls are continued until the tire is returned to normal operating conditions. In this manner, the flat tire judgment is carried out, air pressure abnormalities that manifest within a fixed time interval T are judged, and the flat tire judgment can be judged accurately without misjudgment.

According to each of the previous flowcharts, turning on a warning lamp for the driver to see that a tire air pressure abnormality judgment is possible, and can be quite easily provided for actual use. But, this does not specify which of the tires is in the abnormal air pressure state, and the specification of the tire is preferable. Thereupon, in order to specify which tire has the abnormal air pressure condition, and to inform the driver, the process according to the flowchart in FIG. 9 for specifying the abnormal tire is carried out, and the results displayed by either of each warning lamp as shown in FIGS. 10A to 10D.

Figure 9:
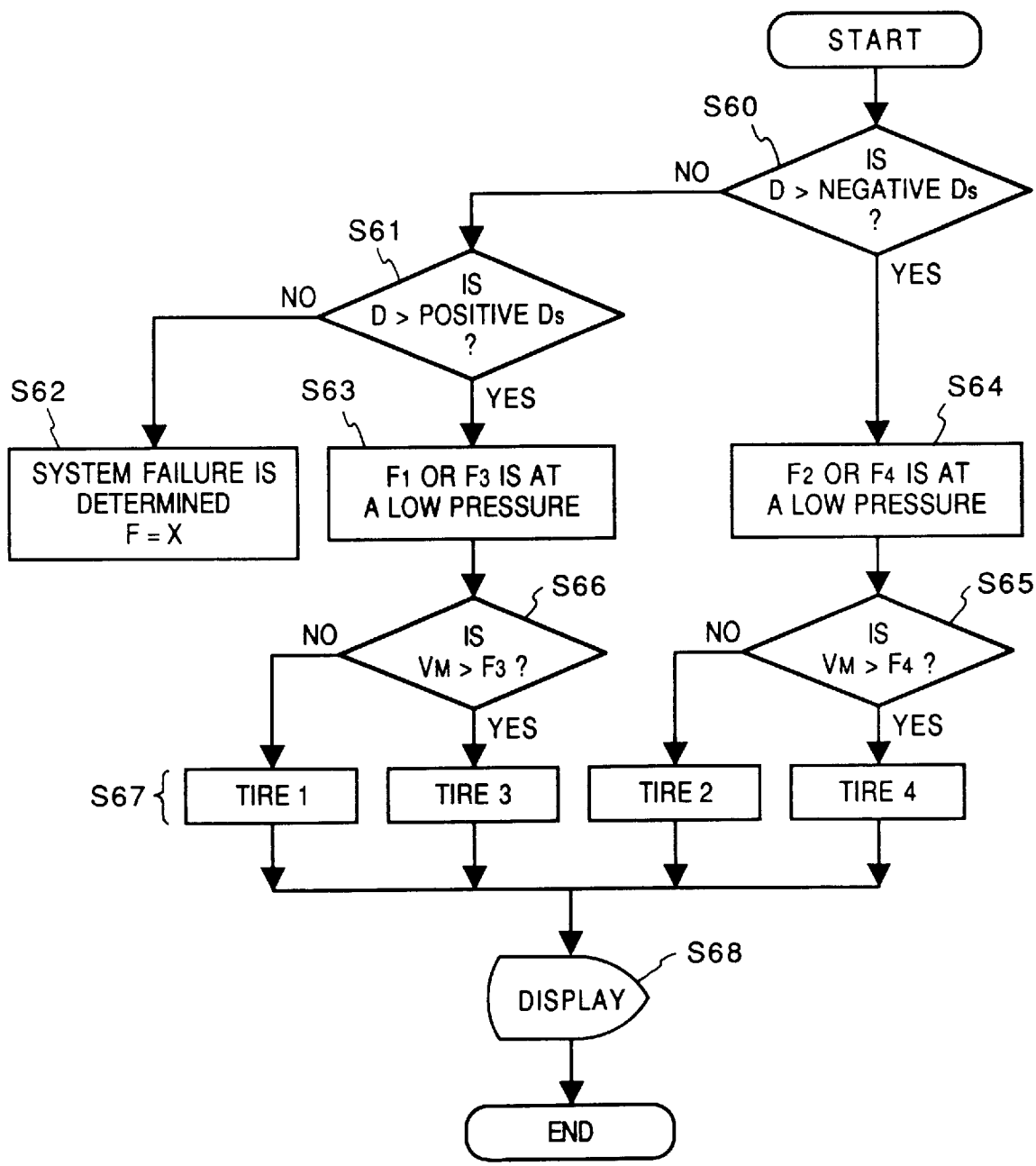
FIG. 9 shows the flowchart for the special condition of a tire with a puncture.

This abnormal tire specification process starts, and moves to step S60, as shown in FIG. 9, and in this step, the deviation value D, found from using the equation in FIG. 2B, and the deviation width DS are compared, and if the F2+F4 value is larger than the F1+F3 value, and the deviation value D is found to be larger than the negative deviation width Ds, the process moves to step S64, and that one of the tires 2 or 4, as each is a part of the value F2+F4, is abnormal, and has suffered a flat, is determined.

Continuing, in step S65, the comparison of the value F4, the number of revolutions of tire 4 driven by the differential 8, and Vm, the number of revolutions of the engine multiplied by the final deceleration ratio, is carried out, and in the case when the number of tire revolutions F4 is smaller than the number of engine revolutions Vm, in step S67, it is judged that tire 4 has a flat, and the process continues to step S68. At step S68, the display as shown in FIGS. 10A to 10D is performed, and the driver is informed that tire 4 has a flat. On the other hand, in the case in step S65 that the number of tire revolutions F4 is larger than the number of engine revolutions Vm, then in step S67 it is determined that the tire 2 has a flat, the process continues to step S68 and corresponding results are displayed to the driver.

Or, in step 60, when the comparison of the deviation value D and the deviation width DS is carried out, and the value of F1+F3 is smaller than the value for F2+F4, and if it is determined that the deviation value D is greater than the negative deviation width DS, the process moves to step S61, where the value of the deviation value D and the deviation width DS are compared, and if the deviation value D is judged to be larger than the positive deviation width DS, in step S63, it is determined that one of the tires 1 or 3, that make up the F1+F3 value, is abnormal and has experienced a flat. On the other hand, in step 61, in the case that the deviation value D is determined to be smaller than the deviation width DS, because there is an abnormality in the deviation value D judgment process, the process continues to step S62, where a system fail is output, the flag is set to "X", and the process returns to the normal flow.

Continuing, in step S66, the comparison of the value F3, the number of revolutions of tire 3 driven by the differential 8, and Vm, the number of revolutions of the engine multiplied by the final deceleration ratio, is carried out, and in the case when the number of tire revolutions F3 is smaller than the number of engine revolutions Vm, in step S67, it is judged that tire 3 has a flat, and the process continues to step S68. At step S68, the display as shown in FIGS. 10A to 10D is performed, and the driver is informed that tire 3 has a flat. On the other hand, in the case in step S66 that the number of tire revolutions F3 is larger than the number of engine revolutions Vm, then in step S67 it is determined that the tire 1 has a flat, the process continues to step S68 and corresponding results are displayed to the driver.

Figure 10A:
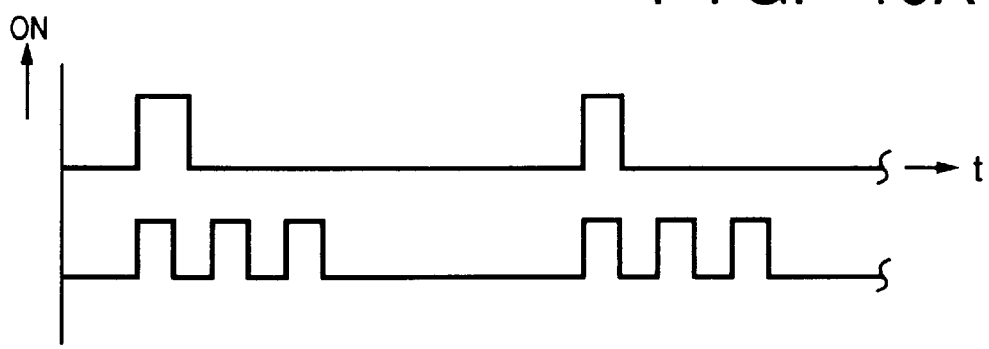
FIG. 10A illustrates the change in the warning lamp indicator according to the change in electrical signal.
Figure 10B:
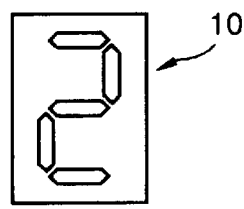
FIG. 10B illustrates a model of the warning lamp.
Figure 10C:
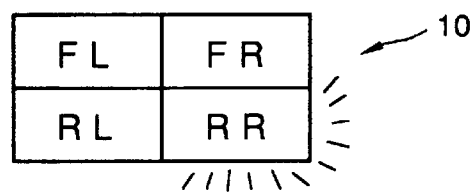
FIG. 10C shows an example of a warning lamp.
Figure 10D:
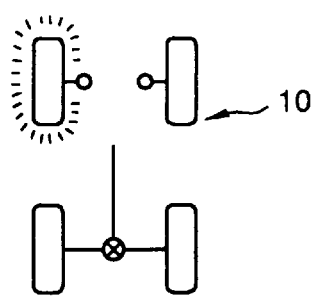
FIG. 10D shows an example of a warning lamp.

Next, FIG. 10A shows the electric signals for the warning lamp, 10B shows an example figure of a warning lamp, FIG. 10C, and FIG. 10D shows other models of example warning lamps. First, in FIG. 10A, in the case that tire 1 or tire 3 has been specified to have a flat from the flowchart in FIG. 9, the warning lamp display, as illustrated in the figure, for the opened fixed time interval the information for one pulse is displayed, and the driver is informed that tire 1 is flat. Or, in the case that tire 3 is flat, for the opened fixed time interval the information for three pulses is displayed, and a flat in tire 3 is informed. Similarly, if 2 or 4 pulses are flashed, the corresponding flat tire 2 or 4 is informed. According to this display method, in the flowchart of FIG. 4, by means of providing one of the warning lamps shown in FIGS. 10A to 10D, the tire that has a flat can be displayed.

Next, in FIG. 10B, using a seven segment display device, an example of the flat tire display is performed. Or, in FIG. 10C, with tire 1 as FL, tire 2 as FR, tire 3 as RL, tire 4 as RR, the tire with a flat is printed on a planar display device, behind which lamps are provided for each display mode, and flat tire information is directly displayed. FIG. 10D shows an example of a pictorial representation of the flat tire information, once again with lamps provided for each display mode.

As shown above, the specification or display of tire with the flat is carried out, for example, in the case when a tire has become flat, it become unnecessary to leave the car and confirm which tire is, in fact, flat.

In addition to the preferred embodiment explained heretofore, in which in order to detect the difference in the number of tire revolutions, the number of tire revolutions from a revolution detection device 7 was used, but it is not limited to this, there are other methods, such as determining from the distance traveled by each individual tire. The appropriate method can be chosen.

As heretofore explained, in order to construct the tire air pressure warning device, for the case of the difference in the number of tire revolutions being judged by the tire air pressure warning device, at the minimum the number of tire revolutions must be individually detected at all times and processed, and a tire air pressure warning device with precise detection of the tire air pressure is proposed, by carrying out the processing for all four tires at the point in time when all four tires are at the same condition.

Also, in order to construct the tire air pressure warning device, for the case of the difference in the number of tire revolutions being judged by the tire air pressure warning device, using the vehicle running conditions, the most suitable tire air pressure detection is carried out, and also, a tire air pressure warning device is proposed, such that the tire with a flat can be confirmed from the inside of the vehicle.

And, in order to construct the tire air pressure warning device, for the case of the difference in the number of tire revolutions being judged by the tire air pressure warning device, and a tire air pressure warning device is proposed such that the noise produced from the running vehicle does not effect the process, and it carries out the detection of the tire air pressure with good accuracy.

Figure 11:
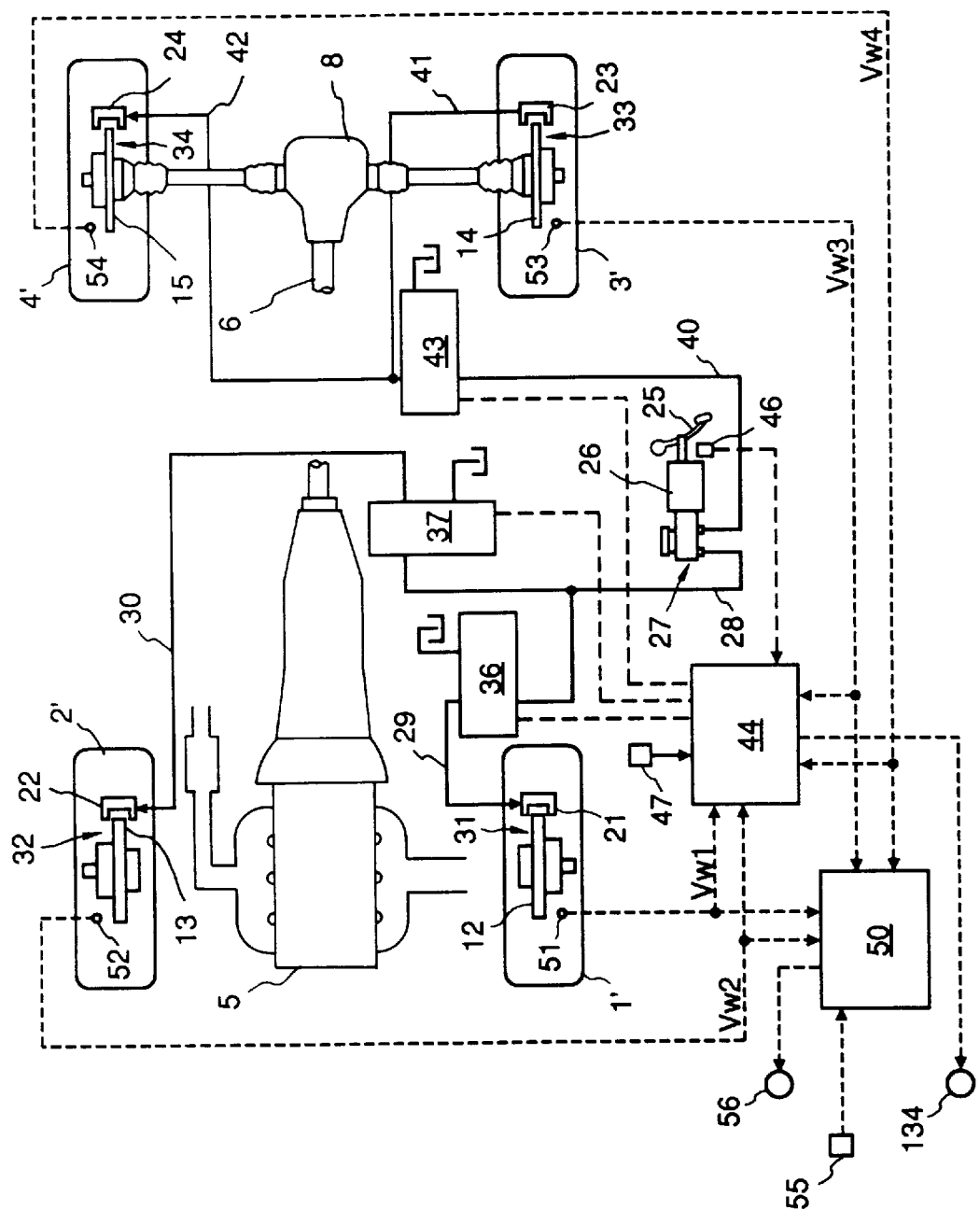
FIG. 11 is an outline of the components of the tire air pressure warning device.

The second preferred embodiment, as shown in FIG. 11, is a tire air pressure warning device for a rear wheel drive passenger automobile equipped with anti-skid brakes.

As shown in FIG. 11, this vehicle has left and right front wheels (unpowered), 1' and 2', and driven left and right rear wheels, 3' and 4'. Engine 5 outputs torque via the automatic transmission to the drive shaft 6, where it drives the differential through which power is transmitted to the left and right drive wheels 3' and 4'.

Each wheel 1'–4' is provided with a wheel, a disk 12–15, that spins as one unit with the wheel, and calipers 21–24, which receive the braking pressure, and brake the disk 12–15 corresponding with each wheel, which as a whole make-up the brake equipment 31–34 and are provided for each wheel, as well as a brake control system provided to control the brake units 31–34.

This brake system, with a power amplification equipment 26, which increases the stepping power applied to the brake pedal 25 by the driver, by means of this power amplifier 26, the master cylinder 27, which is used to output the brake pressure, which is the application of the increased stepping power. From this master cylinder 27, the front wheel brake pressure supply line 28, breaks into two branches, these two front wheel branch brake pressure supply lines 29 and 30, are connected to the calipers 21 and 22 of the left right front wheels 1' and 2' for brake units 31 and 32 respectively, and provided on the left wheel 1' brake unit 31 front wheel brake pressure supply line 29, is the first bubble unit 36, and provided on the right wheel 2' brake unit 32, front wheel brake pressure line 30, similar to the first bubble unit 36, is the second bubble unit 37.

On the other hand, the rear wheel brake pressure supply line 40 from the master cylinder 27, similarly to the first and second bubble units 36 and 37, the third bubble unit 43 is provided. This rear wheel brake pressure supply line 40, downstream from the third bubble unit 43, breaks into two branches, and these rear wheel branch brake pressure supply lines 41 and 42 are respectively connected to calipers 23 and 24 of the brake units 33 and 34 of the left/right rear wheels 3' and 4'.

This brake system is provided with a first channel, which variably controls the left front wheel 1' brake unit 31 braking pressure from the first bubble unit 36, a second channel, which variably controls the right front wheel 2' brake unit 32 braking pressure from the second bubble unit 37, a third channel, which variably controls the left/right rear wheels 3' and 4' brake units 33 and 34 braking pressure from the third bubble unit 43. These first through third channel units are constructed to be each independently controlled.

In the aforementioned brake control system, a control unit 44 is provided to control the first through third channels. This control unit 44, receives input from the brake switch signal, which comes from the brake switch 46 that detects if the brake pedal 25 is ON/OFF, and angle signal, which comes from the handle sensor 47 that detects the handle angle, and the wheel velocity signal, from the wheel velocity sensors 51–54, that detect the velocity of each wheel, and by means of applying these signals outputs brake pressure control signal to the first to third bubble units 36, 37 and 43, the slip braking control (ABS control) for the left and right front wheels 1' and 2', and left and right rear wheels 3' and 4' is carried out in parallel on each of the first through third channels.

Figure 12:
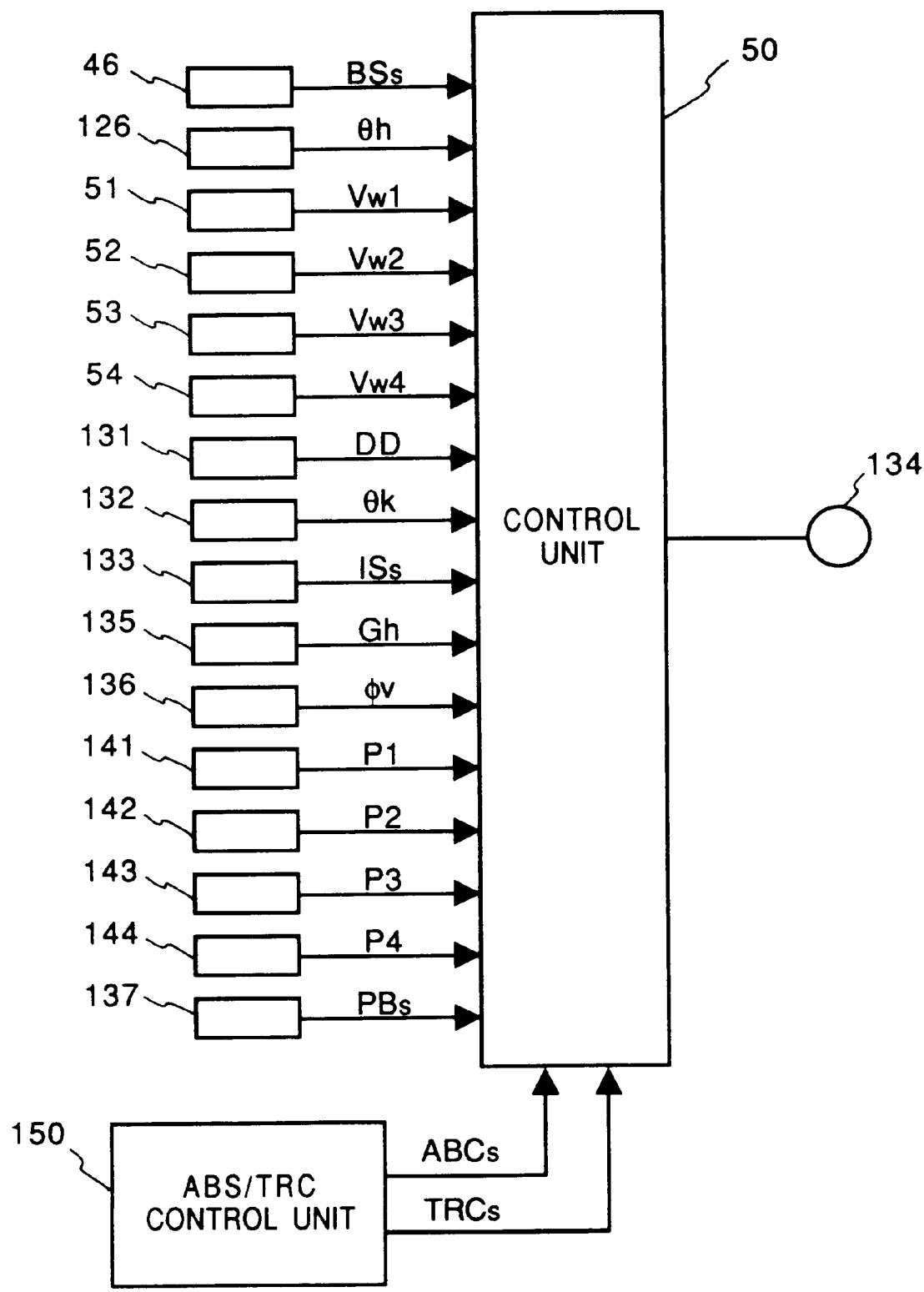
FIG. 12 illustrates the control system make-up.

As shown for the control unit that is shown in FIG. 12, the following signals are provided: brake switch signal BSs, from the brake switch 46, signal for the angle θh from the angle sensor 126, wheel velocities Vw1–Vw4 from the wheel velocity sensors 51–54, driving distance DD signal from the driving distance counter 131, incline angle θk signal, from the inclination detection sensor 132, that detects inclination condition of the vehicle body (road inclination condition), initial settings command signal ISs from the initial settings switch 133, sideways acceleration Gh signal from the sideways acceleration sensor 135, yaw rate signal θv from the yaw rate sensor 136, hydraulic pressure signals P1–P4 from the hydraulic pressure sensors 141–144, that detect the hydraulic pressure of the oil pressure chamber for steering adjustment for the active suspension equipment, the Pbs switch signal from the parking brake switch 137 for the parking brake equipment, and finally, the signal that displays that the ABS as well as the TRC is in use from the ABS/TRC control unit 150, as well as the aforementioned warning lamp 56 is also controlled at the control unit 150. Next, the special characteristics of the present invention, the tire air pressure warning device, will be explained.

This tire air pressure warning device is constructed of the aforementioned wheel velocity sensors 51–54, initial settings switch 55 (this is installed in the instrument panel), in order to give the command for the setting the initial settings for the tire air pressure judgment, the warning lamp 56 installed in the control panel, etc. At the control unit 50, signals from the wheel velocity sensors 51–54, initial settings switch 55, etc. are provided, and the warning lamp 56 is controlled at the control unit 50.

The aforementioned wheel velocity sensors 51–54 are either formed from the disks 12–15, or formed from separate disks for detection, not shown in the picture, that are provided adjoining the calipers 21–24 that detect by electromagnetic pick-ups from 48 detection parts.

The aforementioned control unit 50 is made of a wave signal forming circuit, that forms a wave from the detected signal from the wheel velocity sensors 51–54, A/D converter that perform an A/D conversion on each type of analog detected signal, input/output interface, CPU, ROM, RAM, etc. In the ROM, the herein below control program for the tire air pressure judgment control and map is stored beforehand in memory, in the RAM, each memory number for the control (buffers, memory, flags, counter, and software, etc.) is provided. Besides, the aforementioned filter for the variable time coefficient, in order to prevent the drop in accuracy at high vehicle velocity, the time coefficient can be set larger, and because accuracy can be achieved at lower velocities, the time coefficient is lowered. Below, the tire air pressure judgment control in the aforementioned control unit 50, will be explained based upon the figures starting with FIG. 13. But, in the flowchart figures, the attached number Si (i=1, 2, 3, . . . ), indicate each step in the flowchart.

Figure 13:
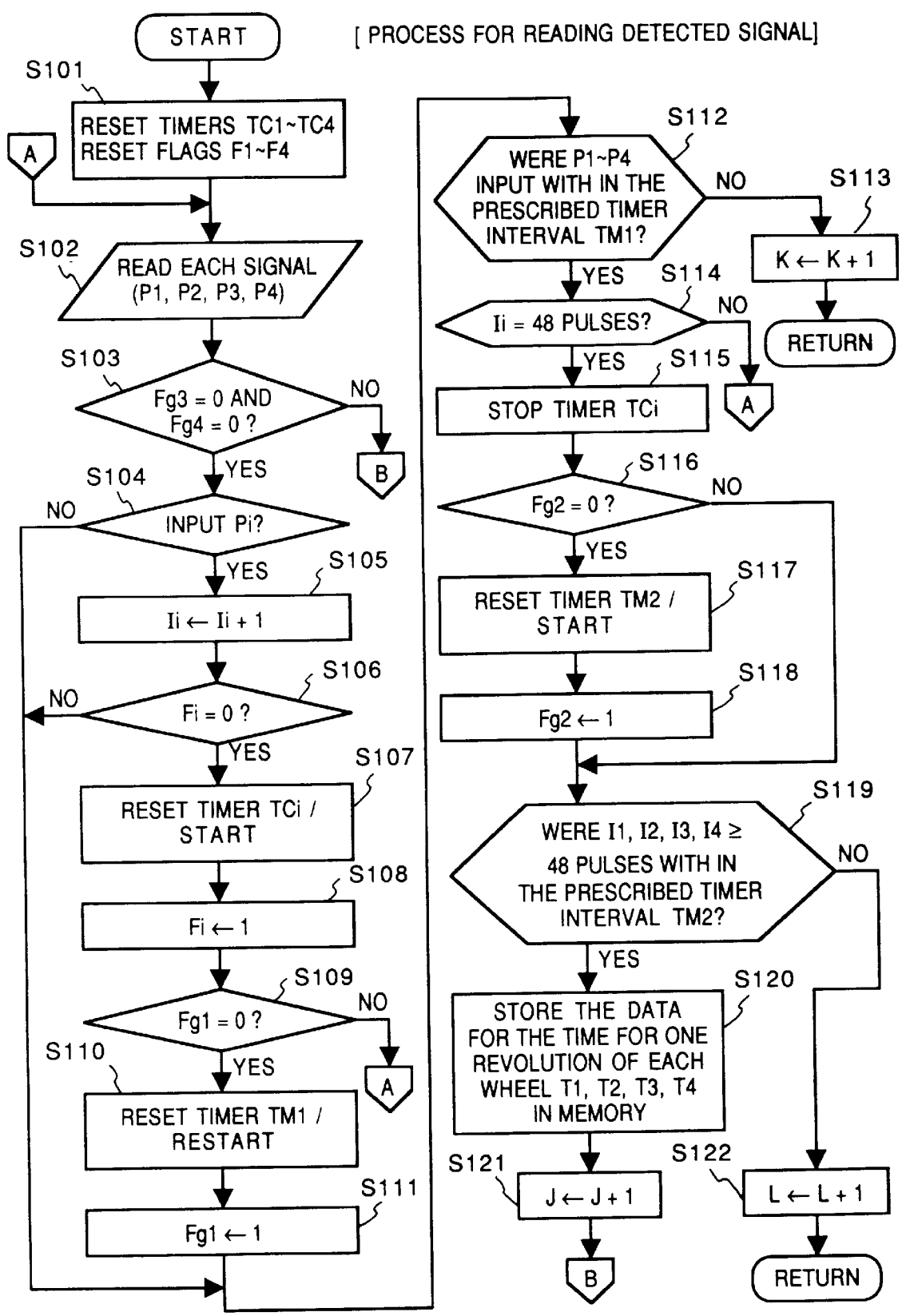
FIG. 13 shows a part of the flowchart for the reading process of the detected signal from the wheel velocity sensor.
Figure 14:
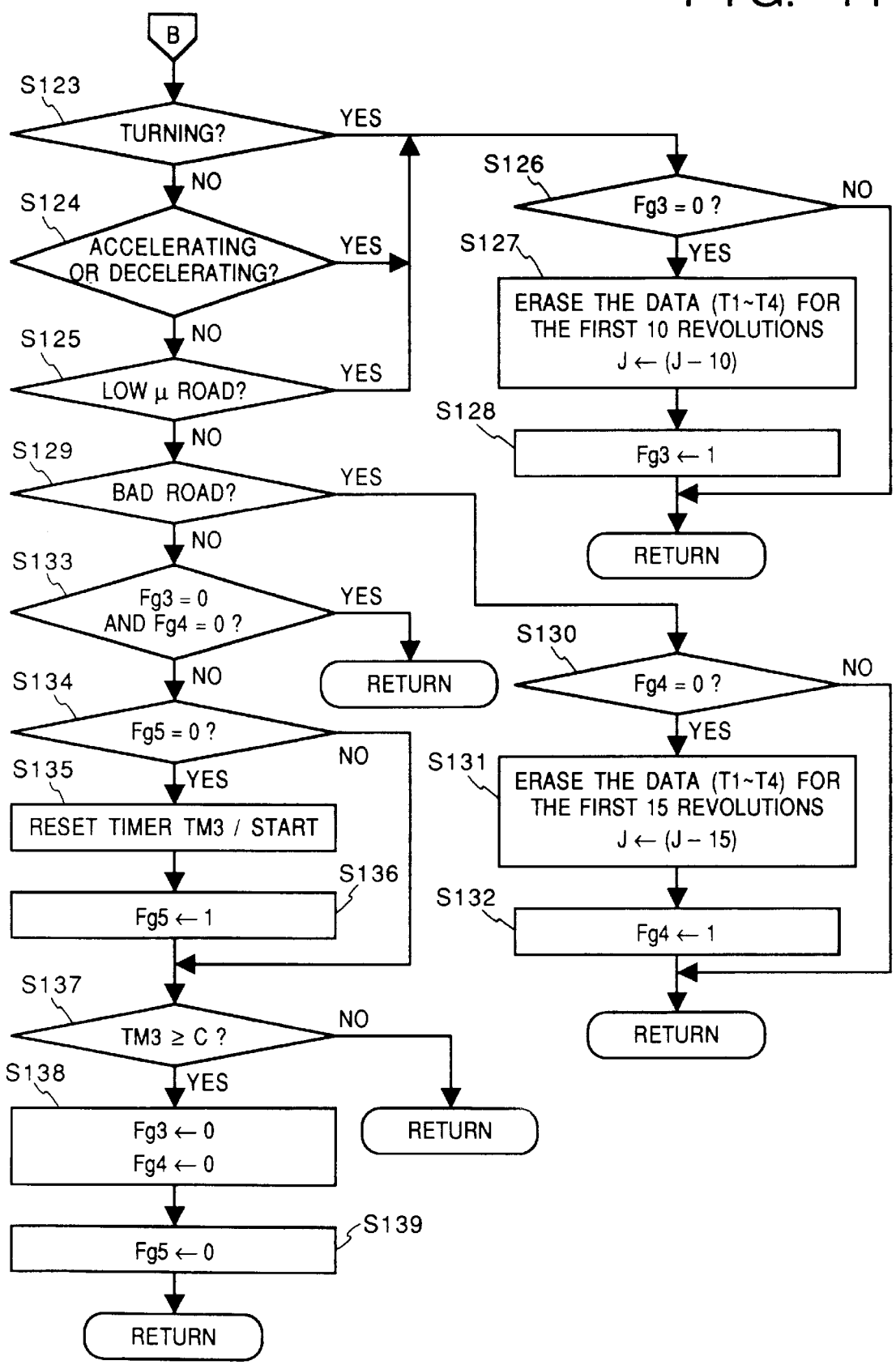
FIG. 14 shows the remainder of the flowchart for the reading process of the detected signal from the wheel velocity sensor.

In FIGS. 13 and 14, the detected signal reading process, where the detected pule signal from the said wheel velocity sensors 51–54 are read and stored in memory, is shown.

This detected signal reading process is normally carried out when the vehicle is traveling, but to explain the outline of this process, because each velocity sensor 51–54 outputs 48 pulse signals P1–P4 (wheel velocity pulses) from one wheel revolution, the number of pulse signals from pulse signals P1–P4 are counted by counters I1–I4, respectively, the time for the 48 signals from the pulses P1–P4 to be output (in short, the time for one wheel revolution) is calculated in times TC1–TC4, and this calculated time is stored in memory as wheel velocity data.

Figure 22:
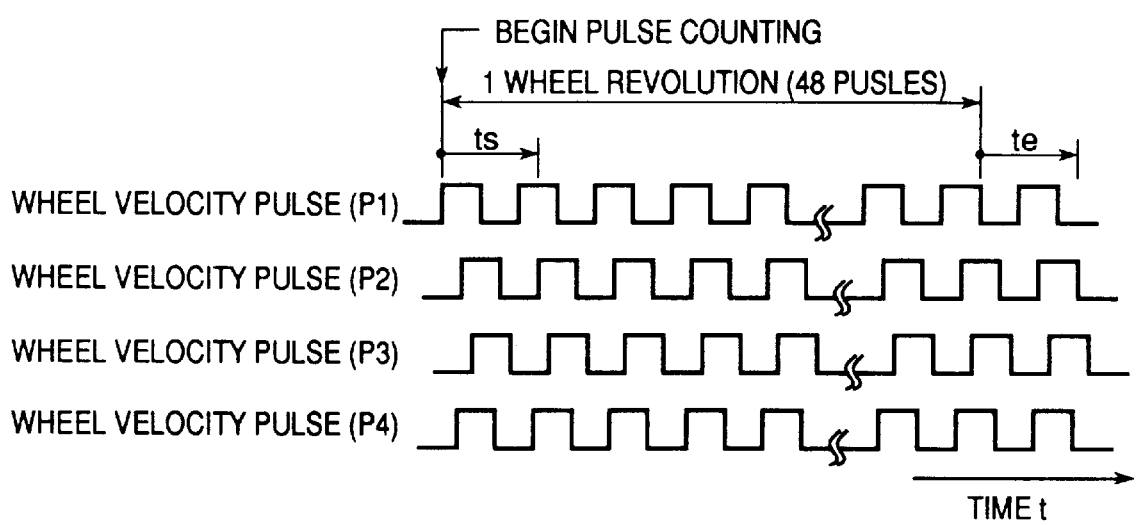
FIG. 22 illustrates the time chart for the wheel velocity pulse.

But, after the counting of the P1–P4 signals is started, when the four pulse signals P1–P4 are not input within a fixed period of time (the time $t_s$ shown in FIG. 22), because the road conditions are not uniform, the wheel revolution state is unsteady, the count and the timer are reset. Similarly, at the conclusion of the count for the signals P1–P4, when the four pulse signals P1–P4 are not input within a fixed period of time (the time $t_s$ shown in FIG. 22), because the road conditions are not uniform, the wheel revolution state is unsteady, the count and the timer are reset. Moreover, the above count and timing are performed when the car is traveling at regular conditions, and in order to raise the reliability of the wheel velocity data, the wheel velocity data for a fixed period of time before the vehicle moved into abnormal traveling conditions is erased, and the data is not collected for a fixed period of time after the abnormal traveling condition.

Next, based upon the flowcharts in FIGS. 13 and 14, the process for the reading of the detected signal will be explained.

After the control is started, timer TC1–TC4, corresponding to the four wheels 1–4, are reset, and flags F1–F4 are also reset (S101), next, the pulses P1–P4 from the wheel velocity sensors 51–54 are read (S102), next, flags 3 and 4, which were reset in steps S128 and S132, respectively, are judged as to whether or not they are "0" (S103), and when the answer is "yes," the process moves to step S104, or, when the answer is "no," the process moves to step S123.

In short, in step S104, whether or not pulse signal Pi (where i=1–4) has been inputted, judges whether or not any one of the pulse signals P1–P4 has been inputted, and when the answer is "yes," the counter for that input pulse signal Pi, counter Ii (where i=1–4) is incremented (S105). On the other hand, if the answer on step 104 is "no," the process moves to S112.

In step S106, whether or not the flag Fi, corresponding to the aforementioned counter Ii (where i=1–4), is "0" is judged, when flag Fi is "0," in step S107, timer TCi, corresponding to counter Ii, is started after being reset, next, flag Fi is set to "1" in step S108. And, when judgment in step 106 is "no," the process moves to S112.

In step S109, whether or not flag Fg1 is "0" is judged, in the beginning, when flag Fg=0, in step S110, timer TM1 is started after being reset, next, flag Fg1 is set to "1" in step S111, and then the process moves to step S112. In this manner, the timer TM1 is started after the input of any of the pulse signals Pi, and upon the input of each pulse signals P1–P4, the corresponding flag F1–F4 is set, the timer TC1–TC4 corresponding to the flag is set, and the counting for the corresponding counter I1–I4 is carried out.

Next, in step S112, whether or not the four pulse signals P1–P4 are input within the extremely short period of time counted by timer TM1 is judged based upon flags F1–F4, and when the answer to the judgment is "yes," in step S114, the total for counter Ii is checked to see if it is 48 pulses, and when the result is "no," the process continues to step S102, but when the number of pulses Ii=48, in step S115, the timing for counter TCi, corresponding to the counter Ii, is stopped. And, when the judgment result of step S112 is "no," in step S113, after the counter K is incremented, and the process returns.

In this manner, with the revolution condition of the wheels 1–4 unstable, when after the count start, the 48 pulses for each of the pulse signals P1–P4, if within a fixed period of time the pulse signals P1–P4 are not inputted, the counts for pulse signals P1–P4 are reset, and the procedure from step S101 is repeated, but in the case where the four pulse signals P1–P4 are input within the fixed period of time, the timers TC1–TC4, corresponding to the counter Ii that counted the 48 pulse signals P1–P4 are stopped in order. In this manner, the time needed for one wheel revolution T1–T4, for each wheel 1–4, is detected.

Next, if one of the timers TCi (where I=1–4) stops, In step S116, whether or not flag Fg2 is "0" is checked, and when the answer is "yes," in step S117, timer TM2 is started, after being reset, and the Fg2 is set to "1" in step S118. In short, if any one of the pulse signals P1–P4 reaches the 48 inputs, timer TM2 is started, after being reset.

Next, in step S119, within the extremely short period of time that timer TM2 times (the time te in FIG. 22), whether or not all the counters I1–I4 have become over 48 pulses is determined, when the answer of the judgment is "yes," in step S120, the data for the time for one revolution of each of the four wheels 1–4, T1–T4 (herein below to be referred to as wheel velocity data T1–T4) is stored in memory, and next, in step S121 the counter J is incremented, and after that the process moves to step S123.

However, when the answer in step S119 is "no," in step S122 counter L is incremented, and the process returns to step S101, and from step S101 the process is carried out again.

In this manner, if the revolution condition of the wheels 1–4 is unstable, when, at the completion of the count of each of the 48 pulse signals P1–P4 (for each detection cycle), when within a fixed period of time the four pulse signals P1–P4 are not inputted, the wheel velocity data (T1–T4) is not stored in memory, and the repetition of the steps from step S101 is carried out.

Next, after step S121, the process continues to step S123 on FIG. 14. In step S123, whether or not the vehicle traveling condition is a turning condition or not is judged, also, in step S124 whether or not the vehicle is accelerating or decelerating is judged, then, in step S125, whether or not the vehicle is traveling on a low $\mu$ road (a road with a low friction coefficient) is judged, and, next after step S125, in step S129 whether or not the car is traveling on a bad road is determined. Steps S123–S125 and step S129 is the outline that determines whether or not the vehicle traveling at normal conditions or not, and regarding the judgments in this subroutine will be explained hereinafter based upon the FIGS. 17–20.

When the vehicle is turning, when the vehicle is accelerating or decelerating, or when the vehicle is traveling on a low $\mu$ road, the process moves to step S126, and flag Fg3 is checked to see whether or not it is "0," when flag Fg3 is "0," in step S127, of the wheel velocity data stored in memory (T1–T4), the most recent 10 recorded wheel velocity data (T1–T4) is erased from the memory, and along with that, the counter J value is changed to the value (J–10), and next, in step S128, after flag Fg3 is set to "1," the process returns to step S101, or, if in step S126 the answer is "no," the process returns to step S101 as is (see FIG. 23).

Thus, because once flag Fg3 is set, in the judgment in the next step S103, the answer is "no," the process moves from step S103 to step S126, and because the vehicle is in a turning state, an acceleration or deceleration state, or on a low $\mu$ road, after step S126 the process returns to step S101. Therefore, during this period, the wheel velocity data (T1–T4) does not accumulate in memory (refer to FIG. 23).

According to the judgment of step S129, when traveling on a bad road, in step S130, whether or not flag Fg4 is "0" is checked, and when flag Fg4=0, in step S131, of the wheel velocity data stored in memory (T1–T4), the most recent 15 recorded wheel velocity data (T1–T4) is erased from the memory, and along with that, the counter J value is changed to the value (J–15), and next, in step S132, after flag Fg4 is set to "1," the process returns to step S101, or, if in step S130 the answer is "no," the process returns to step S101 as is (see FIG. 23).

Thus, because once flag Fg4 is set, in the judgment in the next step S103, the answer is "no," the process moves from step S103 to step S123, and unless the vehicle is in a turning state, an acceleration or deceleration state, or on a low $\mu$ road, after step S130 the process returns to step S101.

Therefore, during this period, the wheel velocity data (T1–T4) does not accumulate in memory (refer to FIG. 24). In this manner, even though the wheel velocity data (T1–T4) may be acquired when the vehicle is traveling at a normal state, the wheel velocity data (T1–T4) for a determined number of wheel velocity data (T1–T4) just before the abnormal state of vehicle traveling is erased, and by means of this, the reliability of the wheel velocity data can be increased.

Next, steps S123–S139 prohibit the accumulation of wheel velocity data (T1–T4), when the abnormal traveling condition has been canceled, from the cancellation point in time for a fixed period of time. When there has been a change from the abnormal traveling condition to the normal traveling condition, because the answer in step S129 becomes "no," the process moves to step S133.

In step S133, whether or not flag Fg3=0 and Fg4=0 is judged. When the process has not moved to steps S126 and S130 (in other words, when the traveling condition has not changed from abnormal), or, in step S138, when after flag Fg3 and Fg4 have been reset, because the answer for the judgment in step S133 becomes "yes," from step S133, the process returns to step S101.

On the other hand, once the traveling conditions have moved to normal, in steps S128 or S132, flag Fg3 or flag Fg4 are set to "1," and, after that, in the case when the traveling conditions have changed to normal, the result of step S133 becomes "no," and the process moves to step S134. In step S134, whether or not flag Fg5 is "0" is checked, and when the judgment is "yes," in step S135 the timer TM3 is started, after being reset. Next, flag Fg5 is set to "1" in step S136, and after that the process moves to step S137. Or, when the result of step S134 is "no," the process moves to step S137.

In step S137, whether or not the time elapsed for timer TM3 is greater than the short time interval C (see FIGS. 23, 24 for reference), and when the time for timer TM3 has not reached the time for the short time interval C, the process returns from step S137 to step S101, however, because the judgment for the next time at step S103 becomes "no," because the process moves from step S103 to step S123, from steps S123–S125, S129, S133–S137 are repeated then the process returns, before the fixed time interval C has elapsed, the wheel velocity data (T1–T4) does not accumulate in the memory (see FIGS. 23 and 24 for reference).

So, if the fixed period of time C has elapsed, the judgment on step S137 becomes "yes," and the process moves to step S138, where flags Fg3 and Fg4 are reset to "0," next, flag Fg5 is reset to "0," and the process returns to step S101. The next time, because the answer to step S103 becomes "yes," the process moves from step S103 to step S104. In this manner, after the traveling condition has changed from abnormal to normal conditions until the fixed period of time C has elapsed, because the wheel velocity data (T1–T4) does not accumulate, the reliability of the wheel velocity data (T1–T4) can be increased.

Figure 17:
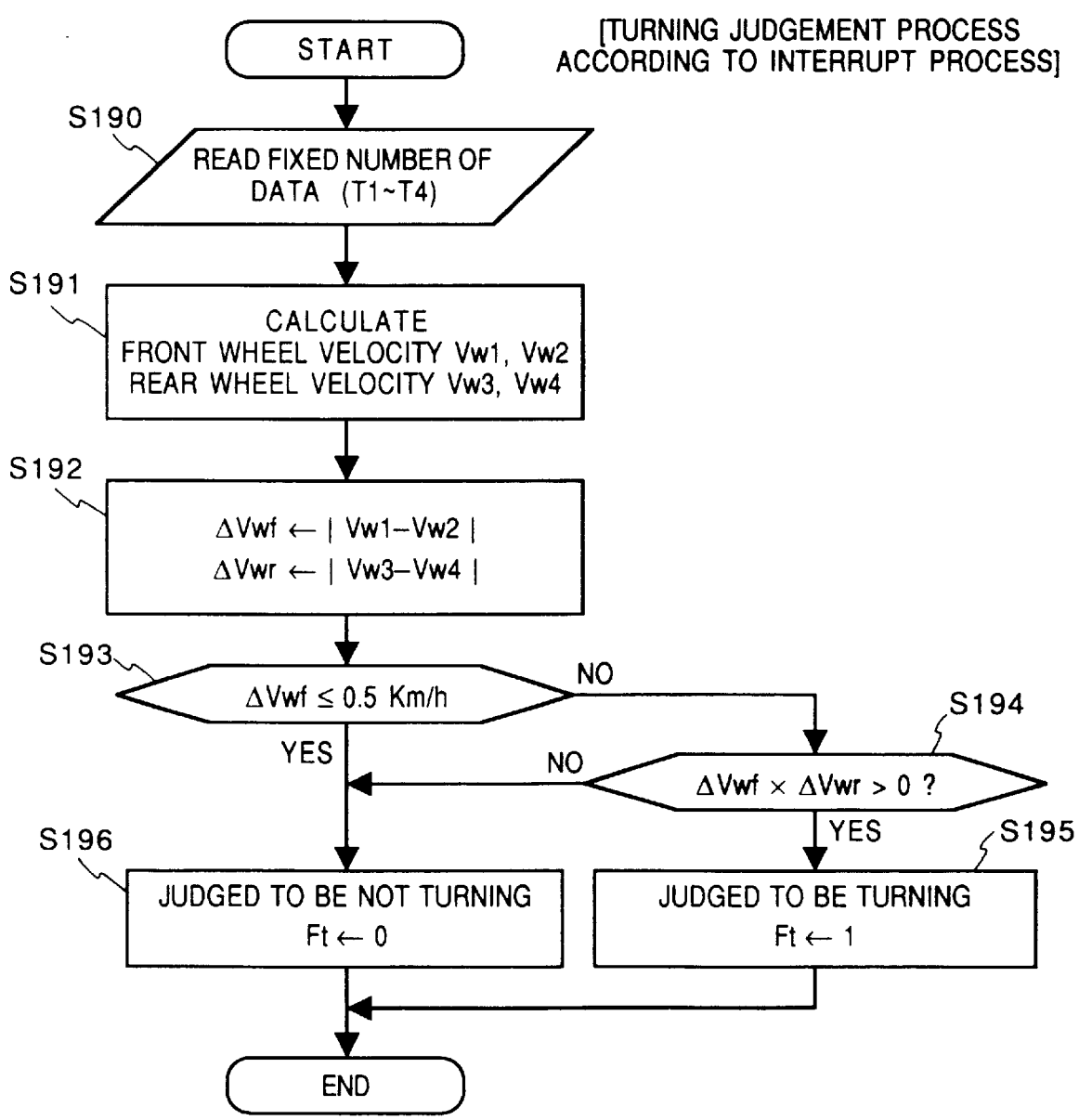
FIG. 17 is the flowchart for the revolving judgment process according to the interrupt process.

Next, in the aforementioned step S123, the turning judgment process, where whether or not it is a turning state is judged, will be explained with respect to FIG. 17. This process is carried out by an interrupting process for each of a fixed short interval of time.

First, a determined number of wheel velocity data (T1–T4) is read in step S190, next, the front wheel velocity Vw1 and Vw2 is calculated based upon the average value from the front wheels 1 and 2 wheel velocity data (T1, T2), then, the rear wheel velocity Vw3 and Vw4 is calculated based upon the average value from the rear wheels 3 and 4 wheel velocity data (T3, T4) in step S191.

Next, in step S192, the absolute value of the difference between the velocities of the front wheels is calculated as follows ΔVwf=|Vw1−Vw2|, and the difference between the velocities of the rear wheels is calculated from ΔVwr=|Vw3−Vw4|.

Next, in step S193 the absolute value of the difference in the front wheel velocities ΔVwf is judged as to whether it is less than 0.5 Km/h, and when the answer is "yes," in step S196, it is judged that it is not a turning state, and flag Ft is set to "0," and the process is completed.

On the other hand, when the ΔVwf is not less than 0.5 Km/h, in step S194, in order to check whether or not ΔVwf and ΔVwr are of the same sign is done by checking if (ΔVwf×ΔVwr)>0, and when the answer is "yes," is determined that it is a turning state, and flag Ft is set to "1," and the process is completed. Or, if the answer in step S194 is "no," then in step S196 it is judged that it is not a turning state, and flag Ft is set to "0," and the process is completed. The judgment in the aforementioned step S123 is carried out based on the flag Ft.

Figure 18:
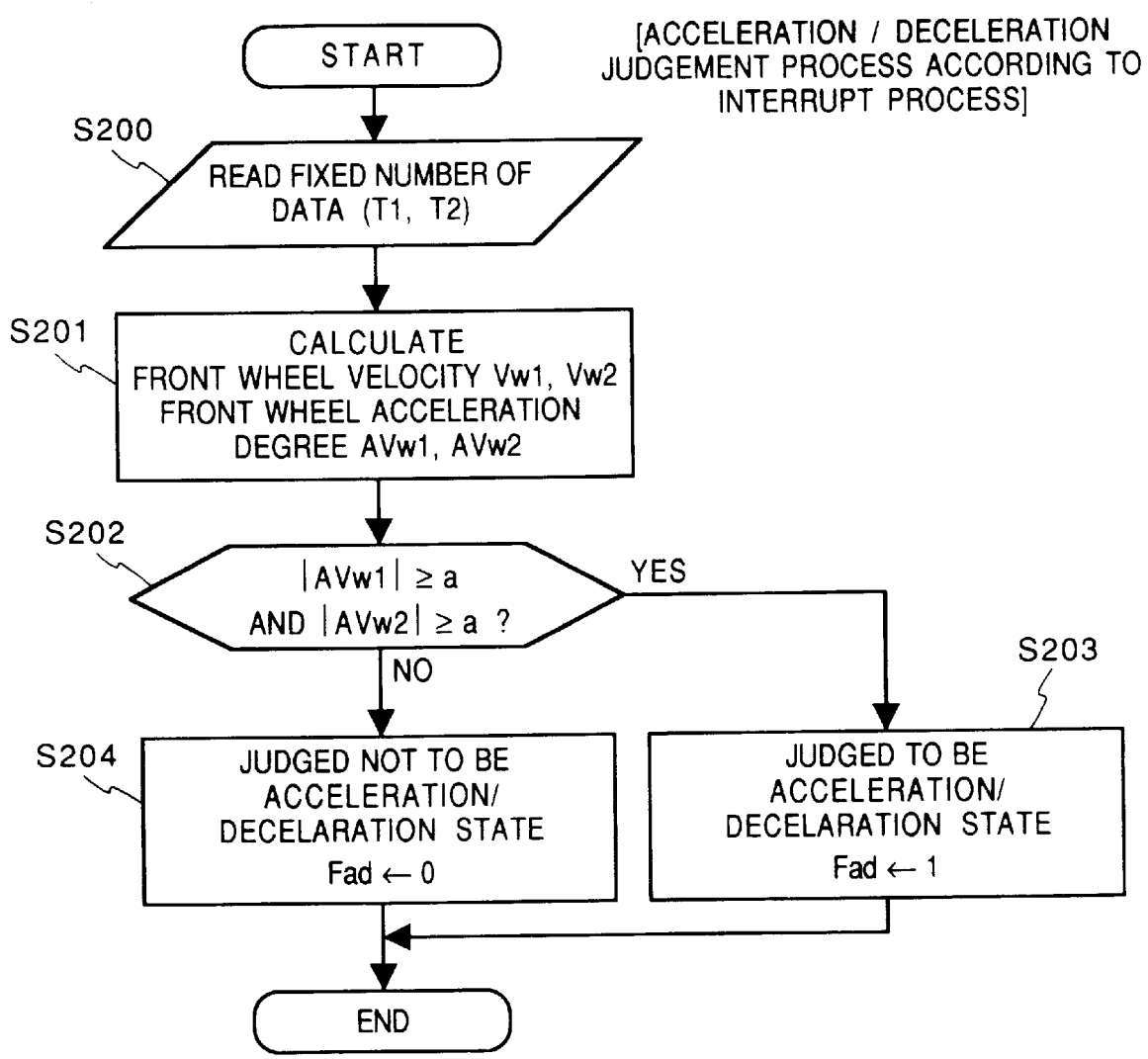
FIG. 18 shows the flowchart for the acceleration/deceleration judgment process according to the interrupt process.

Next, in the aforementioned step S124, the acceleration or deceleration judgment process, that determines whether or not it is an acceleration or deceleration state, will be explained in reference to FIG. 18. Furthermore, this process is carried out by an interrupting process for each of a fixed short interval of time.

First, a determined number of wheel velocity data (T1–T4) is read in step S200, next, the front wheel velocity Vw1 and Vw2 is calculated based upon the average value from the front wheels 1 and 2 wheel velocity data (T1, T2), then, the front wheel velocities Vw1 and Vw2 are differentiated, and the front wheel acceleration degree AVw1 an AVw2 are calculated in step S201. Then, whether or not both of the absolute values of the front wheel accelerations are greater than a prescribed value a is checked in step S202, when the answer is "yes," in step S203, where an acceleration/deceleration state is determined, the flag Fad is set to "1," and the process finishes. Or, in step S202, if the answer is "no," in step S204 it is determined that it is not an acceleration/deceleration state, and the flag Fad is set to "0," and the process finishes. The judgment in the aforementioned step S124 is carried out based upon the flag Fad.

Figure 19:
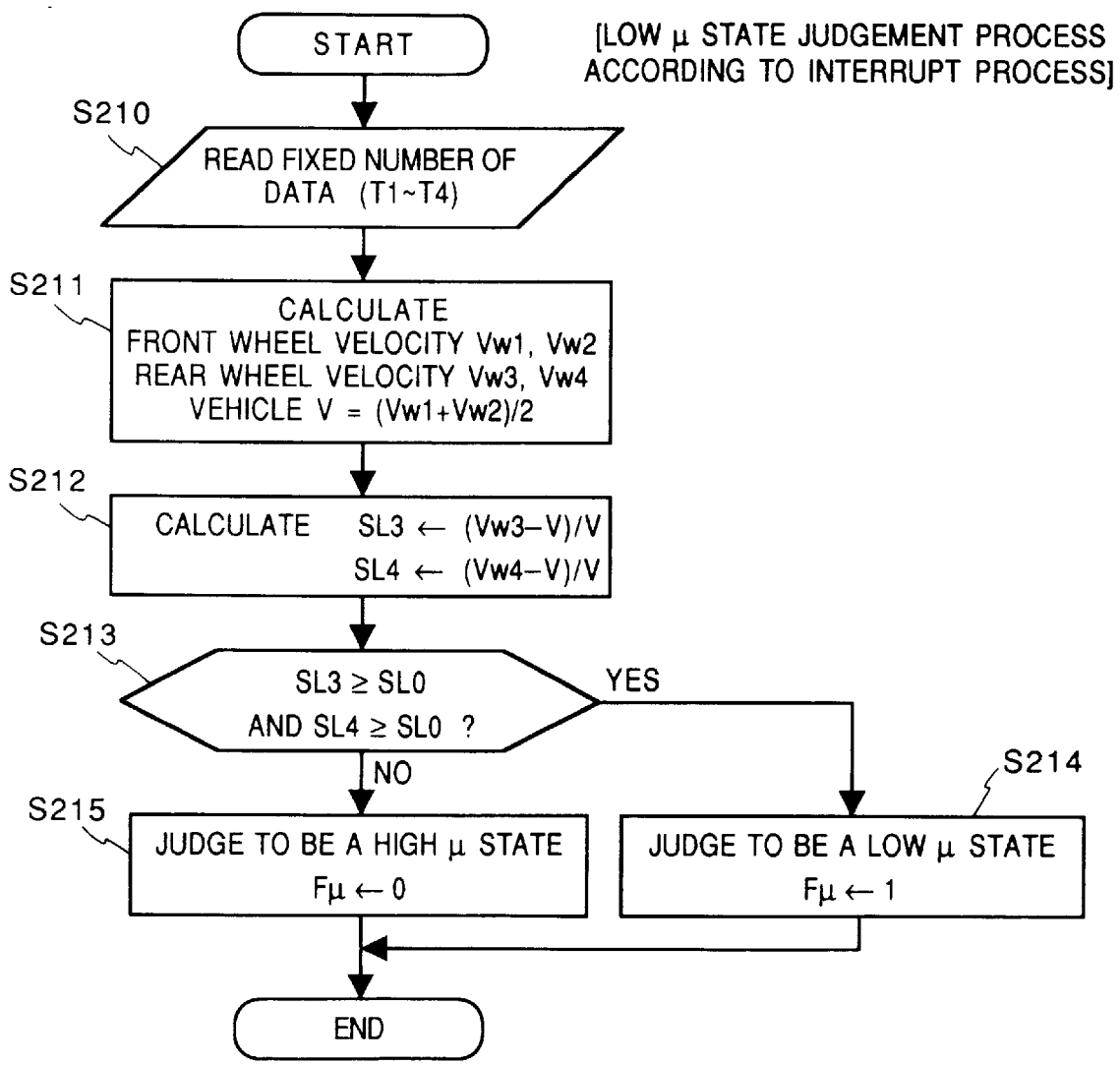
FIG. 19 shows the flowchart for the low $\mu$ road judgment process according to the interrupt process.

Next, in the aforementioned step S125, the low μ road judgment process, that determines if it is a low μ state, will be explained with the FIG. 19 as a reference. Furthermore, this process is carried out by an interrupting process for each of a fixed short interval of time.

First of all, a determined number of wheel velocity data (T1–T4) is read in step S210, next, in step S211, the front wheel velocity Vw1 and Vw2 is calculated based upon the average value from the front wheels 1 and 2 wheel velocity data (T1, T2), then, the rear wheel velocity Vw3 and Vw4 is calculated based upon the average value from the rear wheels 3 and 4 wheel velocity data (T3, T4) in step S191, then the vehicle velocity is calculated as the average value of the front wheel velocities, Vw1 and Vw2. Next, in step S212, the slip percentage of rear wheel 3 is determined from, SL3=(Vw3−V)/V, and the rear wheel 4 slip percentage is calculated from SL3=(Vw4−V)/V. Then, In step S213, whether or not both of the slip percentages SL3 or SL4 are greater than a prescribed value SL0 is checked, and when the answer is "yes," it is determined that it is a low μ state, the flag Fμ is set to "1," and the process is completed. Or, in step 213, if the answer is no, it is judged that it is a high μ state, the flag Fμ is set to "0," and the process is completed. the judgment of step S125 is carried out based upon Fμ.

Figure 20:
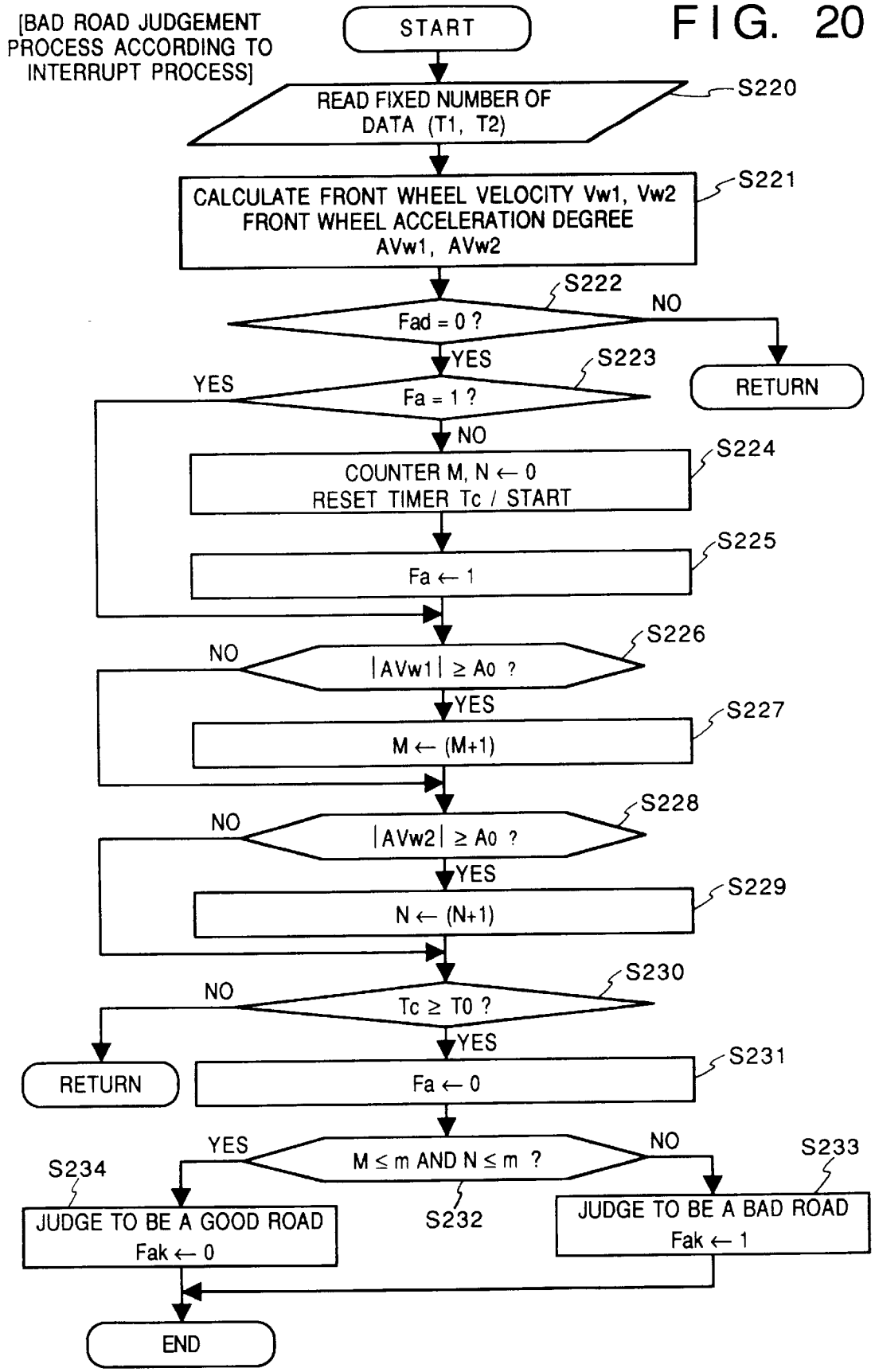
FIG. 20 shows the flowchart for the bad road judgment process according to the interrupt process.

Next, in the aforementioned step S129, the bad road judgment process, that determines if it is a bad road state, will be explained with the FIG. 20 as a reference. Further, this process is carried out by an interrupting process for each of a fixed short interval of time.

First of all, in steps S220 and 221, similarly to the aforementioned steps S200 and S211, the front wheel acceleration degree AVw1 and AVw2 are calculated, then, whether or not the acceleration flag Fad is "0" or not (in other words, whether or not it is in an accelerating or decelerating state) is checked in step S222. When it is in an accelerating or decelerating state, the process returns to step S220, or in the case that it is not on an accelerating or decelerating case, in step S223 whether or not the flag Fa is "1" is checked.

When the flag Fa is "0," in step S224 the counters M and N are set to 0, and the timer Tc is started, after being reset. Then, flag Fa is set to "1" in step S225, and the process moves to step S226. Also, if the judgment in step S223 is "yes," the process moves from step S223 to step S226.

In step S226, whether or not the absolute value of the front wheel acceleration degree AVw1 is greater than a prescribed value Ao is checked, and if the answer is "yes," the process moves to step S227, and the counter M is incremented. In step S228, whether or not the absolute value of the front wheel acceleration degree AVw2 is greater than a prescribed value Ao is checked, and if the answer is "yes," the process moves to step S229, and the counter N is incremented.

Then, in step S230, whether or not the time Tc, measured by timer Tc, is greater than a determined time To is checked, and until the time To elapses, the process from S230 until the return to S220 is repeated. When the time Tc becomes greater than that of To, the process moves from step S230 to step S231, and in step S231, Fa is reset to "0," then, in step S232, whether or not the value for counter M is less than the prescribed value m, and whether or not the counter N is less than the prescribed value m is checked.

If the answer to step S232 is "yes," in step S234 it is determined that it is a "good" road, and flag Fak is set to "0," and the process is completed. Or, if the answer to step 232 is "no," it is determined in step S233 that it is a bad road, and the flag Fak is set to "1," and the process is completed. In short, when traveling on a bad road, considering that the wheel velocities of the front wheels 1 and 2 change very easily, by counting the number of times that within a fixed period of time To, the degree of acceleration and deceleration of each of the left and right front wheels 1 and 2 grows abnormally large, from these counted values M and N, it can be judged as to whether or not the it is a bad road state. The judgment in the aforementioned step S129 is carried out based on the flag Fak.

Next, the tire air pressure judgment process, which, utilizing the group of wheel velocity data (T1–T4), collected according to the reading of the detected signal process as shown previously in FIGS. 13 and 14, in which a decrease on the tire air pressure is judged, and regarding this air pressure decrease, outputs a warning signal, will be explained using the FIGS. 15 and 16 as references. This process is an interruption process, according to the wheel velocity data reading interruption process, also, because the process is carried out in parallel, when the vehicle is traveling, the process is fundamentally being performed constantly.

First of all, each type of data stored in the memory (herein below necessary wheel velocity data, counter data, etc.) is read in step S150, then, whether or not the value for counter J is greater than 400 is checked in step S151, and if the answer is "no," the process returns. But, if the value becomes greater than or equal to 400, the process moves to step S152, and if flag Fg6 is "0" is checked. When flag Fg6=0, in step S153, the aforementioned counters K and L are added, and whether or not the value of the sum of the counters K and L, (K+L), is less than 80 is checked. The aforementioned counter K represents the number of times that the commenced pulse signal P1–P4 was canceled, and the counter L represents the number of times that, when the count of pulse signal P1–P4 was completed, the storing of the wheel velocity data was canceled, and the sum of the counters K and L, (K+L), is a parameter that represents the state of instability of the revolving state of the wheel 1'–4', in other words, it is a parameter that shows the reliability of the wheel velocity data (T1–T4) (refer to the x mark shown in FIG. 25).

For example, with good road conditions, the wheels 1'–4' revolve stably, and in the case when data is accumulated, the sum (K+L) becomes a small value. When the road surface is not that good, the sum (K+L) becomes a larger value.

When the judgment of step S153 is "yes," the set value for the number of data from the wheel velocity data (T1–T4), that is used for the tire air pressure Judgment, J0, is 400, in step S154. In this case, the tire air pressure judgment is carried out utilizing the wheel velocity data (T1–T4) for 400 revolutions of each of the four wheels.

When the result of the judgment of step S153 is "no," in step S155, it is checked if the sum (K+L) is less than 120. If the result is "yes," the value for the setting of J0 is set to 500 in step S156, then after flag Fg6 is set to "1," and the process returns.

When the result of the judgment in step S155 is "no," in step S158, whether or not the sum is less than 160 is checked, and when the result is yes, the value for J0 is set at 600 in step S159, and then, after flag Fg6 is set to "1," the process returns.

When the result of the judgment in step S158 is "no," because the reliability of the wheel velocity data (T1–T4) for the accumulated 400 revolutions is too low, in order to prohibit the application of that wheel velocity data (T1–T4), the process moves to step S168, and the counters J, K, and L are set to 0, and the set value for J0 is set to 400, and the accumulated data in memory from J0=0 for the wheel velocity data (T1–T4) is erased in step S168, and after that, the process returns.

In the case that the sum value (K+L) is less than 80 in step S153, whether or not the count value for the counter J0 is greater than the set value for J0 is checked in step S161, in this case, because the wheel velocity data (T1–T4) for 400 wheel revolutions is already completely accumulated, the judgment becomes "yes," and the process moves to step S162. At step S162, the flag Fg6 is set to "0," and thus, in the case that the value of the sum is less than 80, the flag Fg6 remains at "0."

On the other hand, in the case that the process has returned from step S157, steps S150–S152, S161 are repeated, a group of 100 wheel velocity data (T1–T4) corresponding to 100 wheel revolutions is added, in the judgment in step S161 becomes "yes," the process continues to step S162 and flag Fg6 is reset to "0." Or, in the case that the process has returned from step S160, steps S150–S152, S161 are repeated, a group of 200 wheel velocity data (T1–T4) corresponding to 200 wheel revolutions is added, in the judgment in step S161 becomes "yes," the process continues to step S162 and flag Fg6 is reset to "0."

In this fashion, a group of wheel velocity data (T1–T4) utilized for the tire air pressure judgment is prepared, and in step S163, the sums of the wheel velocity data (T1–T4) for 400 wheel revolutions, for 500 wheel revolutions, and for 600 wheel revolutions and the average time Tm1–Tm4 for one wheel revolution are calculated.

As before, the wheel velocity data (T1–T4) is collected under various conditions, for example, when the vehicle is climbing a hill, the amount of drive wheel slip grows larger, and the reliability of the tire air pressure judgment decreases, or the slip is also effected by gravel, snow, water, or road depressions and bumps that, while not classifying the road as a low $\mu$ road, as they manifest only intermittently, cause the drive wheel to slip, or, even on a slip road, only one of the drive wheels may slip, or, according to the loading or the passengers, the wheel velocity data (T1–T4) may not be consistent. Considering these examples, in steps S164–S167, whether or not the said average time for one wheel revolution Tm1–Tm4 is checked to see if it is suitable for use in the tire air pressure judgment. In short, in steps S164–S167 is the routine that determines if the wheel velocity data is suitable or not.

Figure 26:
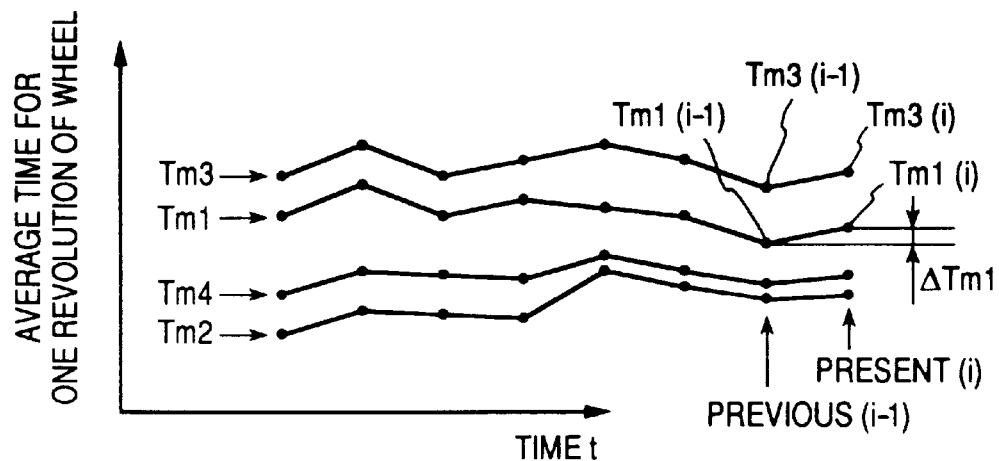
FIG. 26 is a time chart for the average time for one wheel revolution (wheel velocity data).

In step S164, in order to check to see of the change on the wheel velocity data for both the front and rear wheels of the left side is in the same direction, and the same check is performed for the right hand side tires by the following 2 equations, $\Delta Tm1 \times \Delta Tm3 \geq 0$, $\Delta Tm2 \times \Delta Tm4 \geq 0$. Where, as shown in FIG. 26, $\Delta Tmi$ (where, i=1–4) is the amount of change from the previous value to the present value for each.

When the answer in step S164 is "no," because the change in the 4 wheel velocity data is abnormal, and in order to prohibit the application of the average time for one wheel revolution Tm1–Tm4 in the tire air pressure judgment process, in step S168, the counters J, K, and L are set to zero, and the set value for J0 is set to 400, then the wheel velocity data stored in memory from the J=0 time is erased, and after that, the process returns.

When the answer for step S164 is "yes," in step S165, whether or not the absolute value of $\Delta Tm1$ (where i=1–4) is less than a prescribed value $\alpha$ is checked, and in the case that one of the $\Delta Tm1$–$\Delta Tm4$ values, or a multiple of the $\Delta Tm1$–$\Delta Tm4$ data is greater than the prescribed value a, because the change in the wheel velocity data is abnormal, the process moves to step S168.

When the answer to step S165 is "yes," in step S166, the slip percentage of the left drive wheel (rear wheel 3), SL=(Tm1−Tm3)/Tm1, and the slip percentage of the right rear wheel (rear wheel 4), SL=(Tm2−Tm4)/Tm2, are calculated.

Then, in step S167, whether or not the slip percentages SL, SR are greater than 0, and less than a prescribed value $\beta$ is checked, and if the answer is "no," then, according to the effect of the hill, the rear wheel slip amount is determined to be excessive, and the process moves to step S168.

Figure 16:
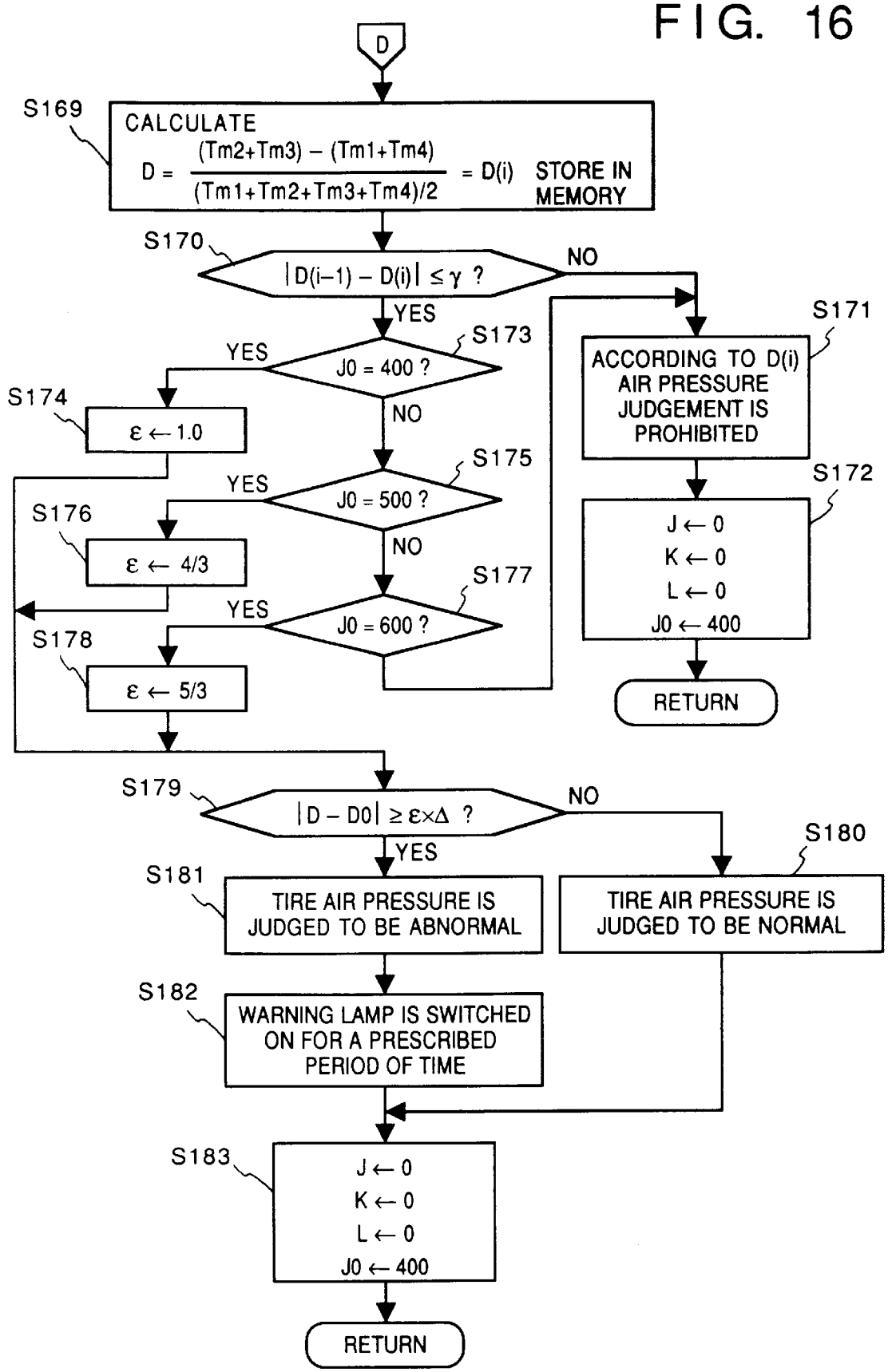
FIG. 16 shows the remainder of the flowchart for the tire air pressure judgment.

In step S167, when the answer is "yes," then the average time for one wheel revolution determined in this iteration is determined to be suitable for use in the tire air pressure judgment, and the process moves on to step S169 of FIG. 16.

In step S169, the judgment variable D for the tire air pressure judgment, is calculated from the equation shown in the figure, and that calculated value for the judgment variable D is stored in memory as the judgment value for this iteration D(i). Next, in step S170, the absolute value of the difference between the previous judgment variable D(i−1) and the current judgment variable D(i) is checked to see if it is less than the prescribed value γ, and if the answer is "no," the current iteration judgment variable D(i), because, when compared to the previous judgment variable D(i−1), has changed abnormally, and it is not desirable to utilize the judgment variable for this iteration D(i) right away in order to determine a decrease in the tire air pressure, in step S171, the tire air pressure judgment by means of the current iteration judgment variable D(i) is prohibited. Then, the average time for one wheel revolution Tm1–Tm4 in the tire air pressure judgment process, in step S172, the counters J, K, and L are set to zero, and the set value for J0 is set to 400, then the wheel velocity data stored in memory from the J=0 time is erased, and after that, the process returns. (Please refer to FIG. 27)

Then, when the answer to the judgment in step S170 is "yes," in order to set the threshold value ε×Δ, that is applied to the said number of data set value J0, in steps S173 and S174 when the set value for J0 is 400, the ε is set to ε=1.0, in steps S175 and S176 when the set value for J0 is 500, the ε is set to ε=4/3, or in steps S177 and S178, when the set value for J0 is 600, the ε is set to ε=5/3, and the process then moves to step S179. In step S179, the absolute value of the difference between the current iteration judgment variable D and the initially set value for the judgment variable D0, is checked to see whether it is greater than the threshold value ε×Δ (where, Δ is a prescribed coefficient, with a value within the range from 0.02 to 0.05). The details regarding the subroutine for the setting process for the initial value for the judgment variable D0 will be explained herein below, based upon the FIG. 21.

When the answer to the judgment in step S179 is "no," it is determined that the four wheel tire air pressure is normal, and then the process moves to step S183. In step S183, similarly to step S172, the counters J, K, and L are set to zero, and the set value for J0 is set to 400, then the wheel velocity data stored in memory from the J=0 time is erased, then after that, the process returns. (Please refer to FIG. 27)

Then, when the answer to the judgment in step S179 is "yes," in step S181, it is determined that one of the four wheels' tire air pressure is abnormal (has decreased), and next, the warning lamp 56 is flashed for a fixed period of time, then the process moves to step S183.

Figure 27:
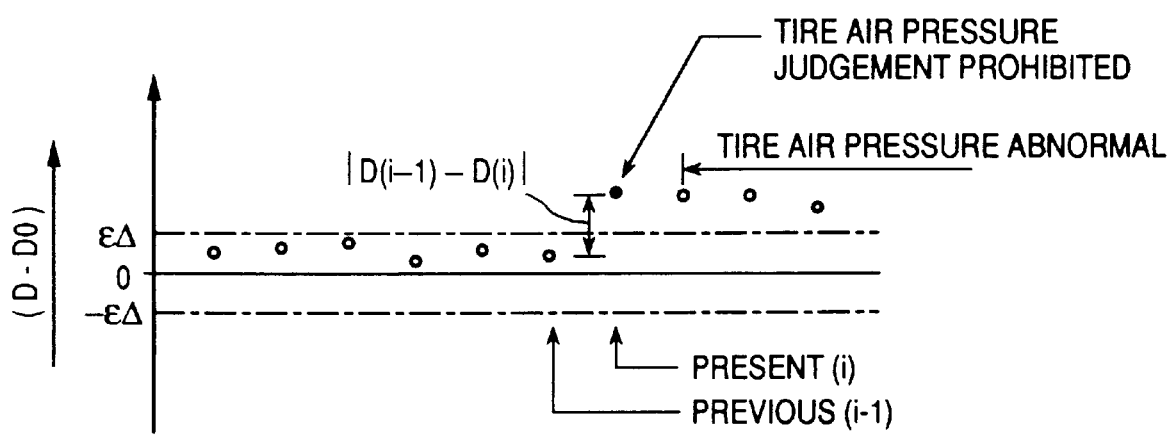
FIG. 27 is a time chart showing the difference between the judgment value and the judgment variable initial value (D–D0).

Here, as is shown in FIG. 27, in the case that the tire air pressure is normal, the absolute value of (D−D0) becomes less than the threshold value ε×Δ.

In other words, when the tire air pressure decreases, the wheel velocity of the wheel with the decrease in air pressure grows larger. For example, in the case that the air pressure for front wheel 2 or rear wheel 3 has decreased, the judgment variable D, compared to the initial judgment variable D0 becomes larger, or, in the case that the air pressure for front wheel 1 or rear wheel 4 has decreased, the judgment variable D, when compared to the initial value D0 becomes smaller, and by comparing the absolute value (D−D0) to the threshold value ε×Δ, a decrease in the tire air pressure can be determined.

As shown in the black circles in FIG. 27, when the tire air pressure decreases, the judgment variable D changes rather largely, but, there is the possibility that the judgment variable D can undergo a large temporary change, due to instabilities in the wheel velocity data, or instabilities in the vehicle traveling state. Thus, in order to raise the reliability of the air pressure judgment, furnished in step S170, in the case that the judgment variable D has undergone a large changed as compared to the previous value, the tire air pressure judgment is prohibited.

However, in the case that one of the tires has actually undergone a decrease in the tire air pressure, the difference between the current iteration value for the judgment value D and the value for the next iteration value will not grow large, and the result of step S170 will become "yes," and in step S179, the decrease of the tire air pressure can be accurately judged.

As heretofore explained, according to this tire air pressure control, a teach detection cycle, in short, for each wheel revolution, by the means for starting the pulse signal count, the interval, and the completion means, the reliability for the wheel velocity data can be improved, also, for the period of time when the vehicle travel condition is abnormal, and for a period of time just prior to the abnormal traveling condition, by prohibiting the accumulation of the vehicle data, the reliability of the wheel velocity data can be improved.

Furthermore, by means of steps S154, S156, and S159, the set value J0 is increased for the applied wheel velocity data (T1–T4) in which the reliability has decreased. Because the number of wheel velocity data, which is utilized to determine one air pressure judgment, is increased, a decrease in the reliability of the wheel velocity data can be prevented.

Furthermore, from steps S164–S167, the decrease in the reliability of the tire air pressure judgment caused by the road conditions and the road instabilities, can be reliably prevented.

Furthermore, in step S170, when the current iteration judgment variable has changed greatly from the value of the previous iteration judgment variable, because the air pressure judgment by means of the current iteration judgment value is prohibited, tire air pressure misjudgments can be prevented, and the accuracy and reliability of the air pressure judgment can be improved.

Figure 21:
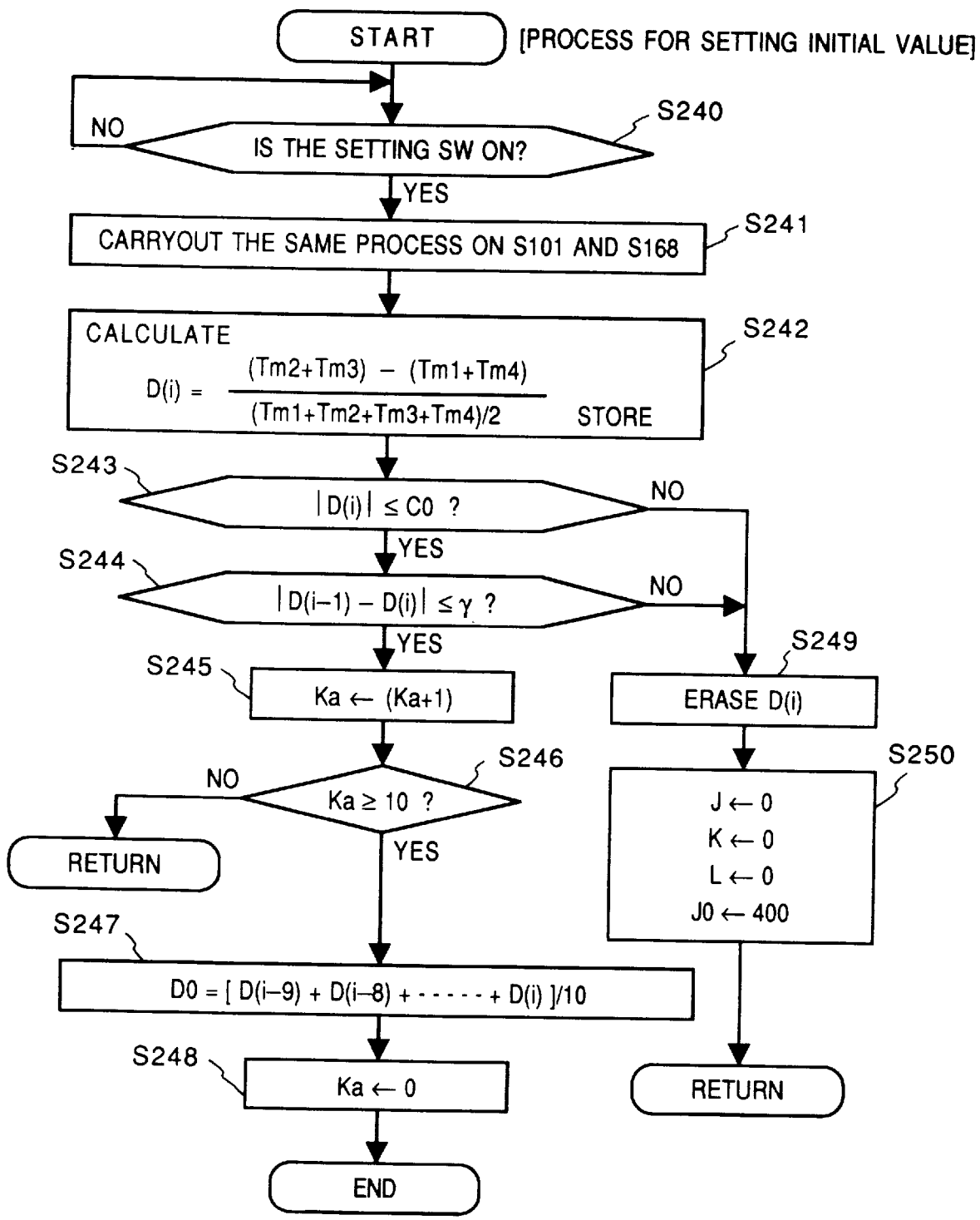
FIG. 21 is the flowchart for initial settings process.

Next, the initial value setting process for determining the initial value for the judgment variable D0 will be explained while referring to the FIG. 21. This initial setting process, in the case when the car is newly used, when one of the four tires has been changed, when the state of four tires has undergone a change, or in the case that tire wear has progressed and the tire state has changed for the four tires, is carried out when the initial settings switch 55 has been operated.

First, in step S240, whether or not the initial settings switch 55 as been operated or not is determined, and when the answer is "no," the process returns. When the initial settings switch 55 has been operated, in step S241, the same processes that have been previously carried out in steps S101–S168 in FIGS. 13, 14, and 15, are carried out.

Then, in step S242, the judgment variable D(i) for the current iteration is calculated according to the equation in the figure, and stored in memory. Then, in step S243, whether not the absolute value of the judgment variable D(i) is less than the prescribed value C0 is determined, and when the answer is "no," because, according to the effect of the road conditions or the running conditions, the possibility that the judgment variable D(i) has become unsuitable is rather high, the process moves to step S249, where the D(i)

for the current iteration is erased from the memory, then, in step S250, the counters J, K, and L are reset, the set value for J0 is set to 400, and after that, the process returns.

On the other hand, when the result of step S243 is "yes," in step S244, the difference between the previous judgment variable D(i−1) and current iteration judgment variable D(i) is judged as to whether or not it is less than the prescribed value y, and when the result is "no," because, compared to the previous judgment variable D(i−1) the amount of change of the current judgment variable D(i) is large, the reliability is lacking, and the process moves to S249. In step S244 when the result is "yes," the counter Ka is incremented. The counter Ka is initially set to "0" when the control process is started.

Then, in step S246, whether or not the value of counter Ka is greater than 10 is checked, when the result is "no," in step S241 (or FIG. 13, S101) it returns and the process repeats, and 10 of the judgment variables are stored in memory, when step S246 becomes "yes," in step S247, the initial setting for D0 is calculated as the average of the 10 judgment variables D (i−9), D(i−8), . . . D(i), and the average value is stored in memory as the initial setting for D0. Then, the counter K is reset to 0, and the initial settings process is completed. In this manner, because the initial value of the judgment variable D0, carefully calculated as the average value of 10 judgment values D, the reliability of the initial setting value of D0 can be improved. Next, varying a part of the aforementioned preferred embodiment, various other examples will be discussed.

First, six examples of possible changes in the steps S164–S167 on FIG. 15 for the wheel velocity data suitability judgment routine will be discussed based upon the FIGS. 28–34.

Figure 28:
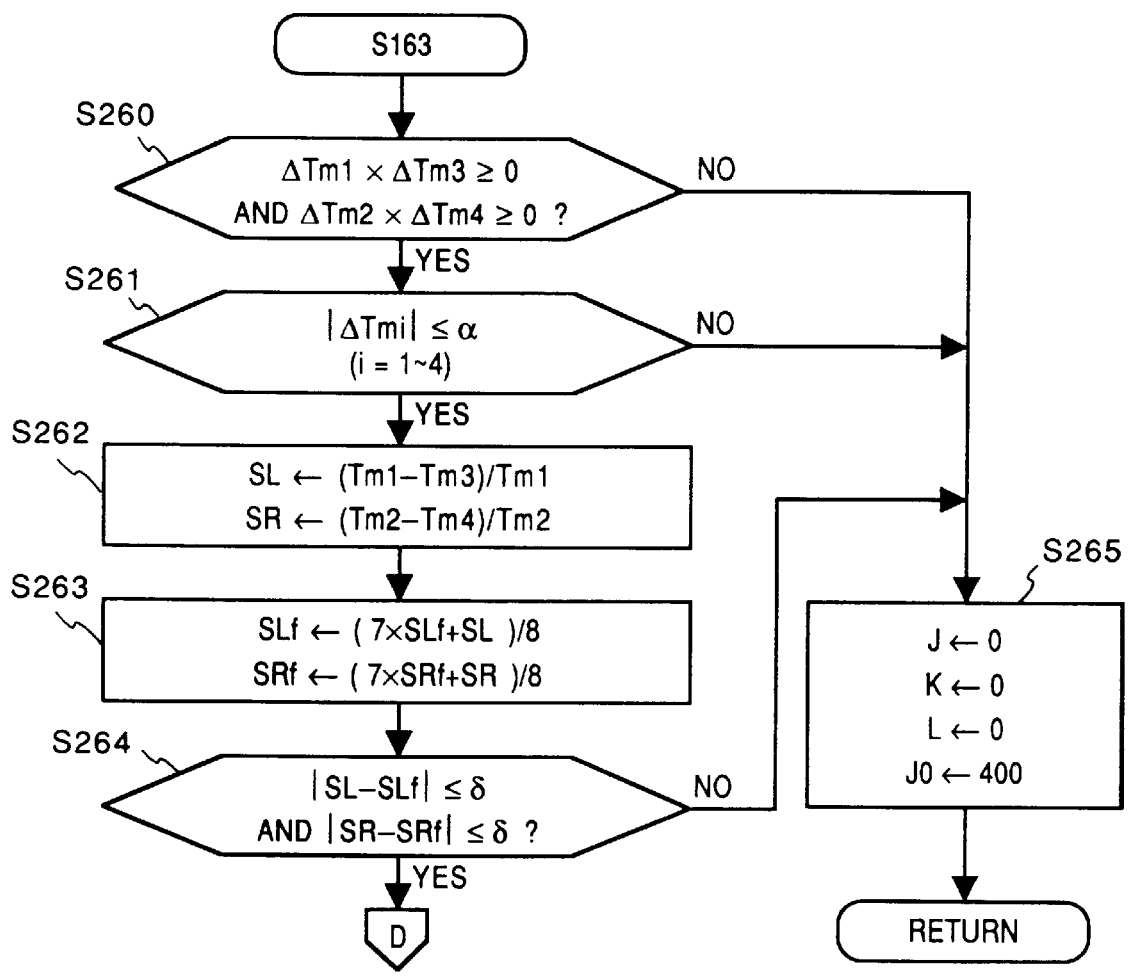
FIG. 28 is a flowchart for the wheel velocity suitability judgment routine for the first varation example.
Figure 29:
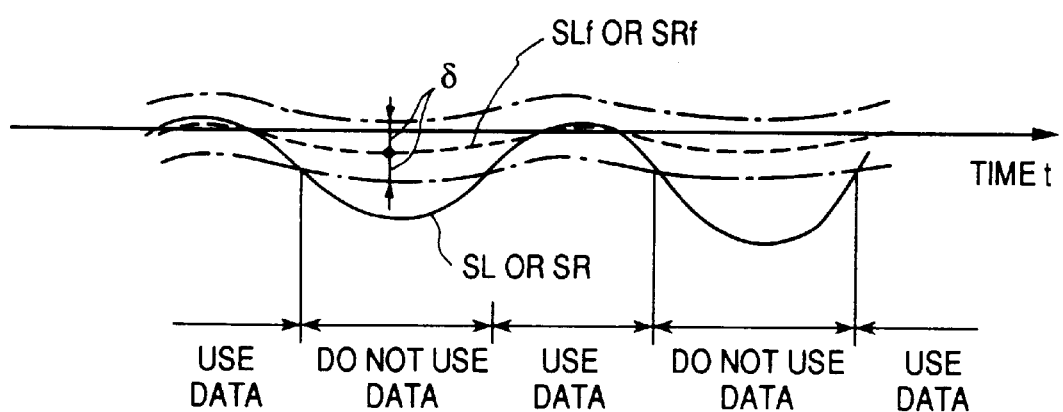
FIG. 29 illustrates a time chart showing the acceptance and rejection of the data, the slip percentage, and the annealed value.

(1) First Variation Example (FIGS. 28, 29)

Figure 15:
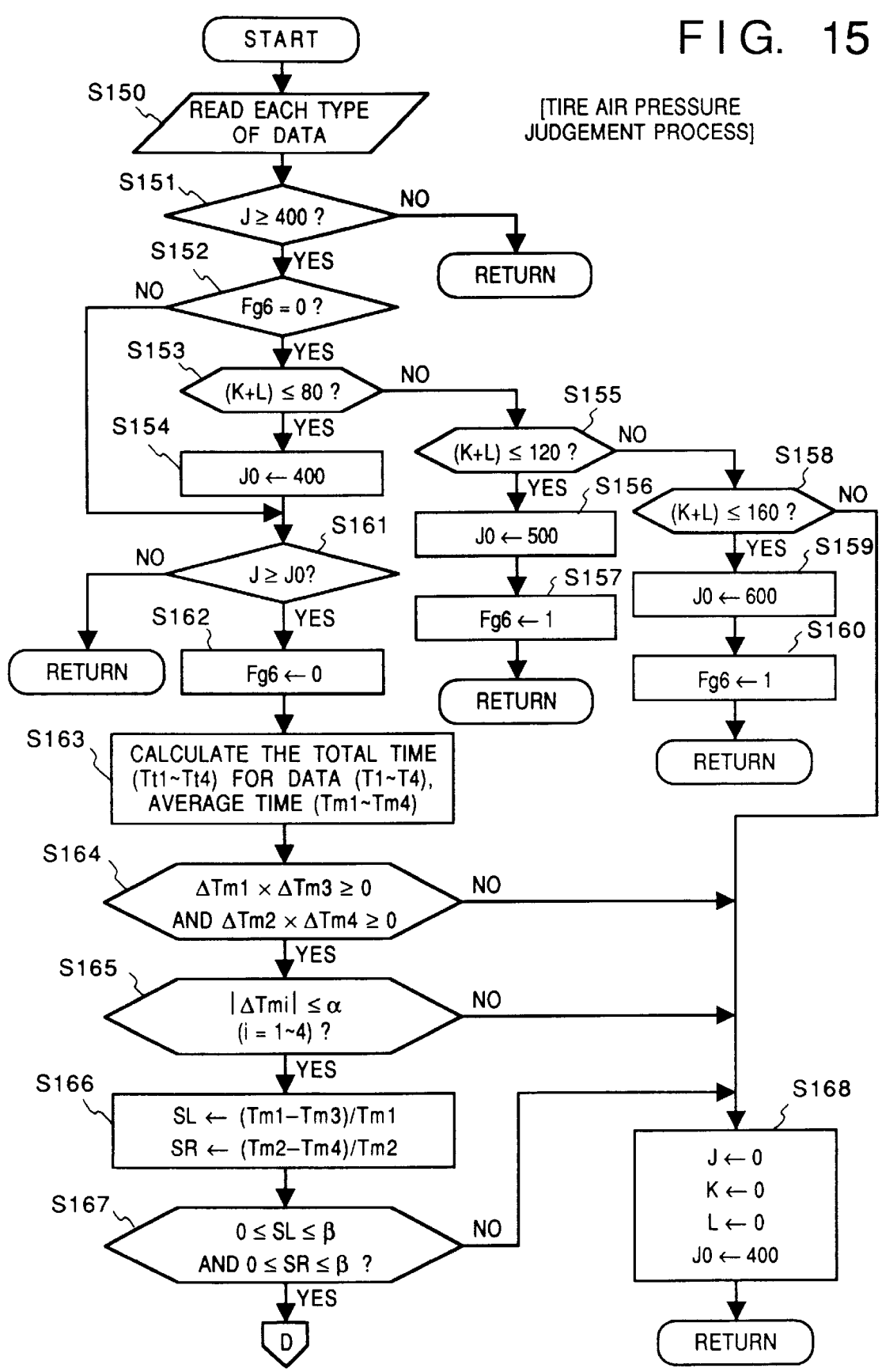
FIG. 15 illustrates a part of the flowchart for the tire air pressure judgment.

As shown in FIGS. 28 and 29, because steps S260–S262 are the same as steps S164–S166 in FIG. 15, the explanations will be omitted. In step S263, the slip coefficient SL and SR, as well as the values SLf and SRf are calculated according to the equations shown in the figure. Then, in step S264, whether or not the absolute value of (SL−SLf) is less than the prescribed value δ (where δ is approximately 0.001), and whether or not the absolute value of (SR−SRf) is less than δ is checked, and when the result is "no," the process moves to S265, or, when the result of step S264 is "yes," the process moves to step S169 on FIG. 16. Here, as the step S265 is the same as the step S168, the explanation will be omitted.

In summary, as shown on FIG. 29, the slip percentage SL and SR, and the values SLf and SRf are compared, in each and every case that the SL and SR are larger than δ, that group of wheel velocity data (T1–T4) (400, 500, or 600 wheel revolutions) is not used, and tire air pressure judgment using that data is prohibited, and the whole group of data is erased from memory.

Figure 30:
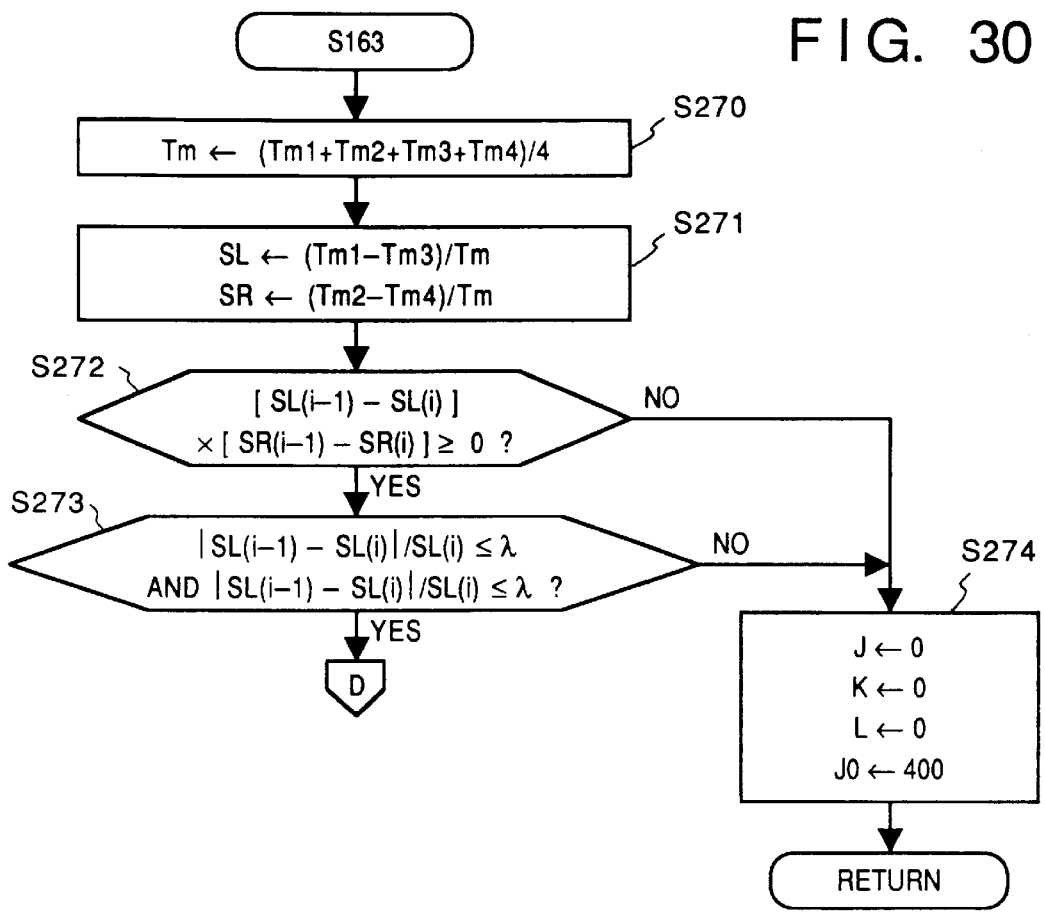
FIG. 30 is the flowchart for the wheel velocity data suitability routine concerning the second variation example.

(2) Second Example Variation (FIG. 30)

As shown on FIG. 30, in step S270, the four wheel average time for one velocity is calculated from the equation in the figure shown, then, in step S271, the slip percentage SL and SR for the left and right drive wheels 3 and 4, are calculated from the equation shown in the figure, then, in step S272, whether or not the direction (sign) of the current slip percentage SL(i) change, is in the same direction as the previous slip percentage SR(i−1) is checked by the shown inequality equations, and if the result is "no," the process moves to step S274, which is the same as the previously explained step S168.

When the result of step S272 is "yes," in step S273, whether or not the percentage of change of the current slip percentage SR as compared to the previous slip percentage SR(i−1) is less than the prescribed value λ (where λ is approximately 0.003), and, whether or not the percentage of change of the current slip percentage SL as compared to the previous slip percentage SL(i−1) is less than the prescribed value λ, is determined from the inequality equations shown in the figure, when the result is "no," because the slip amount of the rear drive wheels is large, the process moves to step S274, or, when the result is "yes," the process moves to step S169 in FIG. 16.

Figure 31:
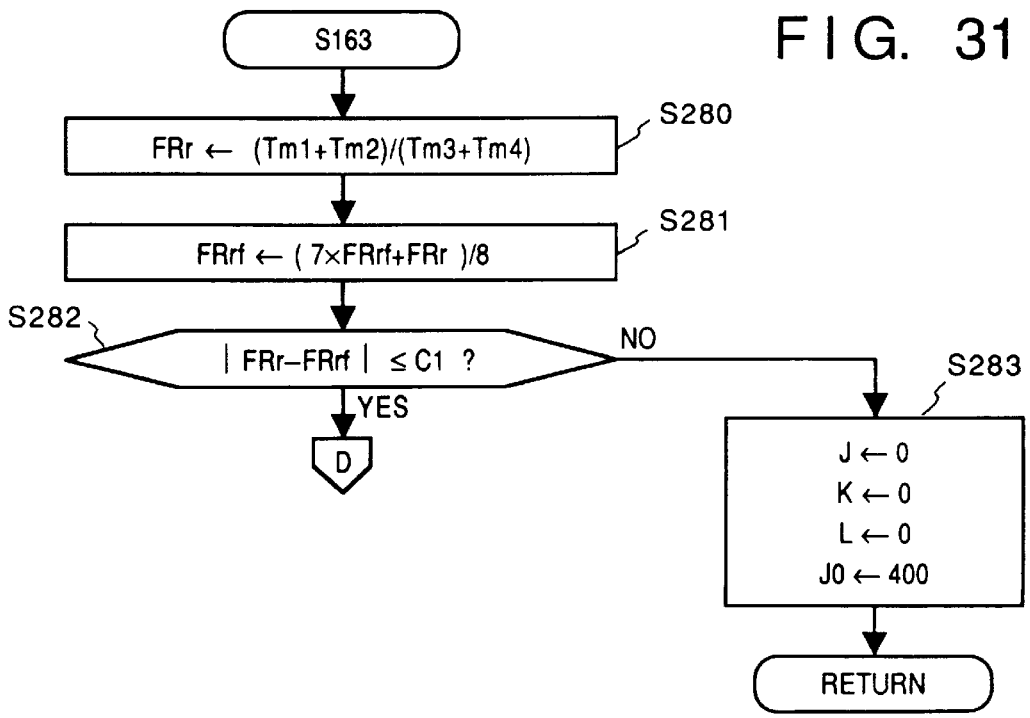
FIG. 31 is the flowchart for the wheel velocity data suitability routine concerning the third variation example.

(3) Third Example Variation (FIG. 31)

As shown in FIG. 31, the front rear wheel velocity ratio FRr is calculated from the following equation, in step S280.

$$FRr=(Tm1+Tm2)/(Tm3+Tm4)$$

Then, from the equation in step S281, the front rear wheel velocity average ratio. FRrf is calculated from the following equation.

$$FRrf=(7 \times FRrf+FRf)/8$$

Then, in step S282, whether or not the absolute value of (FRr−FRrf) is less than C1 is checked, when the answer is "no," because the rear wheel slip is large, the process moves to step S283, which is the same as step S168, or, when the answer is "yes," the process moves to step S169 in FIG. 16.

Figure 32:
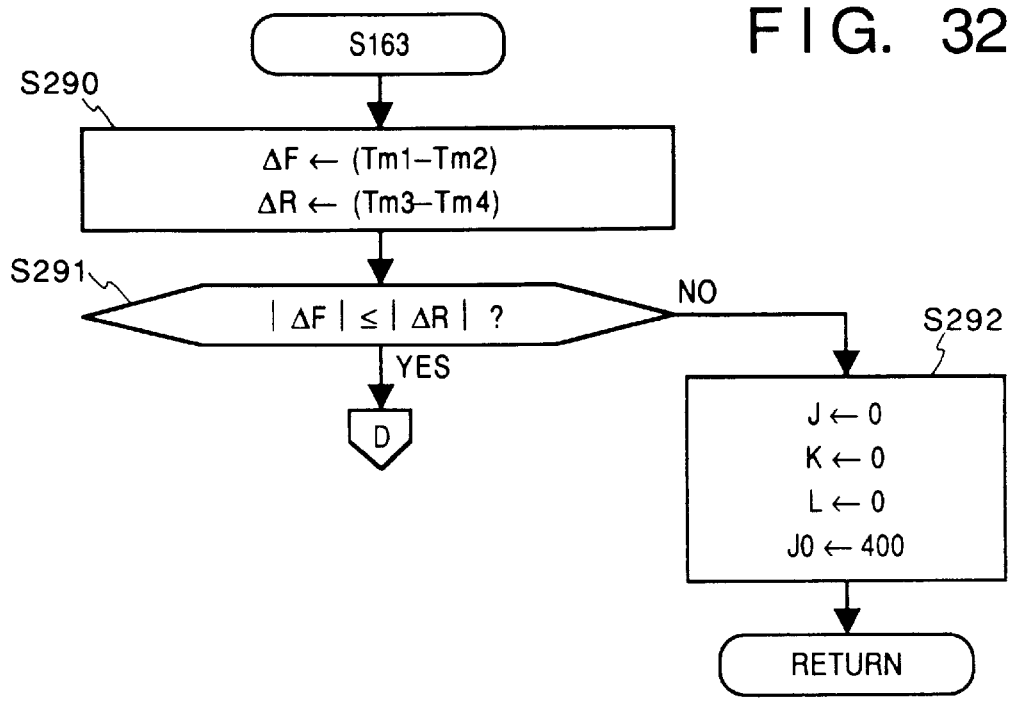
FIG. 32 is the flowchart for the wheel velocity data suitability routine concerning the fourth variation example.

(4) Fourth Variation Example (FIG. 32)

As shown in FIG. 32, in step S290, the difference between the time for one revolution for the front wheels 1 and 2, $\Delta F$, and the difference between the number of revolutions for the rear wheels $\Delta R$, are calculated from the equations shown in the figure, then in step S291, whether or not the absolute value of $\Delta F$ is less than the absolute value of $\Delta R$ is checked, and when the result is "no," because the rear wheel slip is large, the process moves to step S292, which is identical to step S168, or, when the result is "yes," the process moves to step S169 in FIG. 16.

Figure 33:
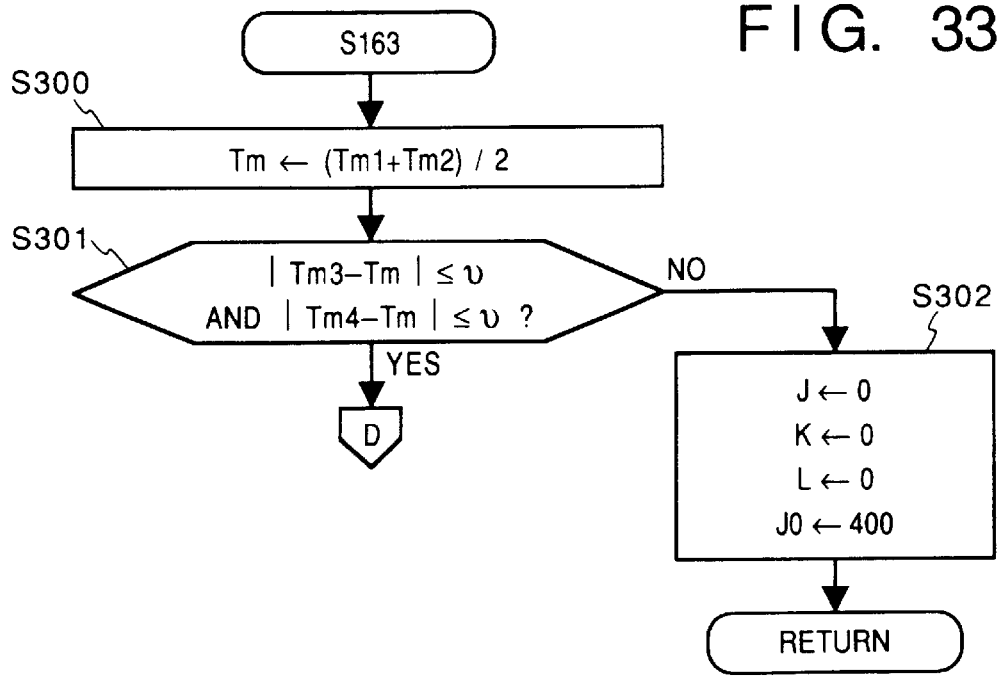
FIG. 33 is the flowchart for the wheel velocity data suitability routine concerning the fifth varation example.

(5) Fifth Variation Example (FIG. 33)

As shown in FIG. 33, in step S300, the average time for one wheel revolution Tm for the front left and right wheels 1 and 2, is calculated from the equation Tm=(Tm1+Tm2)/2, then, in step S301, whether or not the absolute value of (Tm3−Tm) is less than the prescribed value υ, and, whether or not the absolute value of (Tm4−Tm) is less than the prescribed value υ, is checked, and if the result is "no," then, because the slip amount of the drive wheels is large, the process moves to step S 302, which is the same as step S108, or, when the result is yes, the process moves to step S169 in FIG. 16.

Figure 34:
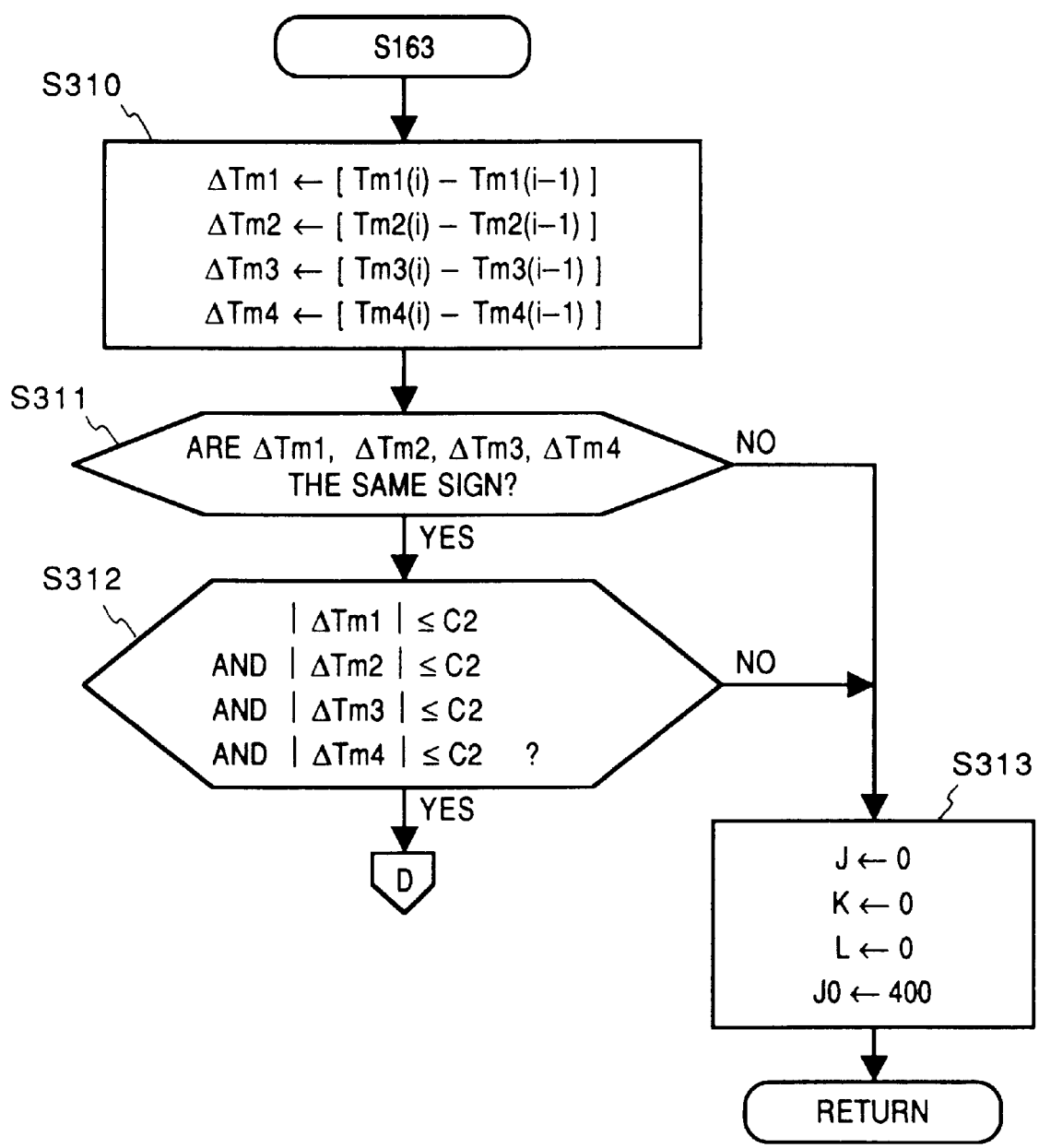
FIG. 34 is the flowchart for the wheel velocity data suitability routine concerning the sixth variation example.

(6) Sixth Variation Example (FIG. 34)

As shown in FIG. 34, in the calculation of step S301, change in time for one wheel revolution of the current iteration, as compared to the change in time for one wheel revolution for the previous iteration, $\Delta Tm1$, $\Delta Tm2$, $\Delta Tm3$ and $\Delta Tm4$ are calculated from the equation shown in the figure, then, in step S311, whether or not the signs of all the variation amounts $\Delta Tm1$, $\Delta Tm2$, $\Delta Tm3$ and $\Delta Tm4$ are the same is checked, when the result is "no," because the wheel revolutions are unstable, the process moves to step S313, which is the same as step S168, or, when the answer is "yes," the process moves to step S312.

In step S312, whether or not each of the absolute values of the previously determined $\Delta Tm1$, $\Delta Tm2$, $\Delta Tm3$ and $\Delta Tm4$ are less than the prescribed value C2 is checked, and when the answer is "no," because either it is an accelerating or decelerating state, or the drive wheel slip is large, the process moves to step S313, or, when the result is "yes," the process moves to step S169 in FIG. 16.

Figure 35:
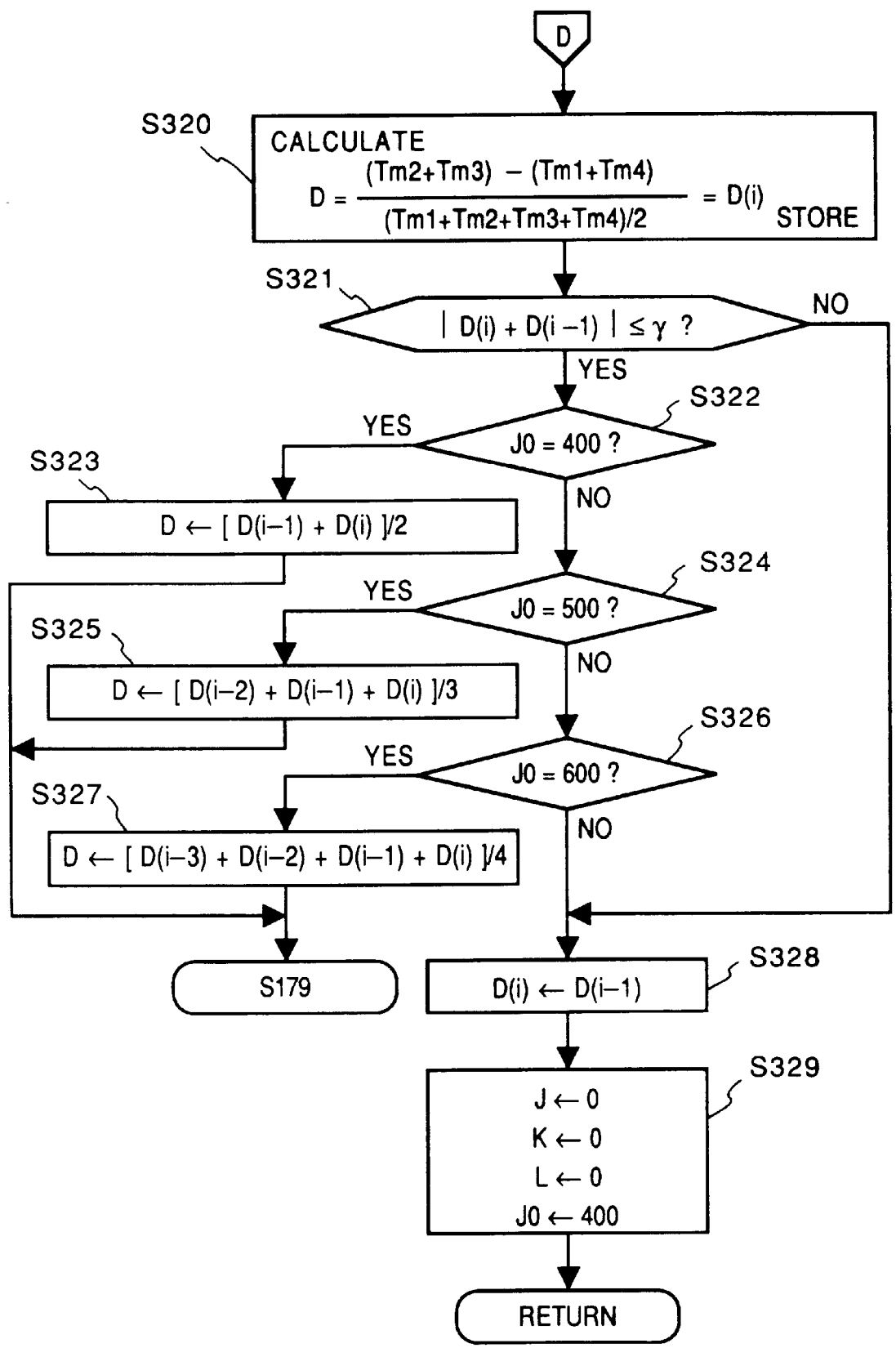
FIG. 35 is the flowchart for the judgment variable setting routine for the seventh variation example.

(7) Seventh Variation Example (FIG. 35)

This is an explanation of a judgment variable setting routine instead of the steps S169–S178 in the previous FIG. 16. As shown in FIG. 35, the steps S320, S321, S322, S324, S326, and S329, are each the same as the steps S169, S170, S173, S175, S177, and S172 respectively, and thus the explanations for these steps will be eliminated. In step S328, in the case that the current judgment variable D(i) is unsuitable, in step S328, the current judgment variable D (i) is given the value of the previous judgment variable D(i−1), and the process moves to step S329. When the set value J0 is 400, the process moves from step S322 to step S323, and the judgment variable D is set as the average of the movement of the value of the past two judgment variables, or, in the case that the set value of Jo is 500, the process moves from step S324 to step S325, and the judgment variable D is set as the average of the movement of the previous three judgment variables, or, if the set value for J0 is 600, then the process moves from the step S324 to the step S327, and the judgment variable D is set as the average of the movement of the previous four judgment variables, and the process moves from either step S323, S325, or S327 to step S179.

In this manner, even as the wheel velocity data with low reliability is applied, by increasing the number of data that determines the average movement, the reliability of the judgment variable can be improved.

Figure 36:
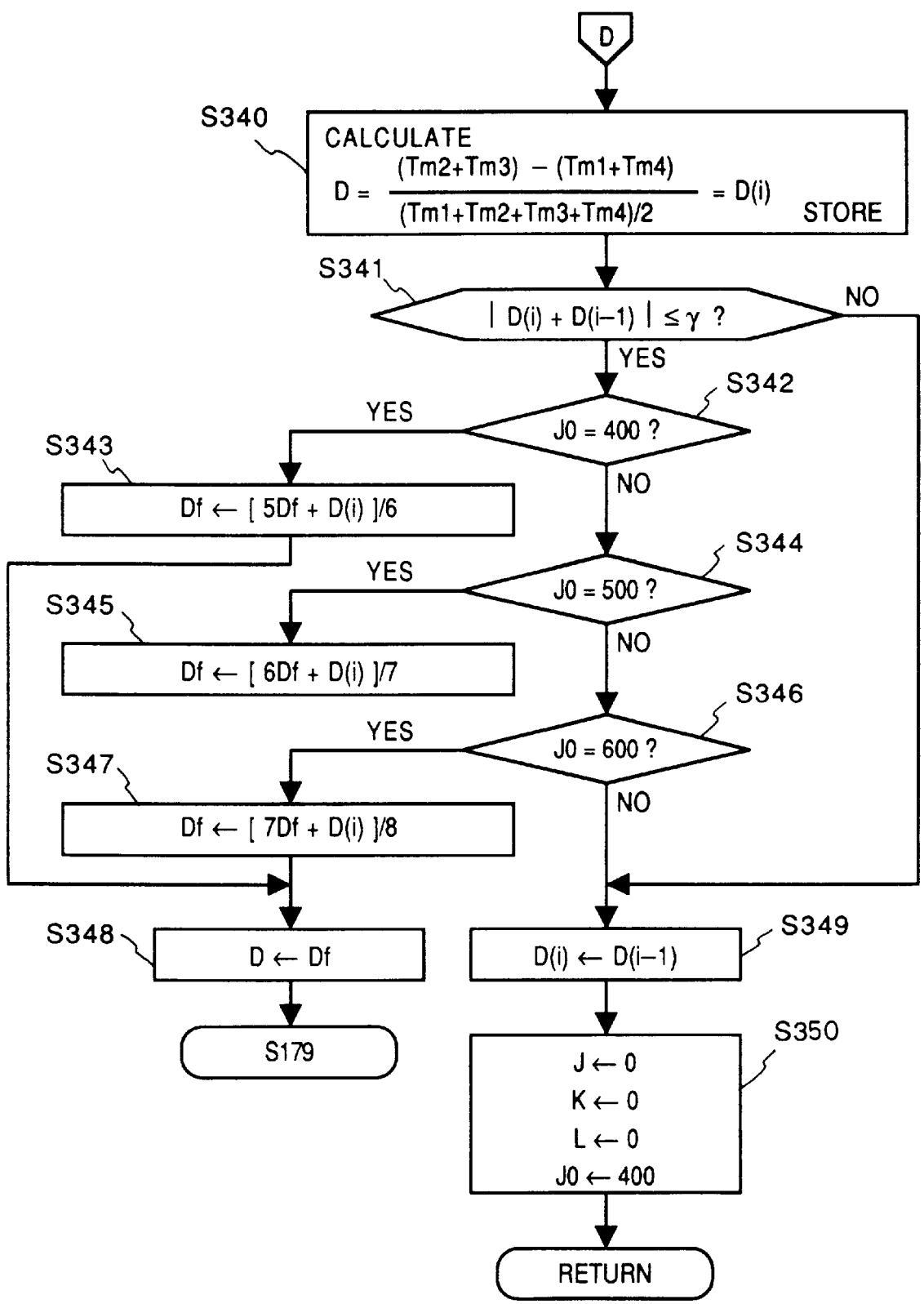
FIG. 36 is the flowchart for the judgment variable setting routine for the eighth variation example.

(8) Eighth Variation Example (FIG. 36)

This is an explanation of a judgment variable setting routine instead of the steps S169–S178 in the previous FIG. 16. As shown in FIG. 36, the steps S340, S341, S342, S344, S346, and S350 are the same as the steps S169, S170, S173, S175, S177, and S172, and thus the explanation of these steps will be omitted. In step S349, in the case that the current judgment variable D(i) is unsuitable, the current value D(i) is given the value of the previous value D(i−1), and the process moves to step S350. In the case that the set value Jo is 400, the process moves from step S342 to step S343, and the value Df from the judgment variable D, is calculated as shown in the figure with 5 times the Df value, or, when the set value for J0 is 500, the process moves from step S344 to step S345, and the value Df of the judgment variable D0 is calculated as shown in the figure with 6 times the Df value, or, when the set value J0 is 600, the process moves to step S346 to step S347, and the Df value is calculated from the D value and a value 7 times the Df value as shown in the figure. From either steps S343, S345, or S347, the process moves to step S348, and in step S348, the judgment variable D is set to the Df value calculated in one of the preceding steps, and then moves to step S179. In this manner, because, as the set value J0 grows larger, the moderation of the Df term grows larger, the reliability of the judgment term D can be improved.

Further, in the aforementioned preferred embodiment, as a timer, a counter that counts the clock signal from the CPU, or, a counter that counts at a fixed time period of the control cycle of the ABS control system (for example 8 ms), can be applied.

Also, in each cycle that the pulse signal P1–P4 is detected from the wheel velocity sensors 51–54, whether or not the input state of the pulse signal has become unstable is constantly monitored, and when the input state has become unstable, the process should be made to return to step S101 of FIG. 13, and begin the count over again.

Further, in the aforementioned preferred embodiment, the wheel velocity data (T1–T4), in other words, the time for one wheel revolution (T1–T4) is equal to the "relative wheel velocity value," but it is possible to construct the air pressure judgment control by applying the wheel velocity (Vw1–Vw4) instead of the time for one tire revolution (T1–T4).

Next, based upon the FIGS. 63 and 37–48, the first separate preferred embodiment will be explained. Where, in the flowcharts in the figures the indices Si (i=310, 311, 312, . . . ) show each step of the flowchart. First, to explain the outline of the tire air pressure judgment control, because fundamentally, the tire air pressure judgment is carried out based upon the wheel velocities Vw1–Vw4 for the four wheels detected from the wheel velocity sensors 51–54, but during the vehicle running time of or else when one or more of the tires has been changed, the initial setting process for the compensation coefficient Cx is carried out, to initially set the compensation coefficient Cx in order to compensate for the tire manufacturing error or the tire characteristics.

After that, the tire air pressure judgment is carried out regularly (for each of set running distance or each set period of time), and if any one of the tire air pressures is determined to be abnormal, in the case that the tire air pressure has decreased, a warning is output through a warning lamp 56.

The aforementioned initial settings process, are carried out at a set vehicle velocity range, that is set by applying the road conditions, also, the tire air pressure process is carried out when at a velocity range that is set separately by applying the road conditions. Further, this tire air pressure control, including an initial settings process, a tire air pressure judgment process, a bad road index calculating process, and a road surface friction coefficient calculating process (this flowchart is omitted).

Figure 37:
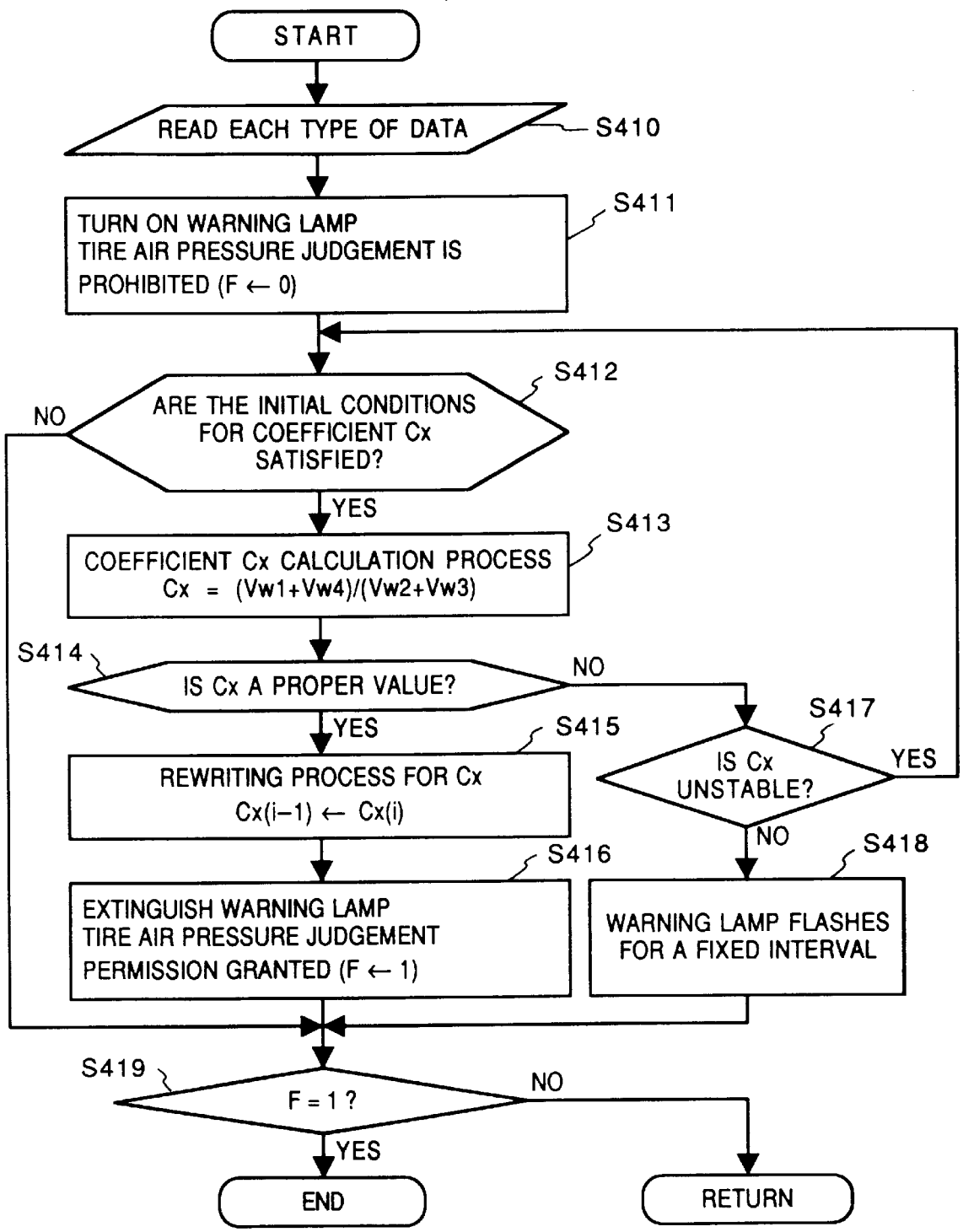
FIG. 37 is a flowchart showing the initial settings process for the tire air pressure control variable Cx, for the first preferred embodiment.

Next, the initial settings process for the aforementioned compensation coefficient will be explained referring to the flowchart in FIG. 37.

This process is started when the initial settings switch 55 is switched "ON," next, the signals from the aforementioned wheel velocity sensors 51–54, the switch 55, the inclination detector, not shown in the figure (a sensor that detects the vehicle inclination in the front to rear direction), are digitized, and each data is read, and based upon the signals from the wheel velocity sensors 51–54, the wheel velocity data Vw1–Vw4 is calculated for the wheels 1–4 in step S410. Then, in order to display that it is in the middle of the initial settings process, the warning lamp 56 is turned on, and in order to prohibit the tire air pressure judgment, the flag F is set to "0."

Figure 41:
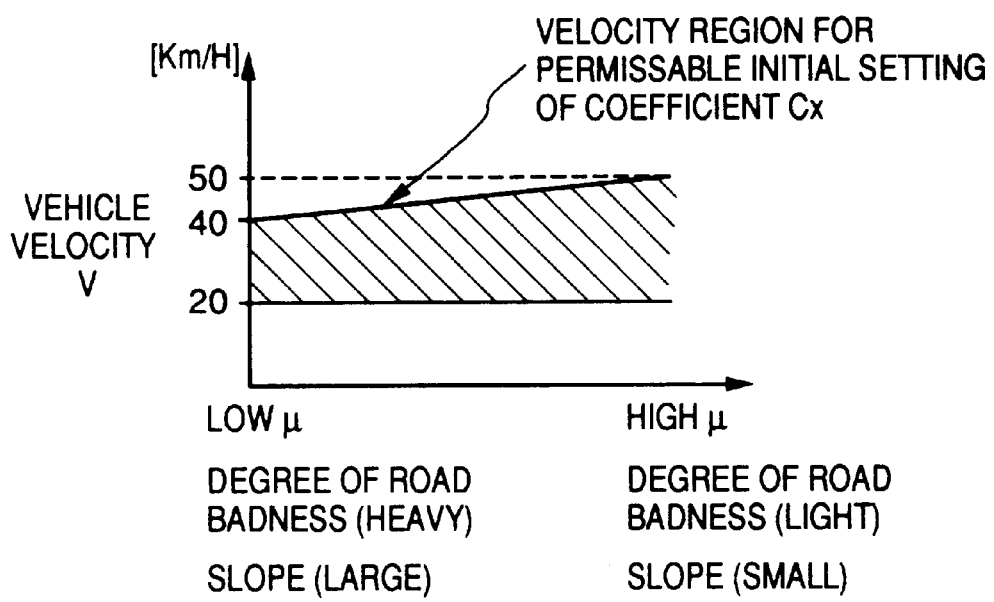
FIG. 41 illustrates a map of the initially established permissible vehicle velocities for coefficient Cx.

Next, the check to see of the initial settings conditions are satisfied is carried out in step S412, but, with the vehicle not accelerating or decelerating, running at a normal straight path, when the vehicle has satisfied that it is within the permissible coefficient Cx initial settings velocity region, that is set utilizing the road conditions shown on the map of FIG. 41, is determined that the conditions is satisfied, and the process moves to step S413, or when the conditions are not satisfied, the process returns as is. Furthermore, the vehicle velocity V will be discussed later, and the acceleration is found from the change in the vehicle velocity V.

Here, the lower limit of the permissible velocity region for the initial setting of the coefficient Cx is shown in FIG. 41, is set at a prescribed value that is not excessively low velocity (for example 20 Km/H), and the upper limit for the permissible velocity region for the initial setting of the coefficient Cx is set utilizing the road conditions (road surface friction state, degree of badness, road surface slope), at a value ranging from 40–50 Km/H.

Regarding the aforementioned lower limit, at an excessively low value, because due to the fact that the number of pulse signals from the wheel velocity sensors is small, the detection accuracy of the wheel velocities Vw1–Vw4 decreases, it is preferable to set the lower velocity limit at a prescribed value around 20 Km/H.

Regarding the aforementioned upper limit, the setting increases linearly from 40–50 Km/H when the road μ increases from low to high, also, the setting increases linearly from 40–50 Km/H as the degree of road badness increases from heavy to light (a good road), and, the upper limit setting increases from 40–50 Km/H when the road incline changes from climbing a hill, to a low incline (flat or downhill). Furthermore, μ is the road surface friction coefficient.

At high speeds over 50 Km/H, because the drive wheel slip amount grows larger, the loading changes from the front wheels 1 and 2 to the rear wheels 3 and 4, the accuracy of the detected wheel velocity decreases, it is preferable to carry out the initial settings process when at vehicle velocities below 50 Km/H, and because the amount of rear wheel slip increases for low μ roads, it is preferable to carry out the initial settings process at vehicle velocities below 40 Km/H, also because when the bad road degree is heavy (bad road), the instabilities of the 4 wheel velocities Vw1–Vw4 grow large, and it is also preferable to carry out the initial settings process at vehicle velocities below 40 Km/H.

Furthermore, the slope the vehicle is running on is calculated from a signal detected by the previously mentioned inclination detection sensor, and the calculation method for the low road μ and the degree of road badness index (flag Fak) will be discussed herein below.

Next, in step S412, whether or not the conditions are satisfied is judged, and in step S413, the coefficient Cx, in order to compensate for the states of the 4 tires, adding the tire manufacturing defect, and when just after a tire change, utilizing the four wheel velocities, is calculated from the ratio of, the sum of the wheel velocities of the tires on a diagonal left front wheel 1 and right rear wheel 4, (Vw1+Vw4), and the sum of the wheel velocities of the wheels on the other diagonal, right front wheel 2 and left rear wheel 3, (Vw2+Vw3), in the following equation.

$$\text{Compensation Coefficient } Cx=(Vw1+Vw4)/(Vw2+Vw3)$$

Then, whether or not the compensation coefficient is a proper value or not is checked in step S414, because the tire manufacturing error, the error in the tire outer radius is at most 0.3%, and in the case that the tire compensation coefficient is within range to be rounded to 1 (for example, 0.95–1.05), the compensation coefficient is determined to be a proper value.

When the compensation coefficient is a proper value, in step S415, the process for rewriting the coefficient Cx is carried out, the previous coefficient Cx(i−1) is assigned the value for the current coefficient Cx(i), then, the warning light 56 is turned off, and the flag F is set to "1," so that the tire air pressure judgment is now permissible, and after that, the process moves to step S419.

On the other hand, when the result of step S414 is "no," in step S417, whether or not the coefficient Cx is stable or not is judged, and when it is unstable, the process moves to step S412, and when the coefficient Cx is not unstable, in step S418, the warning lamp is flashed for a specified period of time (for example 2 seconds), then the process moves to step S419. At step S419, whether or not flag F is "1" is checked, and when the answer is "no," the process returns, and when the answer is "yes," the process is completed. However, based on the switch 55 being turned on once, multiple coefficients Cx from multiple repetitions of the initial settings processes are carried out, and the final Cx should be decided as the average of the multiple Cx's. In this manner, the coefficient Cx is decided such that it preserves the initial state of the four tires after tire changes, and then it is stored in RAM memory.

Here, the calculation process that determines the road surface m will be explained.

First, the vehicle velocity V is taken as the actual vehicle body velocity, and fundamentally, this vehicle velocity is set as the average of the front wheel velocities Vw1 and Vw2, and this vehicle velocity V is applied in the initial settings processing and the tire air pressure judgment process.

The road surface μ is calculated based upon the vehicle velocity V and the vehicle acceleration Vg, but this calculation uses a 500 ms timer and a 100 ms timer, and if the vehicle acceleration Vg is not large enough to be measured within the 500 ms time interval after the vehicle has commenced acceleration, the vehicle acceleration is measured from the change in vehicle velocity every 100 ms from the following equation.

$$Vg=K1\times[V(i)-V(i-100)]$$

After the 500 ms has passed, when the vehicle acceleration has become large enough, every 100 ms the vehicle acceleration Vg is calculated from the change in the vehicle velocity over a 500 ms interval by the following equation.

$$Vg=K2\times[V(i)-V(i-500)]$$

Furthermore, in the following equation, V(i) is the present vehicle velocity, V(i−100) is the vehicle velocity at 100 ms before the present vehicle velocity, V(i−500) is the vehicle velocity at 500 ms before the present vehicle velocity, K1 and K2 are prescribed constants respectively. The road surface μ is calculated by means of the three dimensional complement from the μ table shown in FIG. 63, where the vehicle velocity V and the vehicle acceleration Vg are determined in the aforementioned processes. This road surface μ is applied in the initial settings processing and the tire air pressure judgment process.

Figure 40:
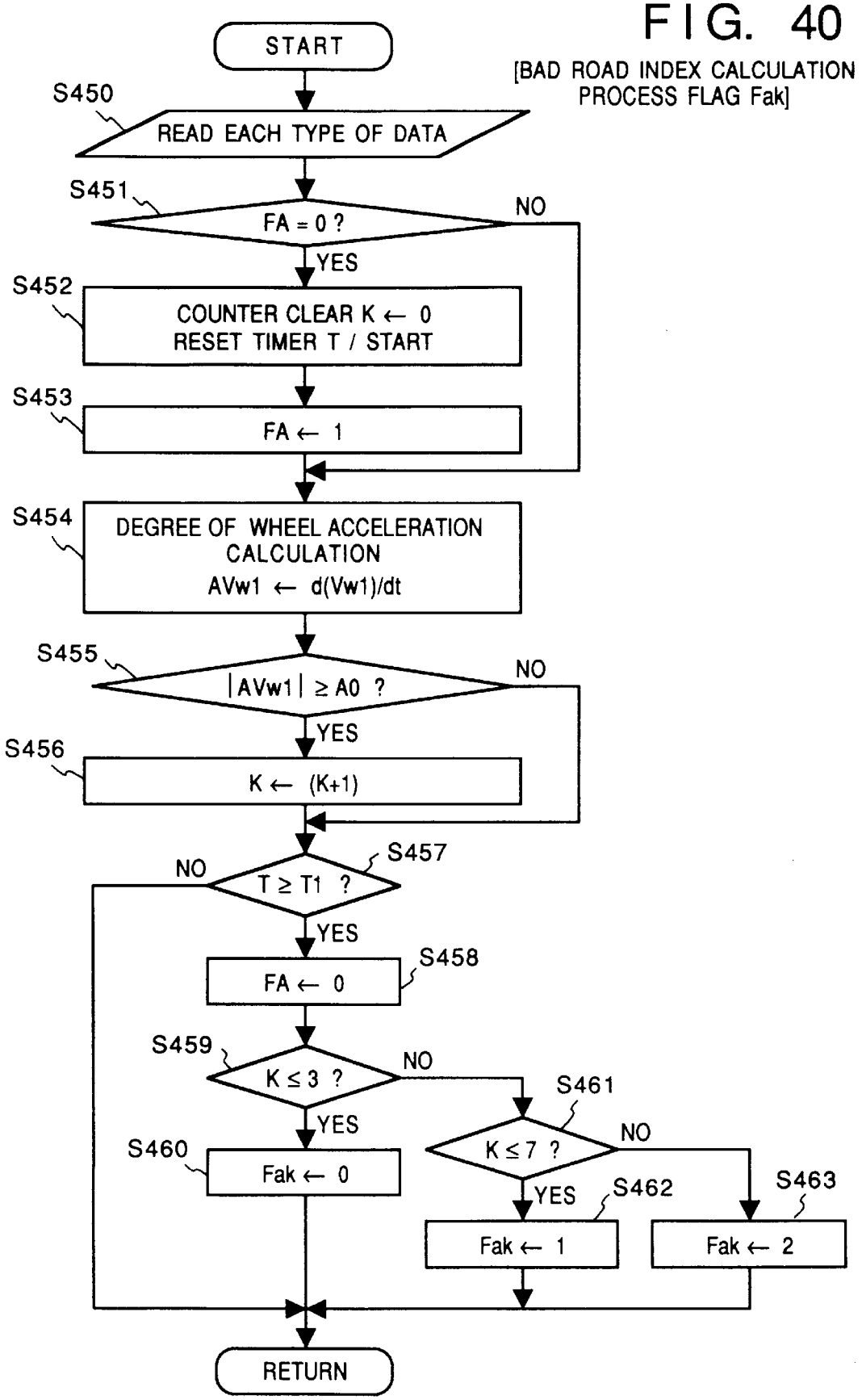
FIG. 40 is a flowchart showing the calculation process of the bad road index.

Here, the bad road index, which shows the condition of the aforementioned road surface, will be explained while referring to the flowchart shown on FIG. 40.

This calculation process, for example, is a process that judges using the wheel velocity Vw1, and after the bad road index calculation is started, each type of data is read in step S450, then in step S451, whether or not flag FA is "0" is checked, and, as the flag is initially set to "0," when the answer is "0" for the initial check, or if the flag is "0" for any other instance, then the answer is "yes," and the process moves to step S452. In step S452, the counter K is cleared, and the timer T is started, after being reset, then in step S453, flag FA is set to "1," and the process moves to step S454.

If the result of the step S451 is "no," the steps S452 and S453 are skipped, and the process moves to step S454. In step S454, the wheel acceleration AVw1 for the left front wheel 1 (where, the wheel acceleration also includes for the wheel deceleration), is calculated by differentiating the wheel velocity Vw1 with respect to time.

Then in step S455, the absolute value of the wheel acceleration is checked to see if it is less than the specified bad road threshold value Ao, and when the answer to this is "yes," the counter K is reset in step S456, and then the process moves to step S457. When the result of step S455 is "no," the process skips step S456 and moves to step S457.

In step S457, whether or not the time count of the timer T is greater than the specified time interval T1 (for example, 1000 ms), is checked, and until the time interval T1 has elapsed, the process repeatedly returns from step S457, within the T1 time interval, the counter K is counted when the absolute value of the wheel acceleration AVw1 is greater than the threshold value Ao.

When the aforementioned specified time interval T1 has elapsed, the process moves from step S457 to step S458, and, in order to count the number of times that the absolute value of the wheel acceleration AVw1 is greater than the threshold value Ao in the next specified period of time T1 the flag FA is set to "0," then in steps S459–S463, based upon the count value of the counter K, when the counter K is $\leq 3$, the bad road flag Fak is set to "1," when the counter K is $3 < K \leq 7$, the bad road flag is set to "1," and when the counter K is greater than 7, the bad road flag Fak is set to "2." Where, the aforementioned count values 3 and 7 are related to the specified period of time T1.

In this manner, during each of the specified time period T1 during the initial settings process, based on the left wheel 1 wheel velocity Vw1, the bad road flag Fak is set to one of the values "1," "2," or "3."

Similarly as above, based upon each of the wheel velocities Vw2–Vw4, a bad road flag is assigned a value of "0," "1," or "2," and the bad road index is calculated as the average or the four bad road flags Fak, rounded off, and the result is used for the initial settings process and the tire air pressure judgment process.

Figure 38:
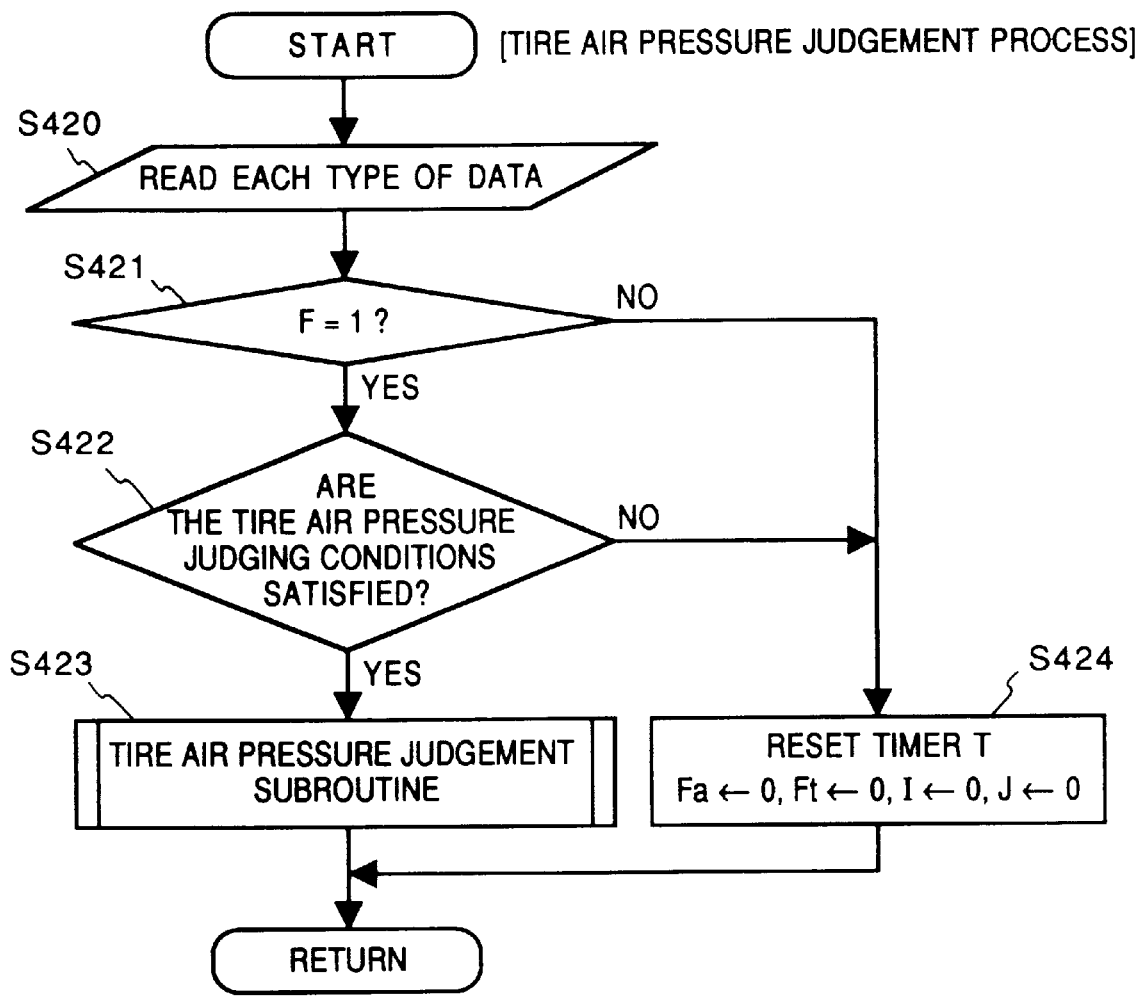
FIG. 38 is a flowchart showing the tire air pressure judgment control for the tire air pressure judgment process for the first preferred embodiment.

Next, the tire air pressure judgment process will be explained while referring to the flowcharts in FIGS. 38 and 39.

The tire air pressure judgment, for example, a process carried out for each 500 Km that the vehicle has traveled, after the process is started, each signal, from the aforementioned sensors 51–54 and the switch 55 are converted to digital signals, is read in step S420, and then, whether or not flag F is "1," or not is checked in step S421, when the answer is "yes," whether or not the judgment conditions for the tire air pressure judgment are satisfied is judged.

Figure 42:
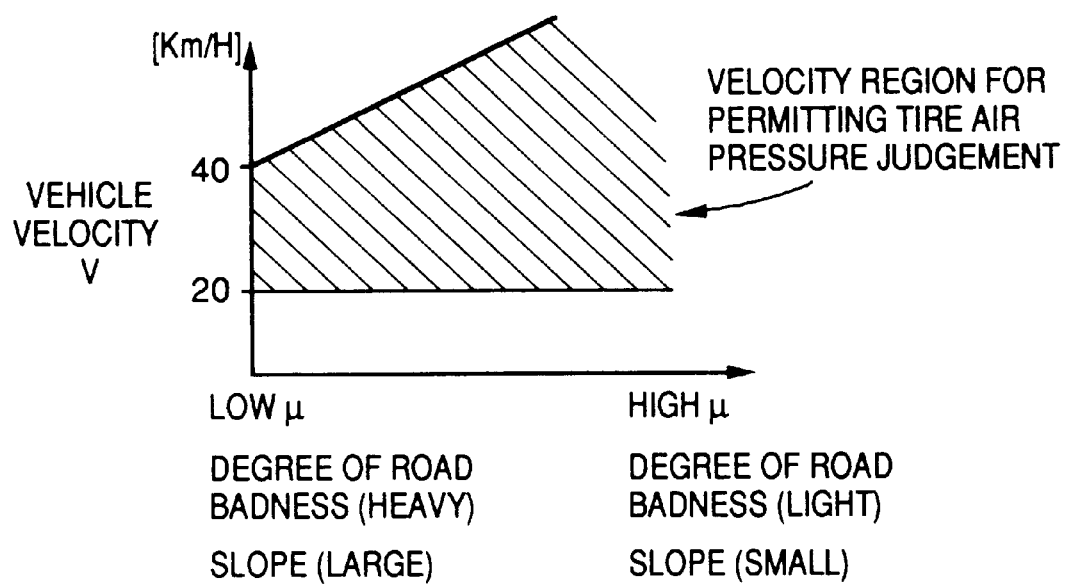
FIG. 42 illustrates the permissible vehicle velocity regions for the tire air pressure judgment.
Figure 43:
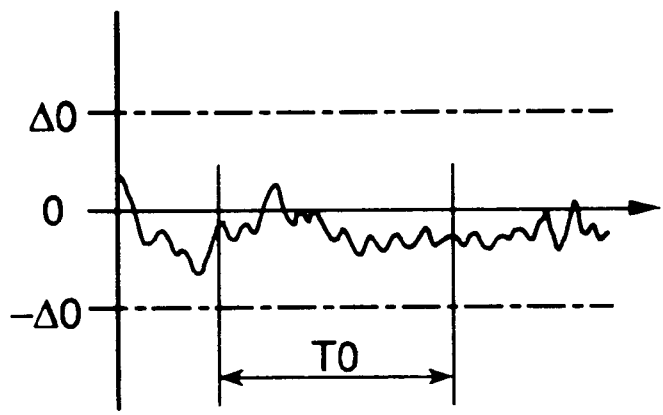
FIG. 43 is a graph showing the conduct of air pressure judgment variable E when the tire air pressure is normal.
Figure 44:
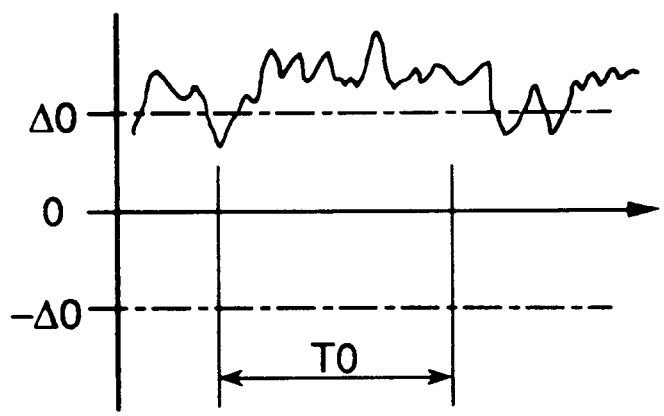
FIG. 44 is a graph showing the conduct of air pressure judgment variable E when the tire air pressure is abnormal.

Regarding the tire air pressure judgment conditions, the vehicle is not accelerating or decelerating, and traveling on a normal straight course, and when the vehicle velocity, applied to the road surface conditions as shown in FIG. 42, satisfies that it is within the tire air pressure permissible vehicle velocity region, it is set that the conditions are satisfied, and the process moves to step S423, while when the conditions are not satisfied, the process moves to step S424.

Here, the lower limit of the permissible velocity region for the tire air pressure judgment is shown in FIG. 42, is set at a prescribed value that is not excessively low velocity (for example 20 Km/H), and the upper limit for the permissible velocity region for the tire air pressure judgment is set utilizing the road conditions (road surface friction state, degree of badness, road surface slope), at a value ranging from 40–50 Km/H.

Regarding the aforementioned lower limit, at an excessively low value, because due to the fact that the number of pulse signals from the wheel velocity sensors is small, the detection accuracy of the wheel velocities Vw1–Vw4 decreases, it is preferable to set the lower velocity limit at a prescribed value around 20 Km/H.

Regarding the aforementioned upper limit, the setting increases linearly from 40–50 Km/H when the road increases from low to high, also, the setting increases linearly from 40–50 Km/H as the degree of road badness increases from heavy to light (a good road), and, the upper limit setting increases from 40–50 Km/H when the road incline changes from climbing a hill, to a low incline (flat or downhill).

Thus, at high speed states above 50 Km/H, the rear drive wheel slip amount increases, and the accuracy of the detected wheel velocity Vw1–Vw4 decreases, but even if small decreases in accuracy do appear, because the at vehicle velocities over 50 Km/H, it is preferable to detect the tire air pressure decreases, the limit is set as previously discussed.

Because the amount of rear wheel slip increases at low road $\mu$, it is preferable to carry out the tire air pressure judgment process when the vehicle velocity is below 40 Km/H, also, because as the road gets worse, the instabilities of the wheel velocities Vw1–Vw4 get large, it is preferable to carry out the tire air pressure judgment process when the vehicle velocity is below 40 Km/H.

Figure 39:
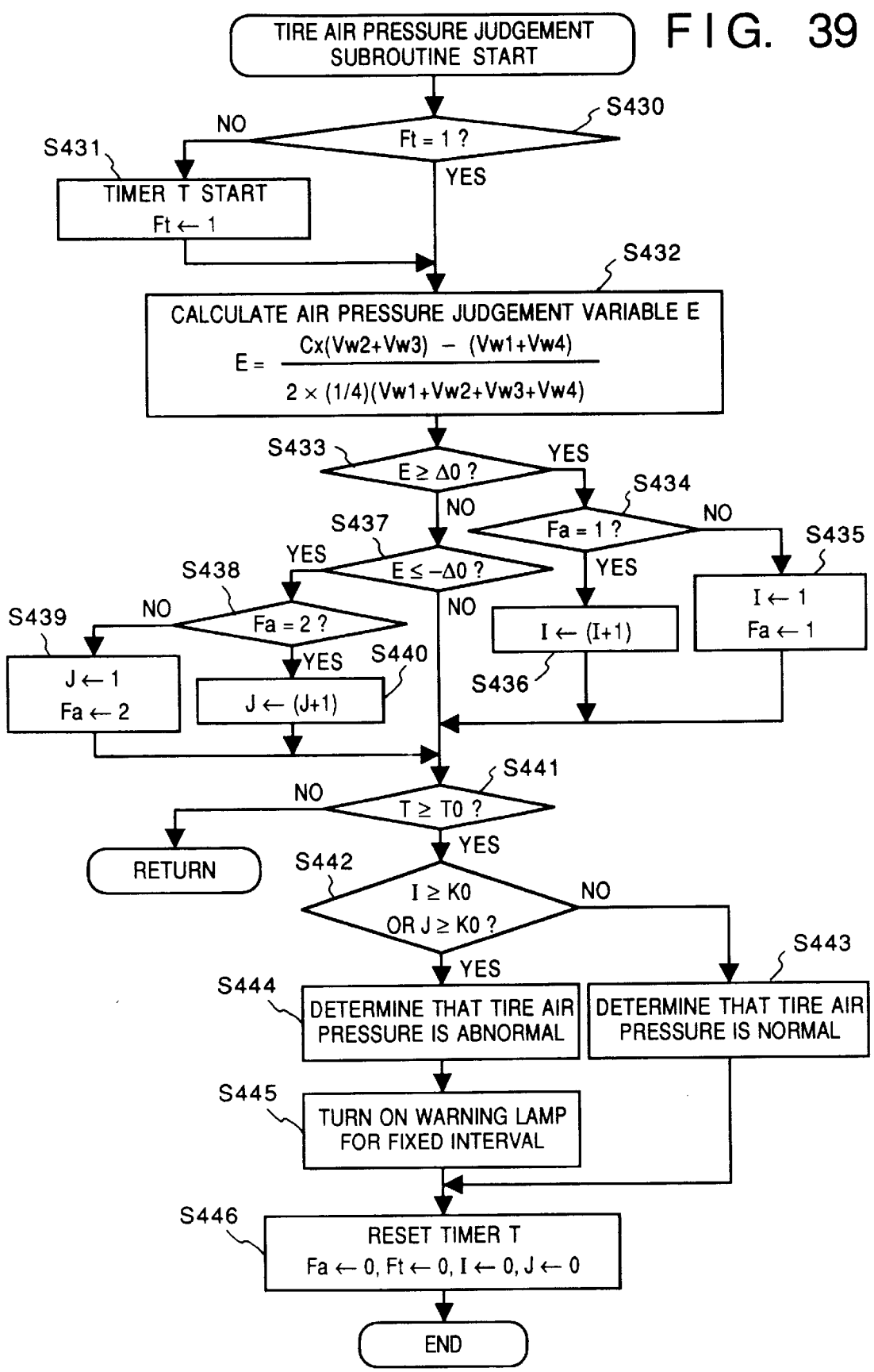
FIG. 39 is the flowchart for the tire air pressure judgment subroutine of FIG. 37.

In step S423, the tire air pressure judgment subroutine shown in FIG. 39 is carried out, and then the process return. When the answer to steps S421 or S422 are "no," in step S424, the timer T for the tire air pressure judgment subroutine is reset, and the flags Fa and Ft are reset to "0," as well as the counters I and J being reset to 0, then the process returns.

Next, The tire air pressure judgment subroutine from step S423 will be explained while referring to the FIG. 39.

First, whether or not the flag Ft is "1" is checked in step S430, and because the answer is "no" for the first time through, in step S431, the timer T is started, and the flag Ft is set to "1," then the process moves to step S432. Or, in the state when flag Ft is set to "1," the process moves form step S430 to step S432. Then, in step S432, the tire air pressure variable E is calculated according to the equation shown.

Figure 45:
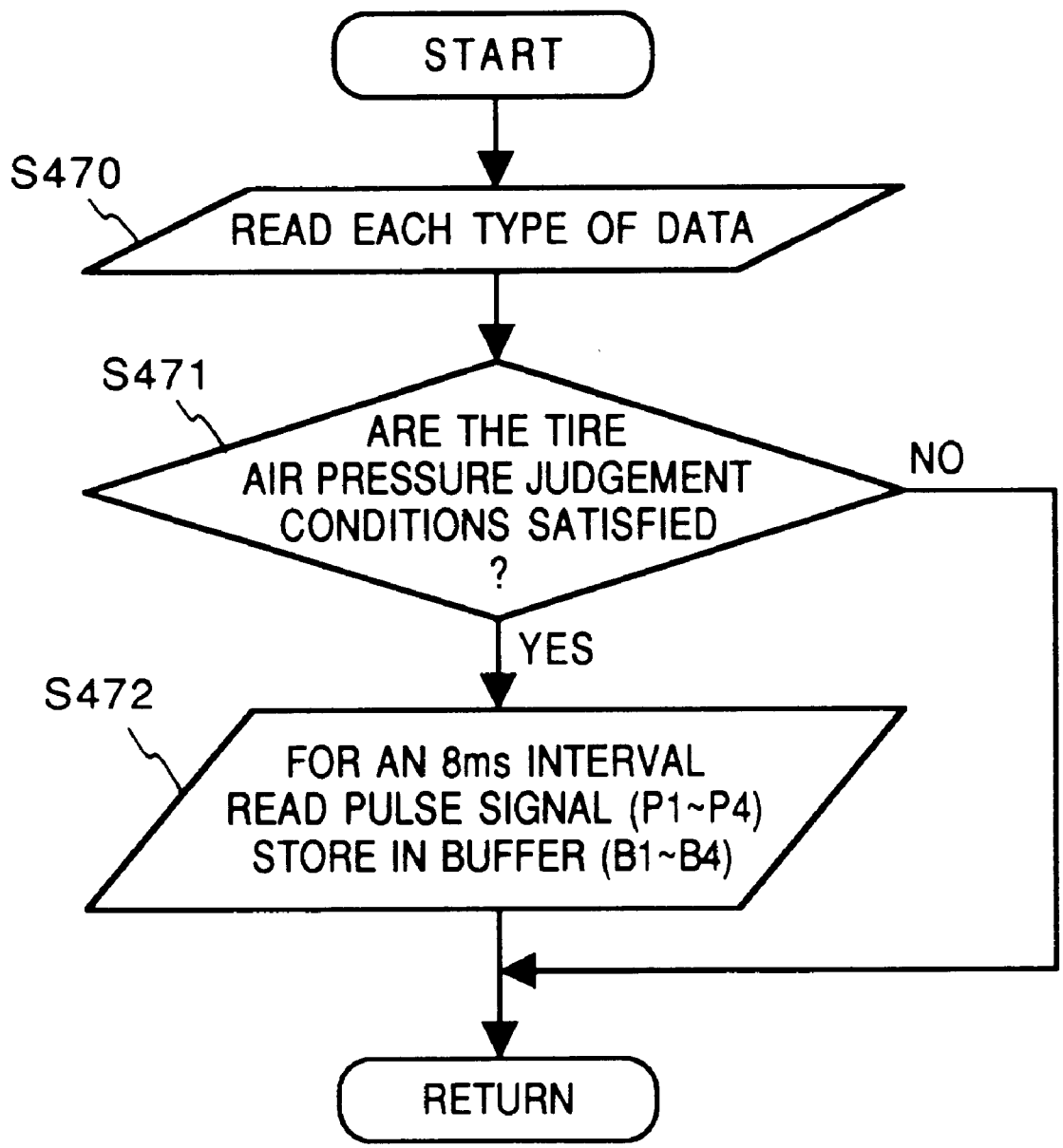
FIG. 45 is a flowchart showing the pulse signal reading process for the tire air pressure judgment control of the second transformation example.

Next, as shown in the flowchart of FIG. 45, for each predetermined vehicle running distance, the subroutine starts, and similarly to before, each type of data is read in step S470, then, similarly to step S422, the determination of whether or not the tire air pressure judgment conditions are satisfied is carried out in step S471, and when that result is "yes," in step S472, for an interval of for example of 8 ms, the pulse signals P1–P4 are read, and the data is temporarily stored in the buffer (B1–B4). After that, the process returns and repeats itself. Or, when in the case that 1the answer of step S471 is "no," the process returns immediately, and repeats.

In this manner, when the tire air pressure judgment conditions are satisfied, the 8 ms of the pulse signals P1–P4 are renewed and stored in the buffer B1–B4.

Figure 46:
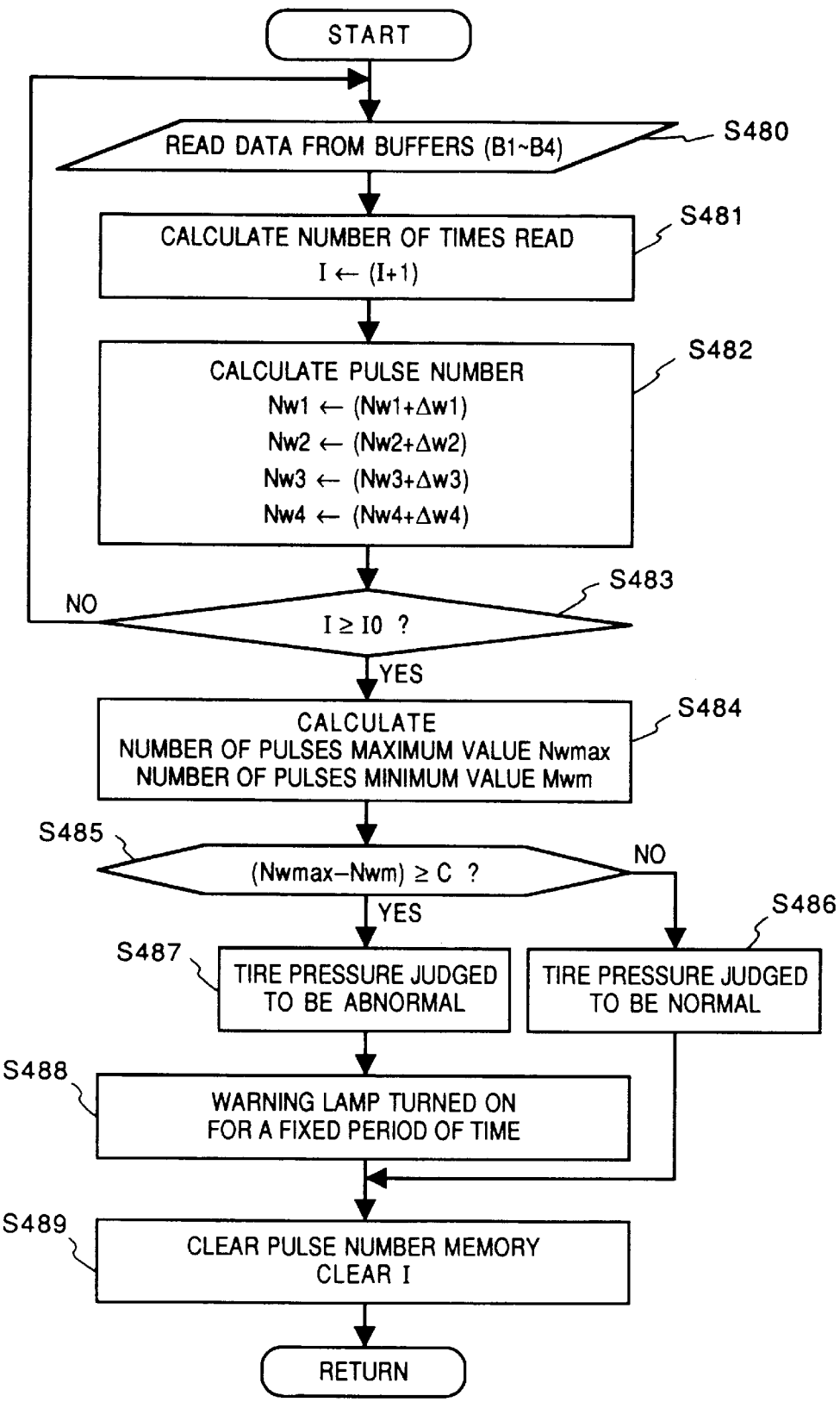
FIG. 46 is a flowchart of the tire air pressure judgment process for the second variation example.

Next, in parallel to the said pulse reading process, the tire air pressure judgment of FIG. 46 is carried out.

When the routine of FIG. 46 is started, the data in buffers B1–B4 is read in step S480, then the counter I, that counts the number of times the reading process has been performed, is incremented, and the number of times that the data reading has been performed is counted in step S481. Then, in step S482, the number of pulses, Nw1–Nw4, of the pulse signals P1–P4 are calculated. For this calculation of the number of pulses, Nw1–Nw4, the number of pulses for this iteration, $\Delta$w1–$\Delta$w4, are each respectively added to the sum of the number of pulses up to and including the previous iteration.

Next, in step S483, whether or not the counter I is greater than a prescribed value (for example, 100) is determined, and when the result of this is "no," the process returns to step S480, and the steps from step S480 are carried out. When the result of step S483 becomes "yes," in step S484, the maximum number of pulses Nwmax for the number of pulses Nw1–Nw4, and the average number of pulses Nwm of the number of pulses Nw1–Nw4 are calculated.

Then, whether or not the value of (Nwmax–Nwm) is greater than a prescribed value C is determined, when the result is "no," the process moves to step S486, and when the answer is "yes," in step S487, a tire air pressure abnormality (decrease) is determined, then the warning lamp is flashed for a prescribed period of time in step S488, then, the memory that stored the number of pulses Nw1–Nw4 and the counter I are respectively cleared in step S489.

Because the number of revolutions increases for the tire that has suffered a decrease in the air pressure, and because the number of pulses of from the wheel velocity sensor of the tire that has suffered a decrease in tire air pressure becomes the maximum, as shown previously, by judging whether or not the (Nwmax–Nwm) value has become greater than a prescribed value, a tire air pressure abnormality can be detected.

In this example variation, the initial settings process for after a tire change are not undertaken, however, carrying out the initial settings process, it can also be designed to detect a tire air pressure abnormality using, as a parameter, the ratios of the determined initial number of pulses INw1–INw4, and the number of pulses Nw1–Nw4 determined during the tire air pressure judgment, Nw1/INw1–Nw4/INw4. In this case, when a ratio Nw1/INw1–Nw4/INw4 become greater than a prescribed value, a tire air pressure abnormality is determined.

In addition, because the vehicle velocity V from the initial settings process and the vehicle velocity at which the tire air pressure judgment is carried out are not limited to being the same, it is necessary to use the previously describes ratio's Nw1/INw1–Nw4/INw4.

Furthermore, in this example variation, the number of pulses Nw1–Nw4 mare determined, but, based on the data for the number of pulses Nw1–Nw4, the 48 pulses for one vehicle revolution, the count value IO, and the time (8 ms) for the reading of the wheel velocity data for one revolution, for each of the wheels 1–4, the time for one wheel revolution can be calculated Tw1–Tw4 as a parameter, which can be used in the determination of a tire air pressure abnormality. In this case, similar to before, the initial settings process is performed, and times for one wheel revolution, ITw1–ITw4, are calculated beforehand in the initial settings process, and the ratio of the time Tw1–Tw4 to the times ITw1–ITw4, which are, Tw1/ITw1–Tw4/ITw4, can also be used as a parameter in the determination of a tire air pressure abnormality.

Figure 47:
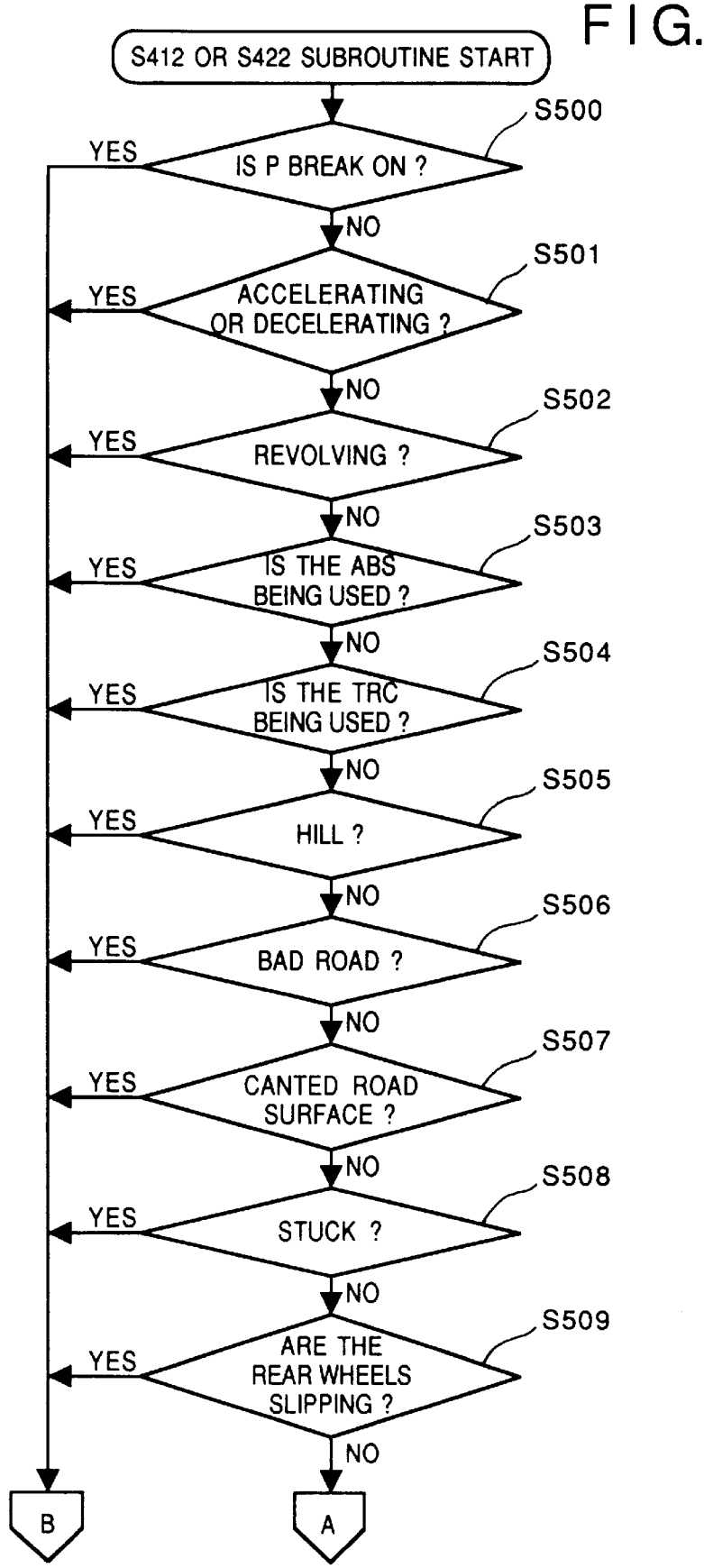
FIG. 47 is a flowchart of a portion of the condition satisfying judgment sub-routine for the third variation example.
Figure 48:
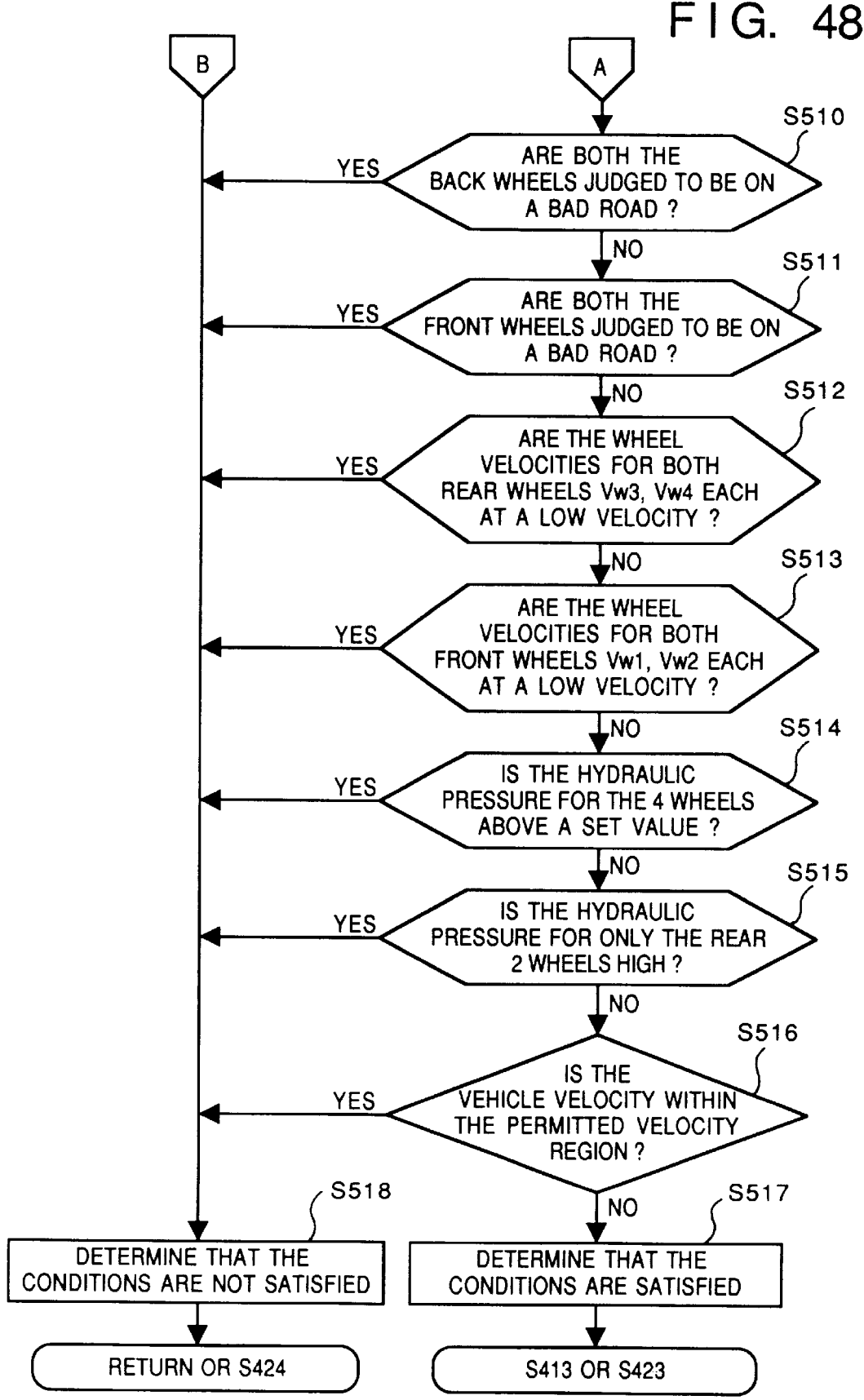
FIG. 48 is the flowchart of the remainder of the condition satisfying judgment sub-routine for the third variation example.

It is preferable to carry out the subroutine shown in FIGS. 47 and 48 in order to determine that either the initial settings conditions in the previous step S412 are satisfied or the tire air pressure judgment conditions in the previous step S422 are satisfied.

However, in order to carry out this process, the brake signal BSs from the brake switch, the steering angle signal θh from the steering angle sensor, the distance traveled signal DD from the traveled distance measurement device, the angle of inclination signal θk from the angle of inclination sensor that detects the vehicle body angle of inclination from front to rear, the degree of acceleration to the side signal Gh measured from the side acceleration sensor that measures the amount of sideways acceleration that the car experiences, the yaw rate signal φv from the yaw rate sensor, hydraulic oil pressure signals Hp1–Hp4 that detect the oil pressure in the four wheel vehicle height adjustment hydraulic chamber for the active suspension equipment, the parking brake signal PBs from the braking brake switch, and the ABS operation signal and the TRC operation signal from the control unit 44, where the anti-skid control and the traction control are carried out, and other various signals are all supplied to the control unit 50.

First, in step S500, whether or not the parking brake is "on" or not is determined, and when the parking brake is "on," (when the car is traveling with the parking brake "on," i.e. incorrectly operating), and because, the same as the braking condition, the load on the front and rear wheels is not uniform, the accuracy of the detected wheel velocity decreases, and in step S518 it is determined that the conditions are not satisfied.

Then, in step S501, the judgment as to whether or not the vehicle is accelerating or decelerating is performed, but, the vehicle velocity V is applied as the vehicle velocity, and the vehicle velocity V established as the average value of the wheel velocity of the left right free wheels (front wheels 1' and 2'), and whether or not the vehicle is accelerating or decelerating is determined from the change in the vehicle velocity V. When the vehicle is accelerating, because the load of the front and rear wheels is not uniform, and the amount of drive wheel slip becomes large, the accuracy of the detected wheel velocity decreases, and in step S518 it is judged that the conditions are not satisfied.

Next, in step S502, based on the steering signal θh, whether or not the vehicle is turning is determined, and when the vehicle is turning, because the difference between the wheel velocities of the inner wheels and the outer wheels becomes large, it is not preferable to perform the tire air pressure judgment, and in step S518, the conditions are determined to be not satisfied.

Next in step S503, based on the ABS operation signal, whether or not the ABS is in operation is determined, and when the ABS is in operation, because the car brakes often, the accuracy of the detected wheel velocity decreases, and in step S518, the conditions are determined to be not satisfied.

Then, in step S504, based on the TRC operation signal, whether or not the TRC is in operation is determined, and when the TRC is in operation, because the car brakes often, the accuracy of the detected wheel velocity decreases, and in step S518, the conditions are determined to be not satisfied.

Next, in step S505, based on the road surface slope signal θk, from the slope detecting sensor, whether or not the road that the vehicle is traveling on is hill or not is determined, when it is a hill, because the accuracy of the detected wheel velocity decreases similarly to the accelerating or decelerating condition, in step S518, the conditions are determined to be not satisfied.

Next, in step S506, based on the average value for the bad road flag Fak, calculated respectively for each of the four wheels similarly to the aforementioned bad road flag Fak, whether or not the vehicle is traveling on a bad road is determined, and when the vehicle is traveling on a bad road, because the four wheel wheel velocities become unstable, in step S518, the conditions are determined to be not satisfied.

Next, in step S507, whether or not the vehicle is traveling on a canted road surface is determined, and when the vehicle is traveling on a canted road surface, because even though the yaw rate does not occur, differences between the wheel velocity of the left side front and rear wheels 1' and 3' and the right side front and rear wheels 2' and 4' occur, and sideways acceleration occurs, whether or not it is a canted road surface is determined based on the yaw rate signal φv, the four wheel velocities Vw1–Vw4, and the degree of side acceleration signal Gh, and when it is determined that it is a canted road surface, because the wheel loading of the "lower" side of the vehicle increases, the accuracy of the detected wheel velocity decreases, and in step S518, the conditions are determined to be not satisfied.

Next, in step S508, whether or not the vehicle is stuck, as in traveling on a snow covered road, etc. and the both drive wheels 3' and 4' are spinning, is determined, and based it is determined if the vehicle is stuck based upon the wheel velocities Vw1–Vw4. When the vehicle is stuck, because the wheel velocities detected are abnormal, it becomes difficult to judge the tire air pressure, and in step S518, the conditions are determined to be not satisfied.

Next, in step S509, whether or not the rear wheels are slipping is determined, the rear wheels are determined to be slipping based on the rear wheel wheel velocities 3' and 4', and the vehicle velocity V. When the rear wheels are slipping, because the wheel velocities detected are abnormal, it becomes difficult to judge the tire air pressure, and in step S518, the conditions are determined to be not satisfied.

Next, in step S510, whether both rear wheels have determined a bad road is determined, and in the case that both the left side rear wheel 3' bad wheel judgment and the right rear wheel 4' bad wheel judgment have judged a bad road, because the possibility that the rear wheels 3' and 4' have chains attached is high, in this case the accuracy of the detected wheel velocity decreases, and in step S518, the conditions are determined to be not satisfied.

Next, in step S511, whether both front wheels have judged a bad road is determined, and in the case that both the left side front wheel 1' bad wheel judgment and the right front wheel 2' bad wheel judgment have judged a bad road, because the possibility that the front wheels 1' and 2' have chains attached is high, in this case the accuracy of the detected wheel velocity decreases, and in step S518, the conditions are determined to be not satisfied.

Then, in step S512, whether or not the wheel velocity of the both rear wheels is low as compared to both the front wheels is determined, and if so, because the possibility that chains are attached to the rear wheels 3' and 4' is high, the accuracy of the detected wheel velocity decreases, and in step S518, the conditions are determined to be not satisfied.

Next, in step S513, whether or not the wheel velocity of the both front wheels is low as compared to both the rear wheels is determined, and if so, because the possibility that chains are attached to the front wheels 1' and 2' is high, the accuracy of the detected wheel velocity decreases, and in step S518, the conditions are determined to be not satisfied.

Next, in step S514, whether the vehicle height adjustment hydraulic chamber pressure oil pressures Hp1–Hp4 are all greater than a prescribed value, and because when the vehicle and/or trunk is loaded with a heavy load, the wheel loading becomes excessive, and the accuracy of the detected wheel velocity decreases, and in step S518, the conditions are determined to be not satisfied.

Next, in step S515, among the said hydraulic pressures Hp1–Hp4, whether only the hydraulic pressure of both rear wheels Hp3 and Hp4 are large when compared to the hydraulic pressure of the both front wheels Hp1 and Hp2 is determined, because when the hydraulic pressure of only the Hp3 and Hp4 are large, the vehicle is in a state in which the trunk is loaded heavily, and the accuracy of the detected wheel velocity decreases, and in step S518, the conditions are determined to be not satisfied.

Then, in step S516, whether or not the vehicle velocity V is within the permissible velocity region is determined. This vehicle velocity region is either the initial settings permissible velocity region for the coefficient Cx as shown in FIG. 41, or the tire air pressure judgment permissible vehicle velocity region as shown in FIG. 42, and when the result of this is "no," the process moves to step S518, and the conditions are determined to be not satisfied.

Thus, when the results of all the judgments from steps S500 to S515 are "no," and the result of the judgment in step S516 is "yes," because the wheel velocity can be detected with a high degree of accuracy, in step S517, it is determined that the conditions are satisfied.

Hereinbelow, while referring to the FIGS. 49 through 55, the second example variation of the tire air pressure judgment control, that is carried out by the said control unit 50, will be explained. Where, in the flowcharts, Si (where i=601, 602, 603 . . . ), refers to each of the steps shown. However, this preferred embodiment, because it is a changed version of the said first separate embodiment, the portions that were already explained in the previously explained separate embodiment, will be explained simply.

First, to explain the outline of this tire air pressure judgment control, the initial settings process, where the said compensation coefficient Cx is established, is carried out when in the first vehicle velocity region (for example 10–55 Km/H) for the initial settings, and the tire air pressure judgment process is carried out when in the second vehicle velocity region for the tire air pressure judgment (for example 10 Km/H to top vehicle velocity). Where, this tire air pressure judgment control includes both the said initial settings process and the tire air pressure judgment process.

Figure 49:
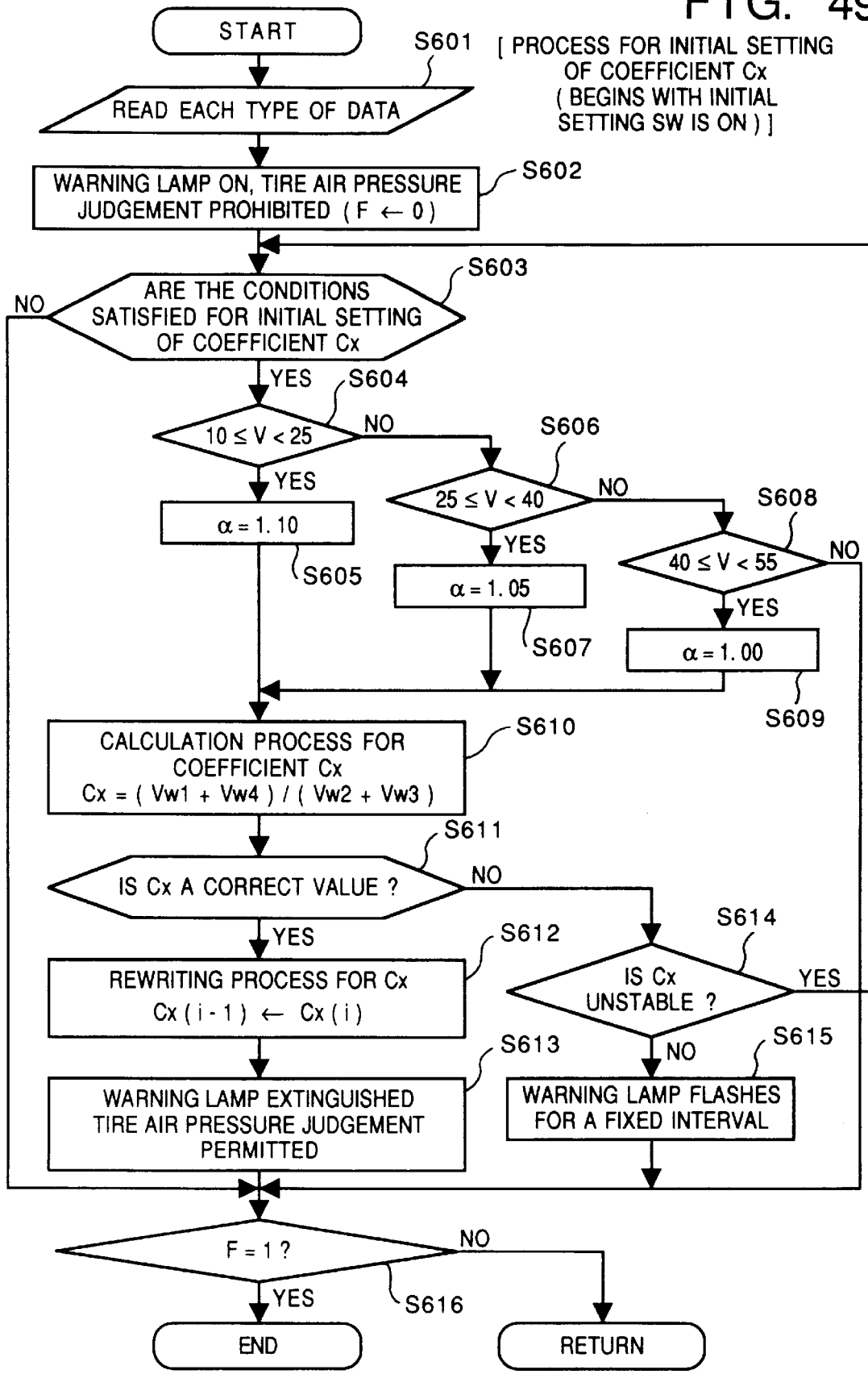
FIG. 49 is the flowchart for the initial setting process for the tire air pressure judgment coefficient Cx for the second preferred embodiment.

Next, the initial settings process for the said coefficient Cx will be explained while referring to the flowchart in FIG. 49.

The initial setting process for the coefficient Cx is commenced by the switching of the switch to the "on" position when in the case when a tire is changed, etc. Then each type of data, the signals from the said wheel velocity sensors and the switch are digitized and read, and based on the detected signal from the wheel velocity sensors, the four wheel 1–4 wheel velocities Vw1–Vw4 are calculated, in step S601, then in order to show that the initial settings process is in the midst of being performed, the warning lamp is turned on, and in order to prohibit the tire air pressure judgment the flag F is set to "0" in step S602.

Next, in step S603, the judgment of whether or not the conditions for the initial setting conditions for the coefficient Cx are satisfied is carried out. When the it is satisfied that the vehicle is not in an accelerating or decelerating condition, the vehicle is traveling in a normal, straight course, and the vehicle velocity is within the vehicle velocity range for the said initial settings, the conditions are judged to be satisfied, and the process moves to step S604, or, when the conditions are judged to be not satisfied, the process returns. Here, the vehicle velocity V is the same as the aforementioned vehicle velocity V.

When the judgment in step S603 is "yes," in steps S604 through steps S609 the correction coefficient α, in order to correct the tire air pressure judgment threshold value, is established as follows.

When the vehicle velocity V is greater than 10 Km/H and less than 25 Km/H, the correction coefficient α is set to 1.10 in steps S604 and S605, or, when the vehicle velocity V is greater than 25 Km/H and less than 40 Km/H the correction coefficient is set to 1.05 according to steps S606 and S607, or when the vehicle velocity V is greater than 40 Km/H and less than 55 Km/H according to steps S608 and S609, the correction coefficient is set to 1.00.

In other words, when the vehicle velocity is greater than 40 Km/H and less than 55 Km/H, the accuracy of the detected wheel velocity V is at the highest, because as the vehicle velocity decreases, the accuracy of the detected wheel velocity Vw1–Vw4 decreases. As the vehicle velocity V decreases the α is increased, and the judgment threshold value for the tire air pressure judgment is corrected to a larger value. Where, because the previously noted values 1.10 and 1.05, are just examples, the values are not limited to these values.

From the said steps S605, step S607, or the step S609, the process moves to step S610, and in step S610, the coefficient Cx, in order to compensate the four tire initial settings for when in the chase a tire is changed, etc., adding the tire manufacturing defects and special characteristics, is calculated from the equation shown in the figure, utilizing the four wheel wheel velocities Vw1–Vw4.

Next, in step S611, whether or not the value for the coefficient Cx is a proper value or not is determined. Because, according to the manufacturing error, the error of the tire radius is at the largest 0.3%, in the case when the coefficient Cx is within rounding distance of 1 (for example 0.95 to 1.05), the coefficient Cx is determined to be proper.

When the coefficient Cx is at a proper value, in step S612, the rewriting process for the coefficient Cx is carried out, and the previous value, Cx(i−1), is rewritten as the current value Cx(i), then, in step S613 the warning lamp is turned off, and in order to give permission for the tire air pressure judgment to be performed, the flag F is set to "1," and the process moves to step S616.

On the other hand, when the result of step S611 is "no," in step S614, whether or not the coefficient Cx is stable or not is determined, when the coefficient Cx is unstable, the process moves to step S603, and the steps from step S603 are carried out again, or, in the case that the coefficient Cx is stable, the warning lamp is flashed for a prescribed period of time (for example 2 seconds) in step S615, and the process moves to step S616. In step S616, whether or not the flag F is "1" is checked, when the answer is "no," the process returns to step S603, and when the result of step S616 is "yes," the process is completed.

However, based on the switch being switched on once, when within the same vehicle velocity region, it is possible to have the process, determine multiple coefficient Cx's from repeated performing of the initial settings process, and deciding on the final Cx as the average value of the multiple Cx's.

In this manner, the coefficient Cx, in order to compensate for the initial conditions of the four tires after a tire change, etc., is decided, and stored in the RAM memory. Where, it is preferable to be constructed such that the initial settings process is prohibited when traveling on a low $\mu$ road, bad road, or a hill.

Next, the tire air pressure judgment will be explained while referring to flowcharts of FIGS. 50 and 51.

This tire air pressure judgment process is continuously carried out when the vehicle is traveling, and after the process is started, each type of data is read, and the based upon the detected signal from the wheel velocity sensors, the wheel velocities Vw1–Vw4 are calculated in step S620, then, whether or not the said flag F is "1" is checked in step S621, and when the result is "yes," in step S622, whether or not the tire air pressure judgment conditions are satisfied is determined.

Regarding the tire air pressure judgment conditions, when it is satisfied that the vehicle is not in an acceleration or deceleration state, traveling in a normal straight path, and the vehicle velocity V is within the vehicle velocity region for the tire air pressure judgment, the conditions are judged to be satisfied, and the process moves to step S623, and when the conditions are not satisfied, the process moves to step S629.

Next, in the case that the conditions are satisfied, in steps S623–S627, utilizing the vehicle velocity V, the correction coefficient $\beta$, in order to correct the judgment threshold value, is established.

When the vehicle velocity V is within 10 Km/H and 50 Km/H, in steps S623 and S624, the correction coefficient $\beta$ is set at 1.00, or when the vehicle velocity is within 50 Km/H and 100 Km/H, in steps S625 and S626, the correction coefficient $\beta$ is set to 1.10, and when the vehicle velocity is greater than 100 Km/H, in step S627, the correction coefficient $\beta$ is set to 1.20.

In other words, when the vehicle velocity V is within 10 m/H and 50 Km/H, because the tire air pressure judgment is carried out at a velocity close to the vehicle velocity V at the initial settings process, because the error of the air pressure judgment variable D becomes small, the correction coefficient $\beta$ is set to 1.00. And, as the vehicle velocity V increases, because the tire air pressure judgment is carried out at a vehicle velocity V that is different from the initial settings vehicle velocity by an increasingly larger amount, considering that the error of the air pressure judgment variable D becomes larger, as the vehicle velocity V increases, the correction coefficient $\beta$ is set larger. Here, the aforementioned values 1.10 and 1.20 are simply examples, and the values are not limited these values.

Next, in step S628, the tire air pressure routine is carried out, and after that, the process returns. When the results of steps S621 or S622 are "no," in step S629, the timer T of the tire air pressure judgment subroutine is reset, and along with the flags Fa and Ft being set to "0," the counters I and J are reset to "0," and the process returns.

Next, the tire air pressure judgment of step S628 will be explained while referring to the flowchart of FIG. 51.

First, in step S630, whether or not the flag Ft is "1" or not is checked. The first time the flag is at "no" so in step S631, the timer T is started and the flag Ft is set to "1," and the process moves to step S632. Or, when flag has been set to "1," the process moves from step S630 to step S632. Then, in step S632, the air pressure judgment variable E is determined from the equation shown.

$$E=2\times[Cx(Vw2+Vw3)-(Vw1+Vw4)]/[Vw1+Vw2+Vw3+Vw4]$$

In the above equation, the coefficient Cx, because it is set in advance to compensate for the tire initial conditions, in the case when the tire air pressure is normal, the tire air pressure variable becomes close to "0," but, in the case that the right front wheel 2' or the left rear wheel 3' suffer from a loss in tire air pressure, because the wheel velocity Vw2 or the wheel velocity Vw3 becomes large, the tire air pressure variable E increases in the positive direction, or, in the case that the left front wheel 1' or the right rear wheel 4' suffer from a loss in tire air pressure, because the wheel velocity Vw1 or the wheel velocity Vw4 becomes large, the tire air pressure variable E increases in the negative direction.

Next, in step S633, whether or not the judgment variable E is greater than the threshold variable $\alpha\beta\Delta0$ where the prescribed fundamental value $\Delta0$ is, for example, a value in the range from 0.020 to 0.050), and if the result is "yes," in step S634, whether or not the flag Fa is "1" or not is checked, and when flag Fa is not "1," the counter I, which counts the number of times that the judgment variable E is greater than the threshold value $\alpha\beta\Delta0$, is set to 1, and the flag Fa is set to "1" in step S635, and the process moves to step S641. Or, when the flag Fa is set at "1," the process moves from step S634 to step S636 and the counter I is incremented by one, and then the process moves to step S641.

In the other hand, when the result of step S633 is "no," the process moves to step S637 and whether or not the judgment variable E is less than the threshold value $-\alpha\beta\Delta0$ is judged. When the answer is "yes," whether or not the flag Fa is "2" or not is checked in step S638, and when the flag Fa is not "2," the counter J, which counts the number of times that the judgment variable E is less than the threshold value $-\alpha\beta\Delta0$ is set to "1," and the flag Fa is set to "2" in step S639, and the process moves to step S641. Or, when the flag Fa is set to "2," the process moves from step S638 to step S640, the counter J is incremented, and the process moves to step S641.

Next, in step S641, whether or not the count value for the timer T has passed a prescribed value TO (for example, 2 seconds), is determined. In the beginning, because the result is "no," the process returns back, and the steps S620 to step S627, and steps S630 to S641 are carried out again in FIG. 50, and the count value T for the counter T and the count value I for the counter I or the count value J for the counter J increase.

Thus, when the prescribed value TO has been passed, because the result in step S641 becomes "yes," the process moves to step S642, and whether or not the count value I for the counter I is greater than the prescribed value KO, or the count value J for the counter J is greater than the prescribed value KO is determined, and when the answer is "no," in step S643 the tire air pressure is judged to be normal, and the process moves to step S646. Or, when the result of step S642 is "yes," in step S644, the tire air pressure is judged to be abnormal (a decrease), and the process moves to step S645, where, in order to inform the driver of the decrease in the tire air pressure, the warning lamp is flashed for a prescribed period of time (for example 2 seconds), and then the process moves to step S646. In step S646, to prepare for the next tire air pressure judgment, the timer T, flag Fa, flag Ft, counter I, counter J, are all respectively set to "0," and the present tire air pressure judgment process is concluded.

Here, the process can be constructed such that the tire air pressure judgment is prohibited when in the case of traveling on a low $\mu$ road, a bad road, or a hill.

Next, the operation of the heretofore explained tire air pressure judgment control will be explained.

In this initial settings process, because the threshold value is corrected by this correction coefficient $\alpha$, the correction coefficient $\alpha$ is set such that it grows larger, as much as the vehicle velocity V is low, when compared to the vehicle velocity V at which the initial settings process is carried out. The percentage of misjudgments for the tire air pressure judgment is decreased, and the accuracy and reliability of the tire air pressure judgment can be improved.

This tire air pressure judgment process is carried out when the vehicle is traveling in a steady, straight manner, and at a velocity within the second velocity region from 10 Km/H to the maximum vehicle velocity, but because this second vehicle velocity region is set such that it include a first vehicle velocity region that is broader than the first vehicle velocity region, because the tire air pressure judgment can be undertaken for almost all vehicle velocities, it is more practical.

Here, when the vehicle velocity becomes greater than 60 Km/H, considering that the drive wheel slip has the effect of lowering the accuracy of the detected wheel velocity signal, because correction coefficient corrects the threshold value, the correction coefficient is established so that it grows larger as the amount that the vehicle velocity, at which the tire air pressure judgment is carried out, is outside the first vehicle velocity region increases.

This tire air pressure judgment process, using the timer T, the counters I and J, the number of times that the value $E \geq \alpha\beta\Delta0$ is counted by the counter I within a prescribed time interval TO, and the number of times that the value of $E \leq -\alpha\beta\Delta0$ is counted by the counter J within a prescribed time interval TO, and when these count values I and J become greater than a prescribed value KO, because the tire air pressure is judged to be abnormal, the tire air pressure judgment can be performed with a high degree of accuracy, as it is based upon a large number of sampling data.

Next, an example variation will be explained.

Figure 50:
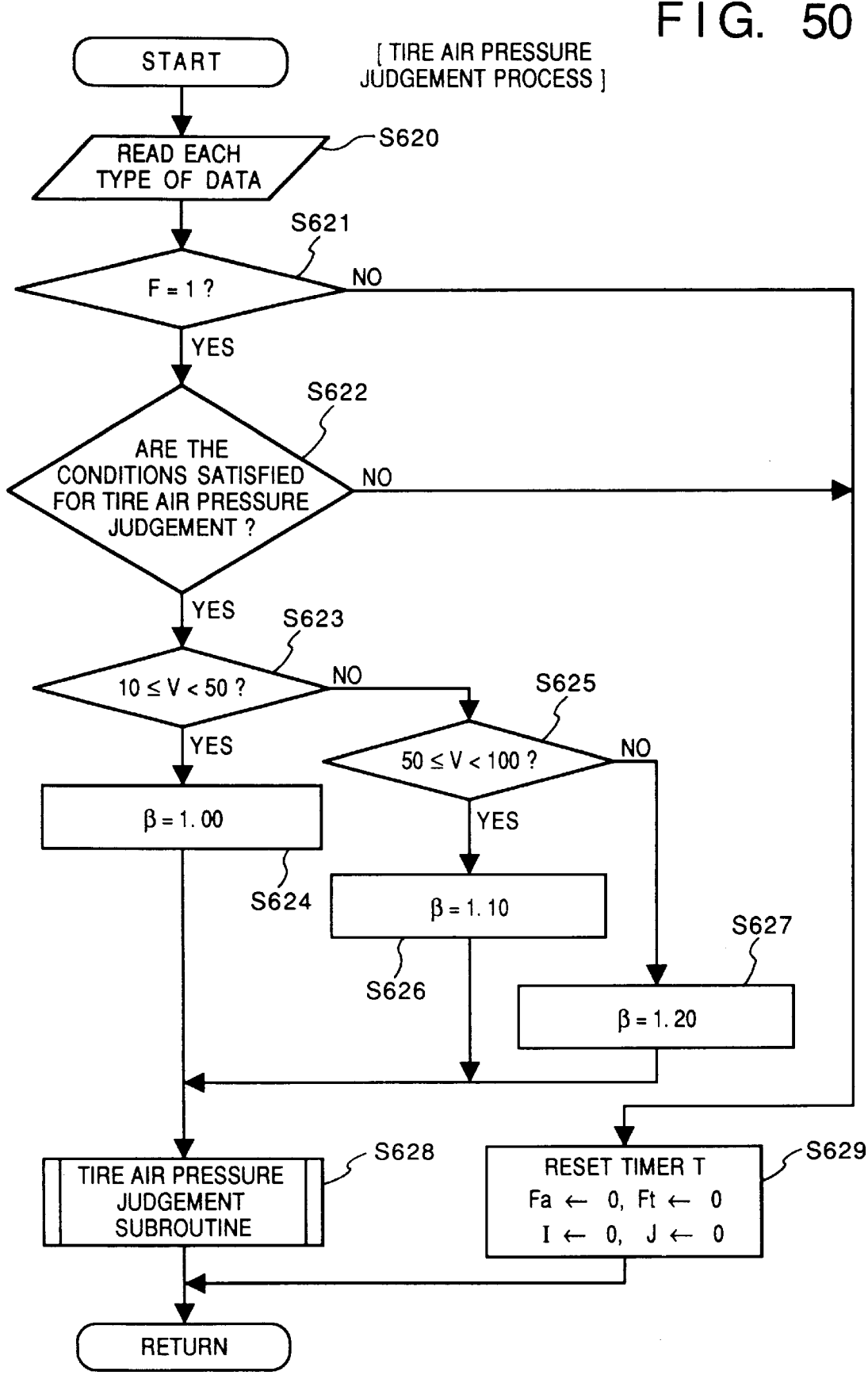
FIG. 50 is the flowchart for the tire air pressure judgment process for the tire air pressure control of the second preferred embodiment.
Figure 51:
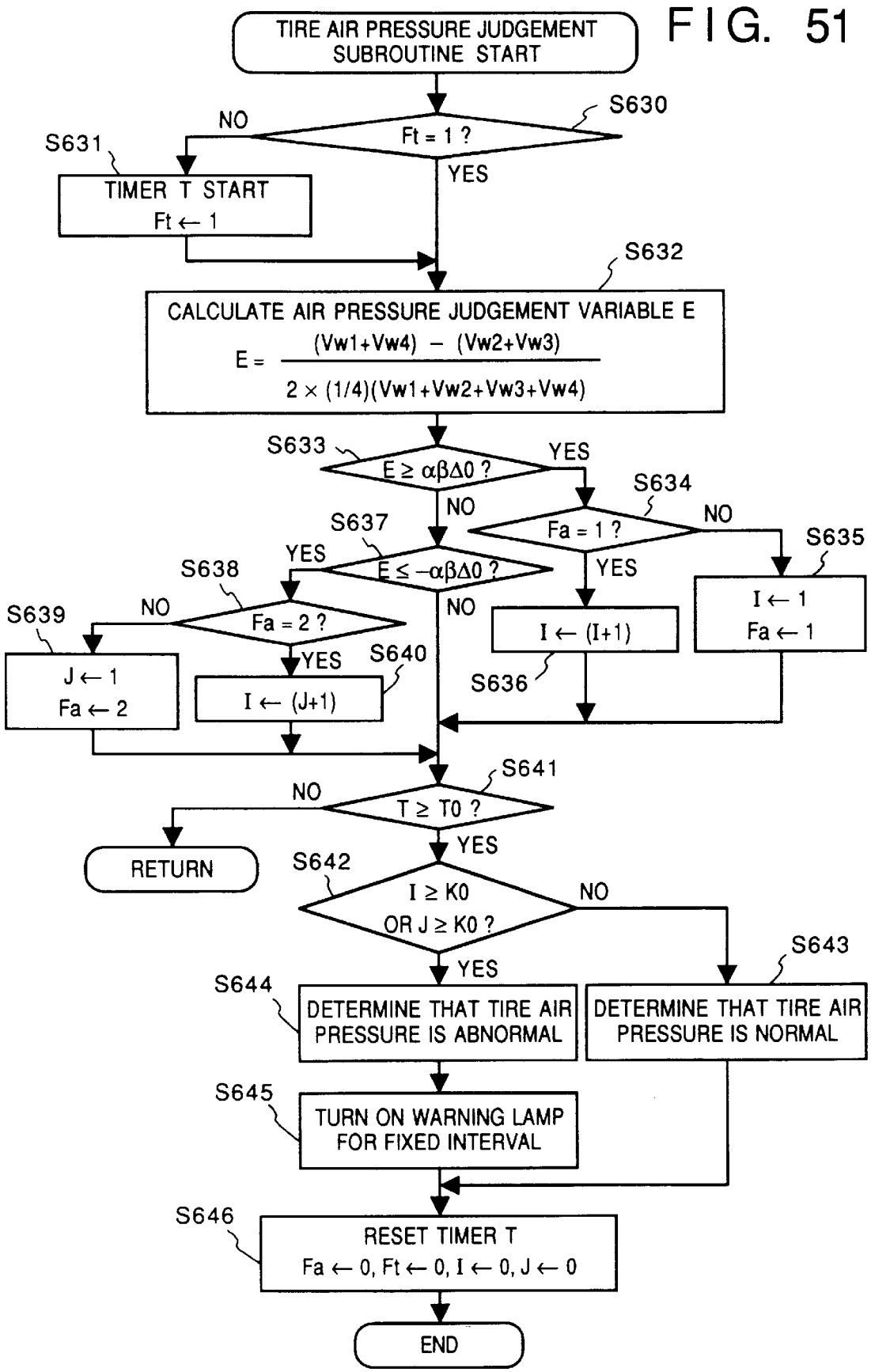
FIG. 51 is a flowchart of the tire air pressure judgment subroutine of FIG. 51
Figure 54:
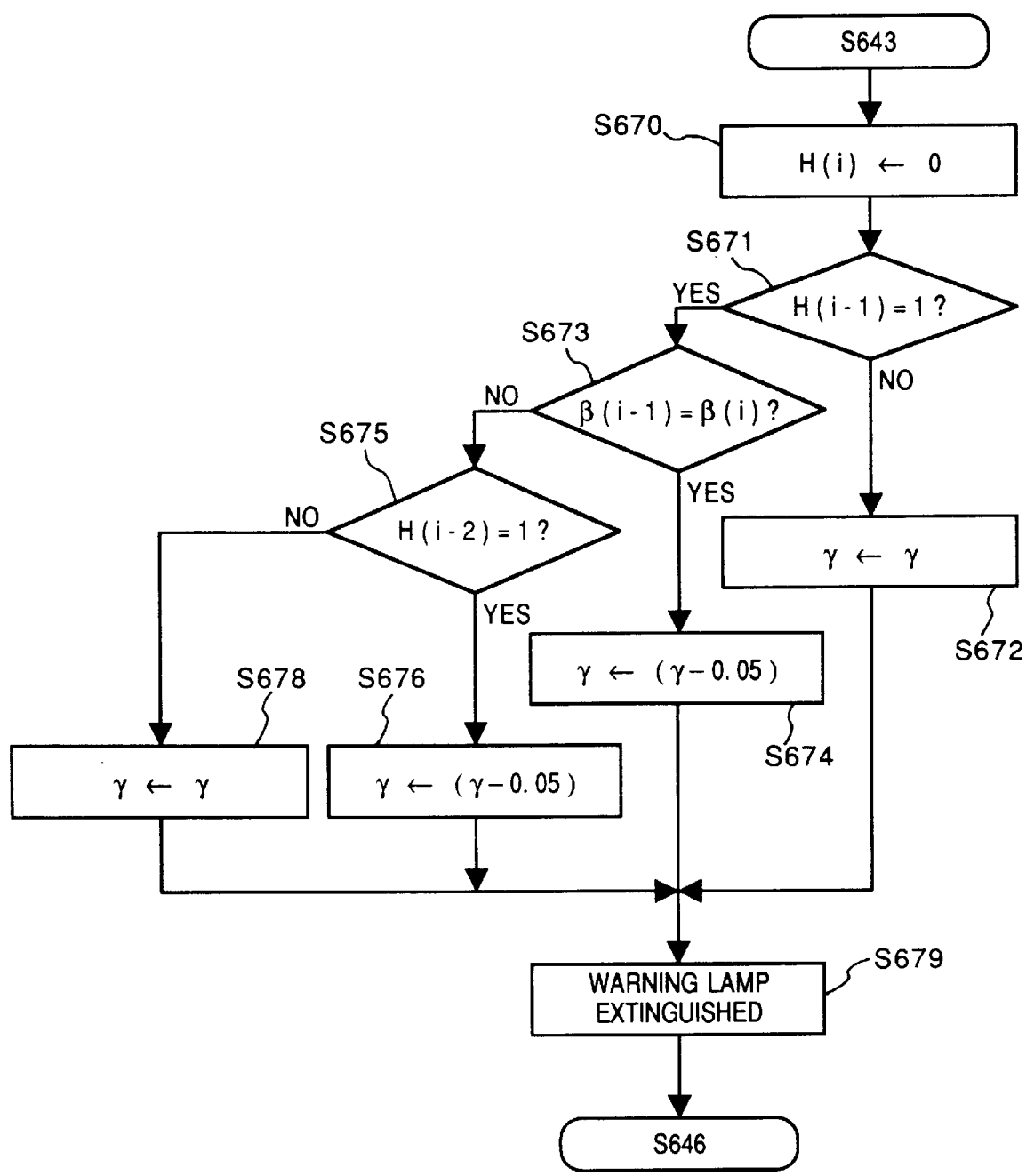
FIG. 54 is the part flowchart for the tire air pressure judgment subroutine of the first variation example.

Here, this example variation shown in FIG. 54 is a partial variation in the flowchart shown in FIG. 50. Where, the correction coefficient $\alpha$ and $\beta$ are added, and the learned correction coefficient $\gamma$ is applied, and the judgment threshold value is established as $\alpha\beta\gamma\Delta0$. Where the learned coefficient $\gamma$ is set to 1 when at the completion of the initial settings process.

First, explaining based upon the FIG. 54, after step S643, in step S670, the current judgment flag H(i) is set to "0," then in step S671, whether or not the previous judgment flag H(i−1) is "1" or not is checked, and when the previous flag H(i−1) is also "0," which indicates that tire air pressure was also judged to be normal in the previous step, in step S672 the learned coefficient $\gamma$ is preserved without change, then in step S679 the warning lamp is turned off, and the process moves to step S646.

When the result of step S671 is "yes," in step S673, whether or not the previous value $\beta(i-1)$ is the same as the current $\beta(i)$ is checked (in short, whether or not the vehicle velocity region at which the tire air pressure judgment was carried out in the previous case is equal to that of the current case), and when the result is "yes," even though that the vehicle velocity regions are the same, because the tire air pressure was judged to be abnormal in the previous case, and is judged to be normal in the current case, considering from a fail-safe point of view, it is possible that the threshold value is a bit too large, and in this case, in step S674 the learned coefficient $\gamma$ is changed to a changed a prescribed value 0.05 smaller, and after step S679 has elapsed, the process returns to step S646.

On the other hand, when the result of step S673 is "no," in the case when the vehicle velocity region of the previous case and the current case are different, in step S675, whether or not the flag H(i−2), for case two preceding, is "1" or not is checked, and when the result is "yes," in other words, because the current case is judged to be normal tire air pressure, and the tire air pressure of the (i−2) time and the (i−1) case are judged to be abnormal, as previously described, considering that it is possible that the threshold value is too large, in this case in step S674 the learned coefficient $\gamma$ is decreased by the prescribed amount 0.05, an after step S679 has elapsed, the process proceeds to step S646.

Or, in the case when the result of step S675 is "no," because the tire air pressure for the (i−2) case is normal, and is different from the (i−1) case, and the current case is judged to be normal, because it can be thought that the learned coefficient $\gamma$ is at a proper value, in step S678 the value for the learned coefficient $\gamma$ is preserved as is, and after the step S679 has elapsed, the process moves to step S646.

Figure 55:
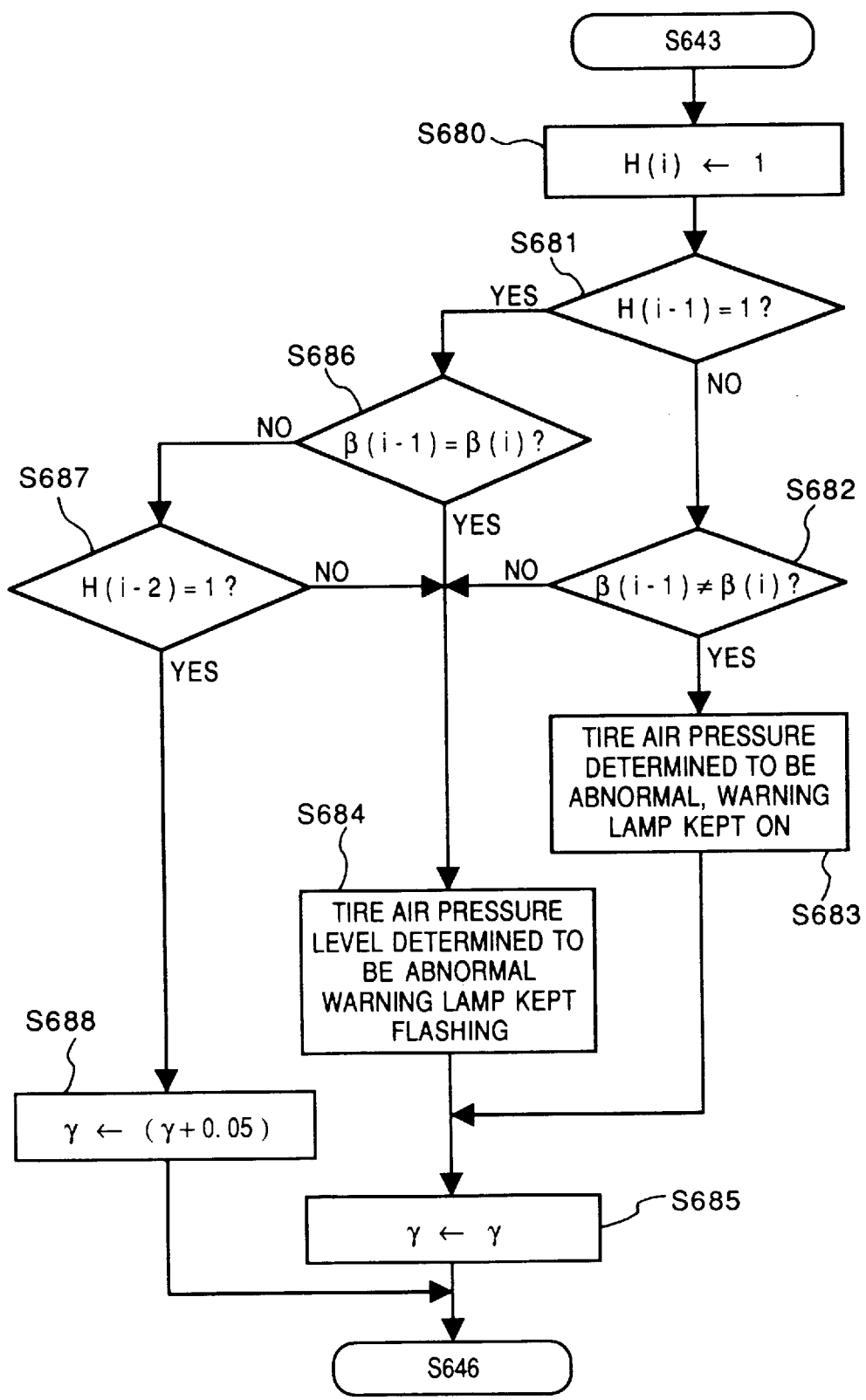
FIG. 55 is the part flowchart for the tire air pressure judgment subroutine of the second variation example.

FIG. 55 shows a change in the flowchart of FIG. 50.

Next, explaining based upon the FIG. 55, in step S642 it is determined that the tire air pressure is abnormal, and in step S680 the current judgment flag H(i) is set to "1," next, whether or not the previous judgment flag H(i−1) is "1" is checked, and when the answer is "yes," in step S682, whether or not the previous $\beta(i-1)$ and the current $\beta(i)$ are equal is checked (in other words, whether or not the vehicle velocity region of the previous tire air pressure judgment is different from the vehicle velocity region of the current tire air pressure judgment), and when the answer is "yes," because in successive different vehicle velocity regions an abnormality judgment has appeared, in step S683, the tire air pressure is judged to be abnormal, and the warning lamp is kept on, and then in step S685 the learned coefficient γ is kept as is, without any changes, and after that, the process moves to step S646.

When the result of step S682 is "no," because the vehicle velocity regions for the previous case and the current case are the same, because it is difficult to judge a tire air pressure abnormality, in step S684, the tire air pressure is judged to be preliminarily abnormal, and the warning lamp is kept in a flashing state, and then the process moves to step S685. On the other hand, when the result of step S681 is "no," in other words, when the tire air pressure of the previous time is normal, and the current case is abnormal, in step S686 whether or not β(i-1) is equal to β(i) is checked, when the answer is "yes," even though the vehicle velocity regions of the previous case and the current case are the same, and the tire air pressure of the previous case is normal, because the current case is judged to be abnormal, the process moves to step S684, and the tire air pressure is judged to be preliminarily abnormal, and the warning lamp is kept flashing.

When the result of step S686 is "no," because the vehicle velocity regions of the previous and the current case are different, there is the possibility that tire air pressure has become abnormal at the current judgment. Therefore, in step S687, whether or not the flag H(i-2) is "1" is checked, and when the result of that is "no," in the case that the tire air pressure was normal in the (i-2) judgment, because the possibility that the tire air pressure has decreased is high, the process moves to step S684, where the tire air pressure is judged to be preliminarily abnormal, and the warning lamp is kept flashing.

On the other hand, when the result of step S687 is "yes," because, in other words, the tire air pressure of the (i-2) case was abnormal, the (i-1) was normal, and the current case abnormal, it is considered that it is possible that the threshold value is a bit too low, and in step S688 the learned coefficient γ is increased by a prescribed value 0.05, and then the process moves to step S646.

In this manner, the learned coefficient is introduced, and by following the heretofore described logic, by means of the learned correction coefficient learning, the percentage of misjudgments of the tire air pressure can be kept small.

Figure 52:
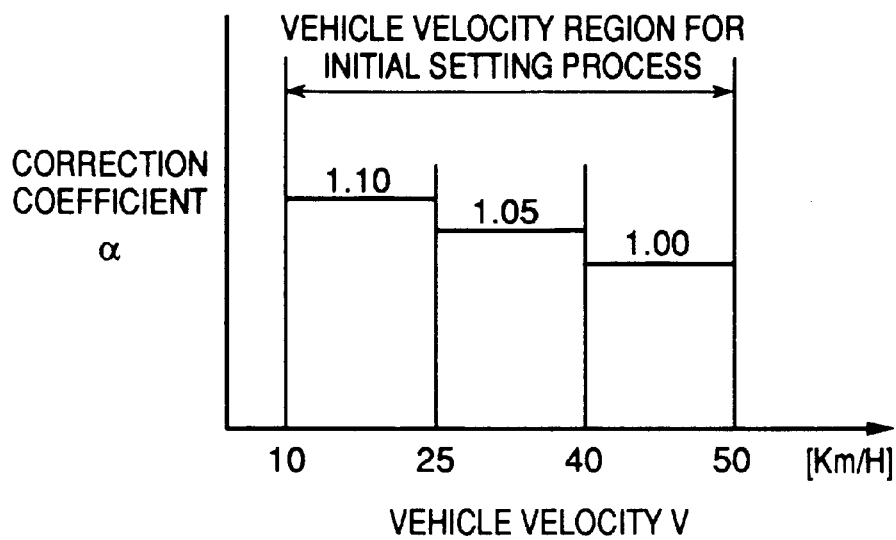
FIG. 52 shows the characteristics of the corrected $\alpha$.
Figure 53:
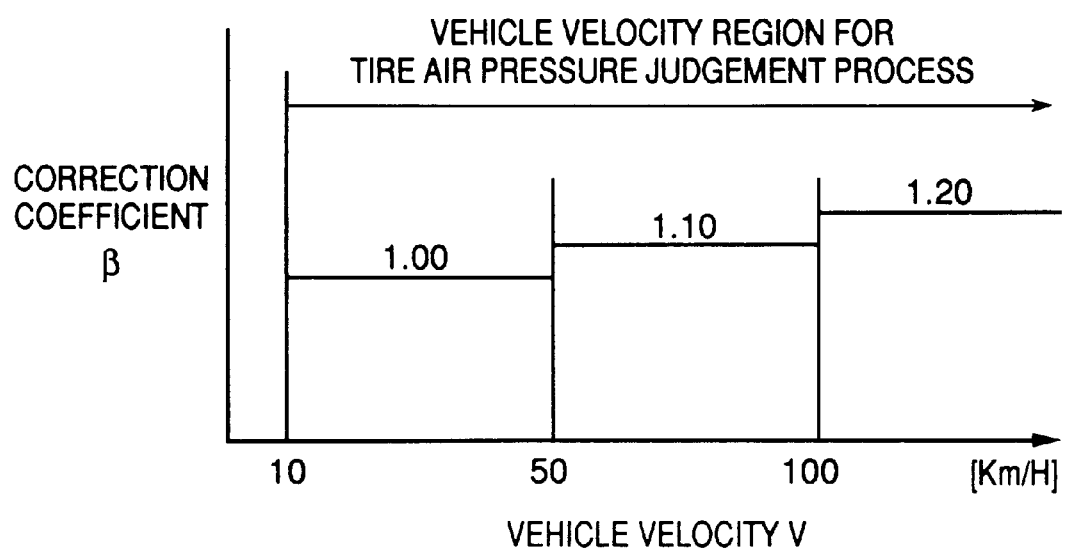
FIG. 53 shows the characteristics of the corrected $\beta$.

Next, in FIGS. 52 and 53, because the threshold value is corrected by the correction coefficient α, which is set in such a way that the the correction coefficient α gets larger as the vehicle velocity V gets smaller than that of the vehicle velocity V at which the initial settings process was carried out, the percentage of misjudgments of the tire air pressure judgments is small, and the accuracy and the reliability of the tire air pressure judgment can be improved.

After the initial settings process, the tire air pressure judgment process is carried out using the said coefficient Cx after a prescribed distance has been traveled by the vehicle or a prescribed period of time has elapsed.

This tire air pressure judgment process is carried out when the vehicle is traveling in a steady, straight manner, and at a velocity within 10 Km/H and the greatest vehicle velocity of the second velocity region, but as this second vehicle velocity region is set such that it includes a first vehicle velocity region that is broader than the first vehicle velocity region, because the tire air pressure judgment can be undertaken for almost all vehicle velocity regions, it is more practical.

Here, when the vehicle velocity becomes greater than 60 Km/H, considering that the drive wheel slip has the effect of lowering the accuracy of the detected wheel velocity signal, because correction coefficient β corrects the threshold value, the correction coefficient β is established so that it grows larger as the amount that the vehicle velocity, at which the tire air pressure judgment is carried out, is outside the first vehicle velocity region increases.

This tire air pressure judgment process, using the timer T, the counters I and J, the number of times that the value $D \geq \alpha \beta \Delta 0$ is counted by the counter I within a prescribed time interval TO, and the number of times that the value of $D \leq \alpha \beta \Delta 0$ is counted by the counter J within a prescribed time interval TO, and when these count values I and J become greater than a prescribed value KO, because the tire air pressure is judged to be abnormal, the tire air pressure judgment can be performed with a high degree of accuracy, as it is based upon a large number of sampling data.

Next, the initial settings process of the compensation coefficient Cx of the aforementioned first variation of the preferred embodiment will be explained while referring to the flowcharts on FIGS. 56 and 57, as well as the FIGS. 58 and 59.

The initial setting process for the coefficient Cx is started with the initial settings switch 55 being switched on, then, the timer T, which calculates the time elapsed from the time that the switch 55 is switched on, is started, furthermore, the distance counter Dc, that counts the distance traveled based upon the signal from the traveling distance measuring means, is reset to "0" (in step S701) from the time that the switch 55 was switched on. Then the digitized signals from the aforementioned sensors 51–54 and the switch 55, are each read, and the four wheel velocities VW1–VW4 are calculated in step S702, then in order to display that it is in the middle of the initial settings process, the warning lamp 56 is turned on, and furthermore, in order to prohibit the tire air pressure judgment the flag F is set to "0" in step S703.

Then, in step S704, the counting for the timer T and the distance traveled counter are both performed, then whether or not the initial settings conditions are satisfied for the coefficient Cx is checked in the steps S705–S716.

For the initial settings conditions, fundamentally, the vehicle should not be accelerating or decelerating, and it is necessary for the vehicle velocity to be within the permissible vehicle velocity range for the initial setting of Cx, set from the vehicle velocity applied to the road surface friction as shown in FIG. 41 for the aforementioned first preferred embodiment variation, but, because if any of the one wheels has a temporary tire attached or if when the road surface is canted, because the initial settings process is not carried out smoothly, even in these special cases, it has been made possible to carry out the initial settings precisely.

First, in step S705, the check as to whether or not the vehicle velocity V is within the specified velocity range shown in FIG. 41 is carried out, where, the vehicle velocity V is applied as the average of the left and right front wheels 1 and 2 wheel velocity.

When the result of the judgment in step S705 is "yes," the process moves to step S706, or when the result is "no," the process returns to step S702. Instep S706, whether or not the timer T measured time is greater than the specified time To is checked, because in the first time this answer is "no," next in step S707, whether or not the distance count Dc of the distance counter D is greater than the specified value D0 is checked, and because this is also "no," in the first time the process moves to step S708, where whether or not the initial settings switch has been switched on again is checked. However, because the initial settings switch will not be switched on again for the first time, the first answer is "no," and the process moves to step S709.

Then in step S709, whether or not the change in the vehicle velocity is roughly "0" is checked (in other words, if the vehicle is traveling at a stable state), if the answer is "yes," then the process moves to step S710, and whether or not the steering angle θ, detected from the steering angle sensor, is close to "0" is checked (in other words, if the vehicle is traveling in a straight line), in the case when the vehicle is traveling in a straight line, the process moves to step S711.

In step S711, in order to determine whether or not a temporary tire is attached, the wheel diameter difference judgment variable R is calculated, as shown in the figure, as the ratio of the absolute value of the difference between the sum of the left wheel velocities VW1 and VW3 and the sum of the right wheel velocities VW2 and VW4, divided by the vehicle velocity V, and this wheel diameter difference judgment coefficient R is checked as to whether it is less than a specified threshold value β.

Figure 58:
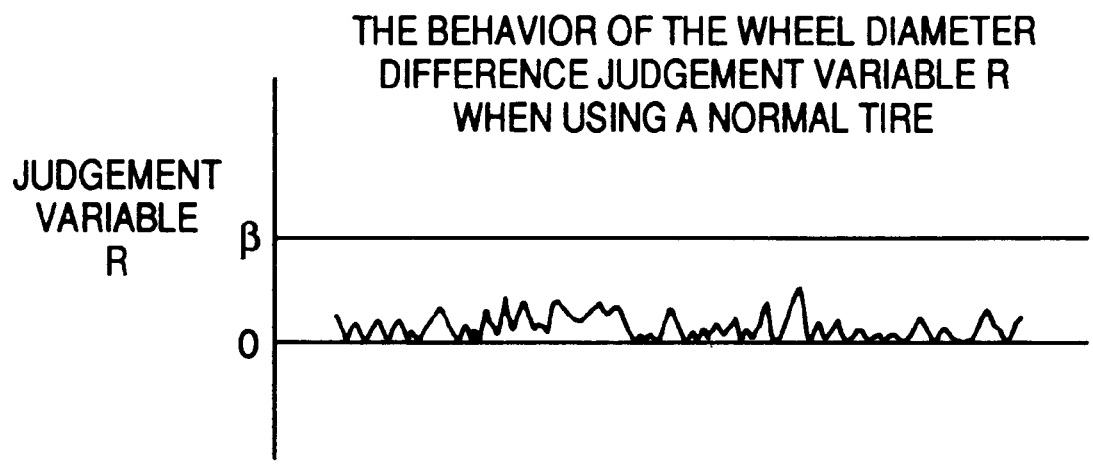
FIG. 58 is a time chart for the change in the wheel diameter variable R for the third preferred embodiment.
Figure 59:
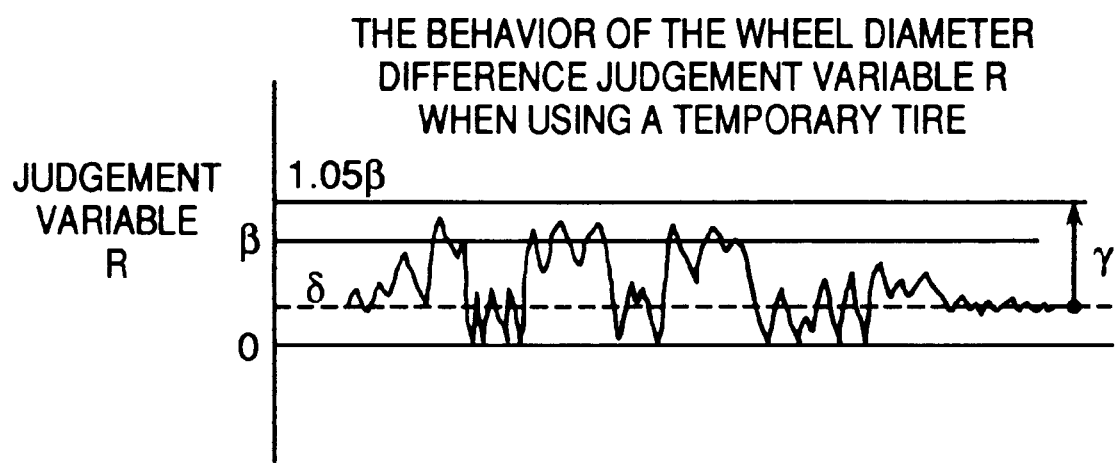
FIG. 59 is a time chart for the change in the wheel diameter variable R in the case of a temporary tire for the third preferred embodiment.

In other words, in the case when the vehicle has four normal tires, and the vehicle is traveling in a straight path, because the wheel diameter difference judgment coefficient R becomes less than the threshold value β, as shown in FIG. 58, the answer to step S711 becomes "yes." However, in the state when one temporary tire is added to wheel 1, and the other three are three normal tires, the sum of the wheel velocities VW1+VW3 of the left hand side is not nearly equal to the sum of the right hand side wheel velocities VW2+VW4, as shown in FIG. 59, because the wheel diameter difference judgment coefficient R becomes larger than the threshold value β, the answer to step S711 becomes "no," and the process to step S714.

When the answer to step S710 is "no," in step S712, whether or not the steering angle θ is less than a prescribed value α is checked, and when the answer is "no," it is determined that the vehicle is turning, and the process returns to step S702. In step S712, when the result is "yes," in order to determine if the vehicle is traveling on a canted road surface, in step S713, whether or not the steering angle θh is uniform for a successive period of time tα is judged. However, this judgment, actually, is carried out by means of a calculation process which spans multiple iterations, in which a timer is started, and a flag signaling the timer has started is set, then the process is performed as the timer counts. In the case that the vehicle is not traveling on a canted road, the answer to step S713 becomes "no," and the process moves to step S702, but, when traveling on a canted road, the answer to step S713 becomes "yes." Thus, even in this case, in order for the initial settings process to become possible, when the answer to step S713 is "yes," the process moves from step S713 to step S711.

In step S711, when the result is "no," in order to judge whether a temporary tire is attached or not, in step S714, whether or not the wheel diameter difference coefficient R is constant for more than a fixed period of time is checked. However, this check, actually, is carried out by means of a calculation process which spans multiple iterations, in which a timer is started, and a flag signaling the timer has started is set, then the process is performed as the timer counts. Thus, in the case when a temporary tire is attached, even if the vehicle is traveling is a straight path, because the wheel diameter difference coefficient becomes uniform for more than a fixed time interval, even in this case, so that the initial settings become possible when the result of step S714 is "yes," the process moves from step 714 to step S717 in FIG. 57.

On the other hand, after the initial settings process is started, if a specified period of time has elapsed, or, even if the vehicle has traveled a prescribed distance, in the case when the initial settings processing is uncompleted, or, because the initial settings processing has not been completed, the initial settings switch has been switched on again, as will be explained herein below, the specified time interval tα is shortened, or by correcting the threshold value β to a larger value, the initial settings process is made to be finish.

In other words, when in step S706, the measured time T by the timer T is greater than the specified time To, the process moves to step S716, and the specified time tα is changed to 0.95 tα, and the threshold value β is rewritten as 1.05 β, and the process returns to step S702. Or, when in step S707, when the distance Dc counted by the distance counter D is greater than the specified value D0, the process moves to step S716, where the specified period of time tα is changed to 0.95 tα, and the threshold value is rewritten as 1.05 β, and then the process returns to step S702.

When in step S708, when in the case that the initial settings switch 55 has been switched on again, in step S715, as well as the timer T is started, after being reset, the distance counter D is reset to "0," and the process moves to step S716, where the specified time interval tα is changed to 0.95 tα, and the thresh hold value β is rewritten as 1.05 β, and the process returns to step 702.

Figure 57:
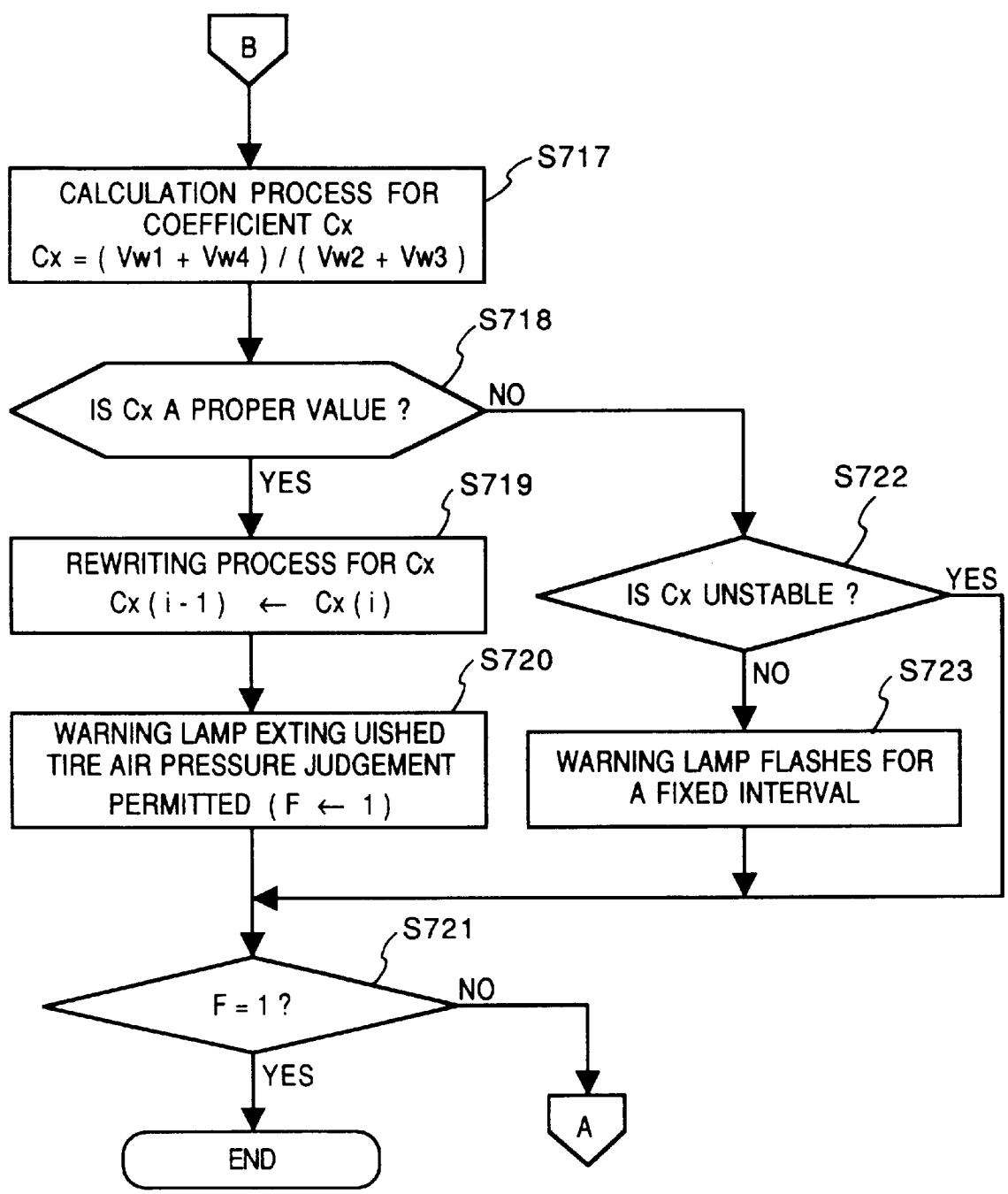
FIG. 57 the remainder of the flowchart for the initial settings process of the coefficient Cx for the tire air pressure judgment for the third preferred embodiment.

Next, when the result of step S711 is "yes," or the result of step S714 is "yes," the process moves to step S717, in FIG. 57, and the steps after step S717 are carried out.

Next, in step S717, the coefficient Cx, in order to compensate for the states of the 4 tires, adding the tire manufacturing defect, and when just after a tire change, utilizing the four wheel velocities, is calculated from the ratio of, the sum of the wheel velocities of the tires on a diagonal left front wheel 1 and right rear wheel 4, (Vw1+Vw4), and the sum of the wheel velocities of the wheels on the other diagonal, right front wheel 2 and left rear wheel 3, (Vw2+Vw3), in the following equation.

Compensation Coefficient Cx=(Vw1+Vw4)/(Vw2+Vw3)

Then, whether or not the compensation coefficient is a proper value or not is checked in step S718, because the tire manufacturing error, the error in the tire outer radius is at most 0.3%, and in the case that the tire compensation coefficient is within range to be rounded to 1 (for example, 0.95–1.05), the compensation coefficient is determined to be a proper value.

When the compensation coefficient is a proper value, in step S719, the process for rewriting the coefficient Cx is carried out, the previous coefficient Cx(i−1) is assigned the value for the current coefficient Cx(i), then, the warning light 56 is turned off in step S720, and the flag F is set to "1," so that the tire air pressure judgment is now permissible, and after that, the process moves to step S721.

On the other hand, when the result of step S718 is "no," in step S722, whether or not the coefficient Cx is stable or not is judged, and when it is unstable, the process moves to step S721, and when the coefficient Cx is not unstable, in step S723, the warning lamp is flashed for a specified period of time (for example 2 seconds), then the process moves to step S721.

Figure 56:
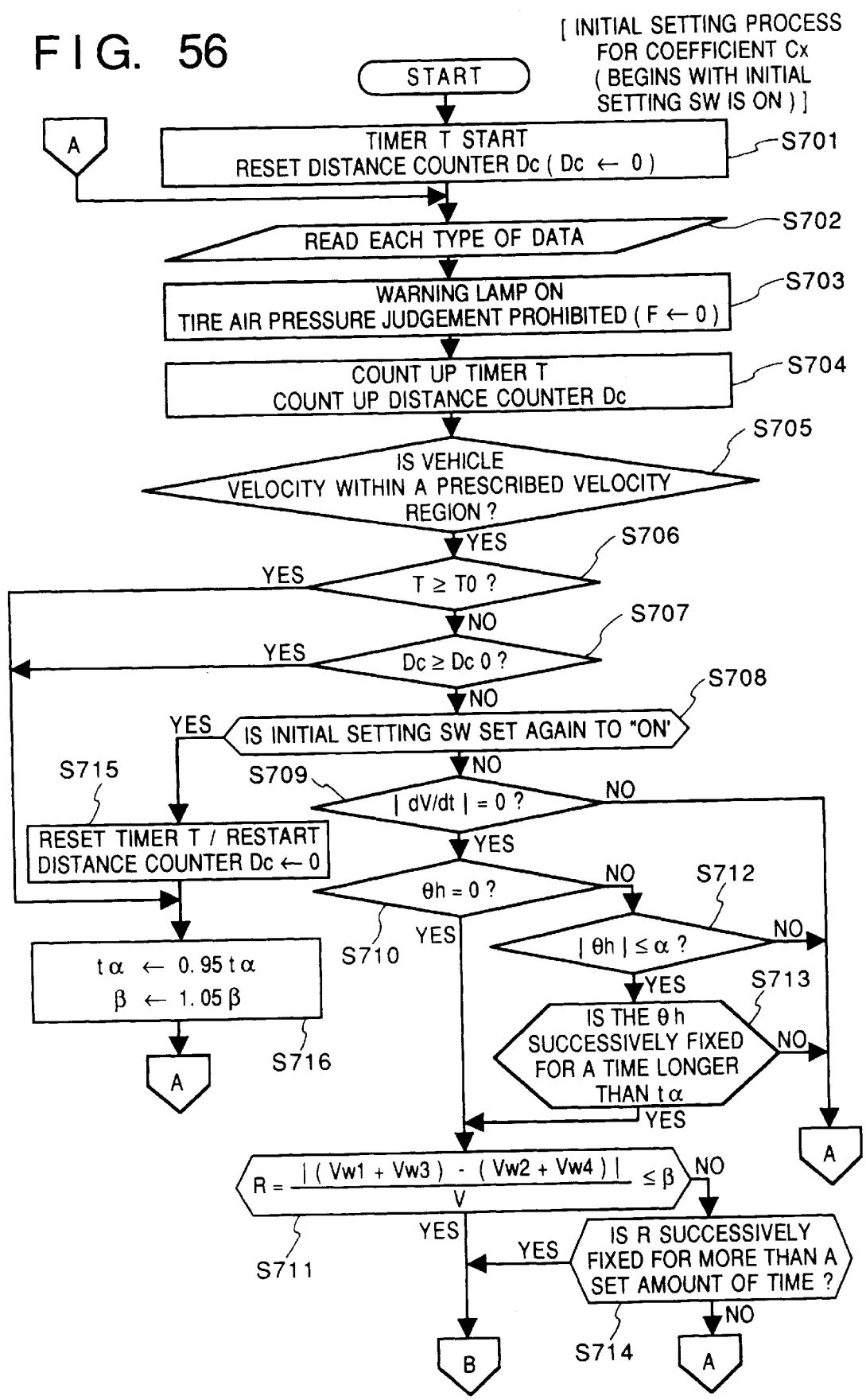
FIG. 56 a partial flowchart for the initial settings process of the coefficient Cx for the tire air pressure judgment for the third preferred embodiment.

At step S721, whether or not flag F is "1" is checked, and when the setting for the coefficient Cx is completed, the flag F is "1," and the initial setting process is completed, but, when the coefficient setting is not completed, the flag F is set to "0," and the process returns to step S702 in FIG. 56.

However, based on the switch 55 being turned on once, multiple coefficients Cx from multiple repetitions of the initial settings processes are carried out, and the final Cx should be decided as the average of the multiple Cx's.

In this manner, the coefficient Cx is decided such that it corrects for the initial state of the four tires after tire changes, and then it is stored in RAM memory in step S702.

Furthermore, in the aforementioned initial settings process, steps S706, S707, and S708, when the answer of the judgment is "yes," it is the same as the step S711, and can also be constructed such that it judges whether or not (R−δ) is less than a specified threshold value γ. Where, δ is specified at approximately 0.05 β, and γ and β are nearly equal threshold values (refer to FIG. 59).

Figure 60:
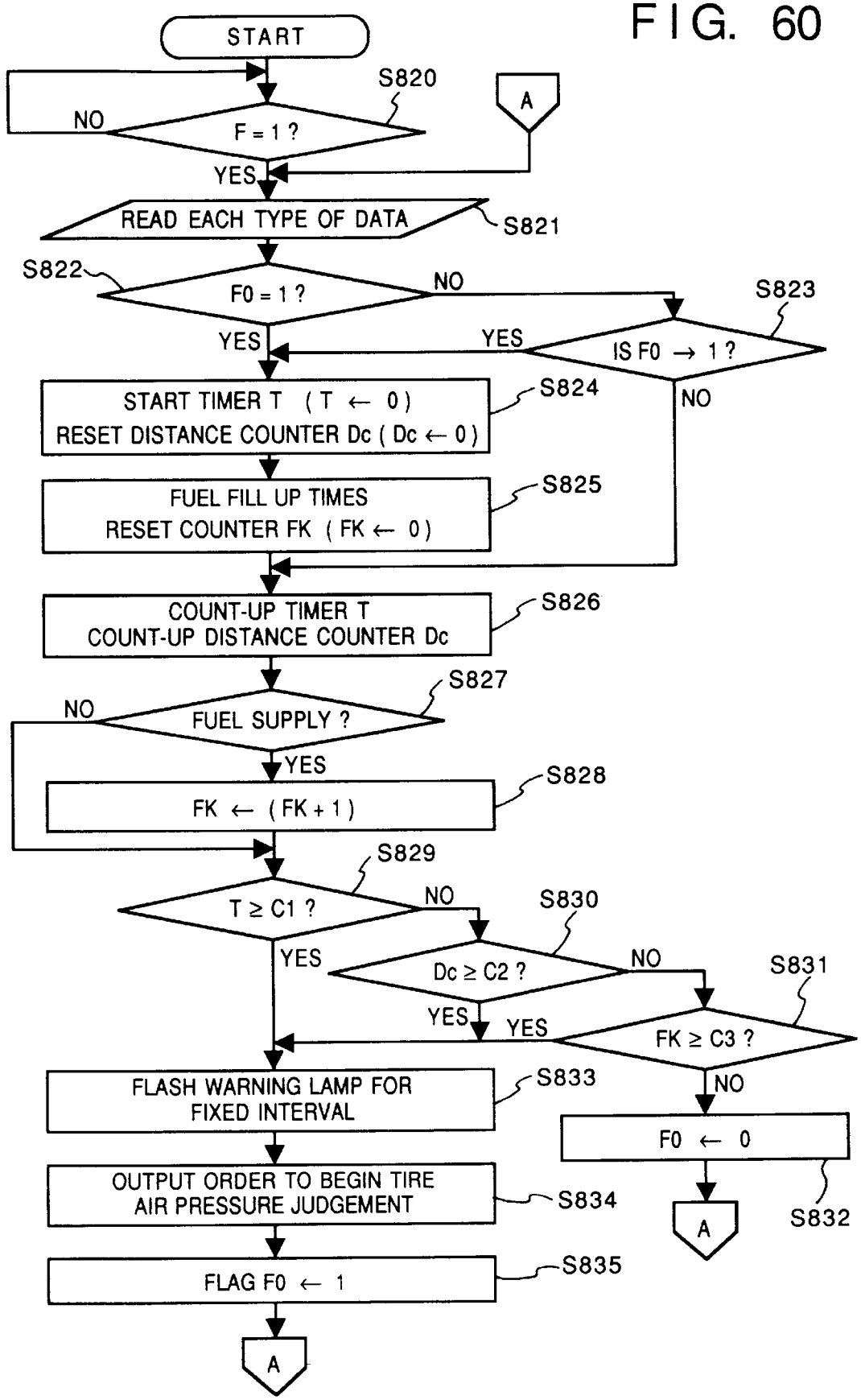
FIG. 60 is a flowchart for the tire air pressure judgment time detection process of the fourth preferred embodiment.

Next, a periodic tire air pressure detection process that is suitably applicable from the first variation of the preferred embodiment, will be explained while referring to the flowchart in FIG. 60.

In the first variation of the preferred embodiment, when the vehicle is traveling, is instructed such that the tire air pressure judgment is carried out constantly, but, in this fourth separate preferred embodiment, it can be constructed so that it carries out the tire air pressure judgment according to the command from the periodic tire air pressure detection process.

This process is started along with the engine ignition switch being turned on, and first in step S820, the aforementioned flag 1 is checked to see if it is "1" or not, when the flag is "1," in step S821 each of the necessary data for this process is read, then, in step S822, whether or not flag Fo is "1" is checked.

Because this flag Fo is set in step S835, because at the first time through the flag is set to "0," and in step S823, whether or not the aforementioned flag F has been changed from "0" to "1" is checked, and directly after the completion of the initial settings, because that result becomes "yes," the process moves from step S823 to S824, and the timer T is started and distance counter Dc, which counts based upon the signal from the traveled distance measurement means, is reset. Then, in step S825, after the counter FK, that counts number of times that fuel has been added to the fuel tank, is reset, the process moves to step S826. On the other hand, even when the result to step S823 is "no," the process moves to step S826, and in step S826, the timer T is made to count up, and the distance Dc is also made to count up.

In step S827, based upon the fuel supply detection switch, whether or not the fuel has been supplied or not is checked, and when the answer is "no," the process moves to step S829, on the other hand, when the answer is "yes," in step S828, after incrementing the counter FK, the process moves from step S829. Where the fuel supply detection switch is turned on when the fuel cap or the fuel cap outer cover is opened.

Then, in step S829, whether or not the timer count T for the timer TK is greater than a specified period of time C1 (for example, 30 days) is checked, or, in step S830,whether or not the count value Dc for the counter D is greater than a specified value C2 (for example, 50 Km) is checked, or in step S831, whether or not the number of fuel supplies FK is greater than a specified value C3 (for example, 2 times) is checked.

The first time through, because the results for steps S829–S831 are "no," the process moves to step S832, the flag Fo is reset to "0," and the process returns to step S821, but, after the first time through, the process does steps S821–S823, and moves to step S826, and the steps S826–S831 are carried out repeatedly, and during that process, is any one of the steps S829, S830, or S831 have a "yes" as a result, the process moves to step S833. In step S833, in order to inform that is it time to perform the tire air pressure judgment process, or in order to encourage the driver to check the results of the tire air pressure judgment, the warning lamp 56 is flashed for a specified period of time (for example, 5 seconds), then in step S834, the tire air pressure judgment is started by the output by the start command, then in step S835, the flag Fo is set to "1" and the process moves to step S821.

According to the above periodic tire air pressure detection process, when the time period for the tire air pressure judgment process is detected to have elapsed, it is displayed by the warning lamp 56, and if the vehicle is traveling, in step S824, based on the output of the start command, the tire air pressure judgment is started. However, in the case that the vehicle is stopped, after the vehicle has resumed travel, the tire air pressure judgment process is carried out.

In the aforementioned step S835, when the flag Fo is set to "1" and the process moves to step S821, because the result of step S822 becomes "yes," because steps S845 and S825 are passed and the process moves to step S826, from that point on the time, distance, and number of fuel supplies are counted, it repeats from there similarly to the aforementioned process. However, when in the middle of the initial settings process, because the flag Fo is set to "0," the periodic tire air pressure detection process cannot be carried out.

As many apparently widely different embodiments of the present invention can be made without departing from the spirit and scope thereof, it is to be understood that the invention is not limited to the specific embodiments thereof except as defined in the appended claims.

What is claimed is:

1. A tire air pressure warning device which judges tire air pressure abnormality based on detected signals from wheel velocity sensors that detect a revolving state of respective tires of a vehicle, and outputs a warning signal, comprising:

a coefficient setting means for setting coefficients to compensate a difference between initial conditions of respective said tires, based upon the detected signals from the wheel velocity sensors;

a judgment means for judging tire air pressure abnormality by comparing a deviation value obtained from a prescribed equation based on a difference between a number of revolutions of each tire and a deviation width having a prescribed width; and a prohibiting means for prohibiting judgment of tire air pressure abnormality by said judgment means when the coefficients do not satisfy a prescribed condition.

2. A tire air pressure warning device according to claim 1, wherein said prescribed equation has the coefficients as factors for obtaining said deviation value.

3. A tire air pressure warning device that judges a tire air pressure abnormality utilizing detected signals from wheel velocity sensors that separately detect a revolving state of respective tires of a vehicle, and outputs a warning signal, comprising:

a judgment means for judging tire air pressure abnormality by comparing a deviation value obtained from a prescribed equation based on a difference between a number of revolutions of each tire and an average tire rotation and a deviation width having a prescribed maximum value and a prescribed minimum value;

a vehicle velocity detecting means for detecting a vehicle velocity;

a deviation width changing means for changing the prescribed maximum value and the prescribed minimum value according to the velocity of said vehicle, wherein the deviation width changing means changes the prescribed maximum value and prescribed minimum value such that a tire air pressure abnormality judgement is more likely the greater the velocity.

4. A tire air pressure warning device according to claim 3, wherein said deviation width changing means increases a difference between the prescribed maximum value and the prescribed minimum value as the vehicle velocity increases.

5. A tire air pressure warning device which outputs a warning when a decrease in tire air pressure is detected in respective four wheels of a vehicle, comprising:

wheel velocity sensors which output a number of pulse signals per one revolution of the respective four wheels of the vehicle, the wheel velocity sensors including a plurality of detecting portions provided on a disk which rotates with the wheel, and electromagnetic pickups to detect the detecting portions and to output the same number of pulse signals per one revolution;

a data collection means for counting the number of pulse signals output from the respective wheel velocity sensors, and for measuring a time required to output the number of pulse signals for each respective wheel velocity sensor, thus obtaining the wheel velocity data of each wheel; and a first reset means for resetting a counter number in a counter of the data collection means when the pulse signals from the respective wheel velocity sensors are not output within a first prescribed time period, after an output signal is initially output from any of the wheel velocity sensors when the operation of the tire air pressure warning device is started.

6. A tire air pressure warning device according to claim 5, wherein after the counter is reset, the first reset means re-starts counting of the pulse signal by the data collection means.

7. A tire air pressure warning device which outputs a warning when a decrease in the tire air pressure is detected in respective four wheels of a vehicle, comprising:

wheel velocity sensors which output a number of pulse signals per one revolution of each of the four wheels of the vehicle, the wheel velocity sensors including a plurality of detecting portions provided on a disk which rotates with the wheel, and electromagnetic pickups to detect the detecting portions and to output the same number of pulse signals per one revolution;

a data collection means for counting the number of the pulse signals output from the respective wheel velocity sensors, and for measuring a time required to output the number of pulse signals for each respective wheel velocity sensor, thus obtaining the wheel velocity data of each wheel; and a second reset means for resetting a counter number in a counter of the data collection means, after the number of pulse signals from any of the wheel velocity sensors is output, if the number of pulse signals from the respective wheel velocity sensors is not output from the respective wheel velocity sensors within a second prescribed time period after the operation of the tire air pressure warning device is in operation.

8. A tire air pressure warning device which outputs a warning when a decrease in the tire air pressure is detected in respective four wheels of a vehicle, comprising:

wheel velocity sensors which output a number of pulse signals per one revolution of each of the four wheels of the vehicle, the wheel velocity sensors including a plurality of detecting portions provided on a disk which rotates with the wheel, and electromagnetic pickups to detect the detecting portions and to output the same number of pulse signals per one revolution;

a data collection means for counting a number of the pulse signals output from the respective wheel velocity sensors, and for measuring a time required to output the number of pulse signals for each respective wheel velocity sensor, thus obtaining the wheel velocity data of each wheel;

a first reset means for resetting a counter number in a counter of the data collection means when the pulse signals from the respective wheel velocity sensors are not output within a first prescribed time period, after an output signal is initially output from any of the wheel velocity sensors when the operation of the tire air pressure warning device is started; and a second reset means for resetting a counter number in a counter of the data collection means, after the number of pulse signals from any of the wheel velocity sensors is output, if the plurality of pulse signals from the respective wheel velocity sensors is not output from the respective wheel velocity sensors within a second prescribed time period, after the operation of the tire air pressure warning device is in operation.

9. A tire air pressure warning device which outputs a warning when a decrease in the tire air pressure is detected using detected signals from wheel velocity sensors from respective four wheels of a vehicle, comprising:

a tire pressure judging means for judging a decrease of the tire pressure based on differences between respective tire rotations;

a detecting means for judging whether the vehicle is in a normal running condition or in an abnormal running condition; and a prohibition means for prohibiting the judgement of the tire pressure by the tire air pressure warning device, when the vehicle is in an abnormal running condition, or until a current running condition has changed from the abnormal running condition to the normal running condition within a prescribed time.

10. A tire air pressure warning device according to claim 9, further comprising:

a data erasing means which erases a detected output from the wheel velocity sensors when the vehicle changes from a normal running condition to an abnormal running condition, thus prohibiting the detected outputs obtained just before changing from the normal running condition to the abnormal running condition from being used for controlling the tire air pressure warning device.

11. A tire air pressure warning device according to claim 9, wherein the detecting means detects that the vehicle is in the normal running condition when the vehicle is running straight, and detects that the vehicle is in the abnormal running condition when the vehicle is turning.

12. A tire air pressure warning device according to claim 9, wherein the detecting means detects that the vehicle is in the normal running condition when the vehicle is not braked, and detects that the vehicle is in the abnormal running condition when the vehicle is braked.

13. A tire air pressure warning device according to claim 9, wherein the detecting means detects that the vehicle is in the normal running condition when the vehicle is running on a high friction surface, and detects that the vehicle is in the abnormal running condition when the vehicle is running on a low friction surface.

14. A tire air pressure warning device that judges a tire air pressure abnormality utilizing detected signals from wheel velocity sensors that separately detect the revolving state of respective tires of a vehicle, and outputs a warning signal to a driver, comprising:

a tire chain detecting means for detecting if tire chains are attached to said respective tires based on the detected signals from the wheel velocity sensors; and a prohibition means for prohibiting the detection of tire pressure decrease when said tire chain detecting means detects attached tire chains.

15. A tire air pressure warning device that judges a tire air pressure abnormality utilizing detected signals from wheel velocity sensors that separately detect the revolving state of respective tires of a vehicle, and outputs a warning signal to a driver, comprising:

a tire chain detecting means for detecting a condition that a tire chain is attached when a velocity of right and left rear wheels is smaller than a velocity of right and left front wheels; and a prohibition means for prohibiting the detection of tire pressure decrease when said tire chain detecting means detects an attached tire chain.

16. A tire pressure warning device that judges a tire air pressure abnormality utilizing detected signals from wheel velocity sensors that separately detect the revolving state of each tire of a vehicle, and outputs a warning signal to a driver, comprising:

a tire chain detecting means for detecting a condition that a tire chain is attached when a velocity of right and left front wheels is smaller than a velocity of right and left rear wheels; and a prohibition means for prohibiting the detection of tire pressure decrease when said tire chain detecting means detects an attached tire chain.

* * * * *